United States Patent
Murakami et al.

(10) Patent No.: US 10,735,607 B2
(45) Date of Patent: Aug. 4, 2020

(54) DEVICE FOR GENERATING DISPLAY DATA, INFORMATION DEVICE, AND DISPLAY SYSTEM FOR DISPLAYING SCROLL REGION AND OPERATION REGION

(71) Applicant: Konica Minolta, Inc., Chiyoda-ku (JP)

(72) Inventors: Hiroshi Murakami, Toyokawa (JP); Jun Kunioka, Okazaki (JP); Koichi Amiya, Kawaguchi (JP); Yukina Hisada, Toyokawa (JP); Tomokazu Kato, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/224,098

(22) Filed: Mar. 25, 2014

(65) Prior Publication Data

US 2014/0293338 A1 Oct. 2, 2014

(30) Foreign Application Priority Data

Mar. 26, 2013 (JP) ................................. 2013-063291

(51) Int. Cl.
*G06F 3/0486* (2013.01)
*G09G 5/32* (2006.01)
(Continued)

(52) U.S. Cl.
CPC ....... *H04N 1/00413* (2013.01); *G06F 3/0485* (2013.01); *G06F 3/0488* (2013.01);
(Continued)

(58) Field of Classification Search
CPC ........ G06F 3/0485; G06F 2203/04806; H04N 1/00469
(Continued)

(56) References Cited

U.S. PATENT DOCUMENTS 5,847,706 A * 12/1998 Kingsley ............... G06F 3/0481
715/788
6,473,102 B1 * 10/2002 Rodden ................. G06F 3/0481
715/781
(Continued)

FOREIGN PATENT DOCUMENTS

JP H04-243422 A 8/1992
JP H10-198330 A 7/1998
(Continued)

OTHER PUBLICATIONS

Office Action (Notification of Reason(s) for Refusal) dated Mar. 24, 2015, by the Japanese Patent Application No. 2013-063291, and a partial English Translation of the Office Action. (4 pages).

Primary Examiner — Marcellus J Augustin
(74) Attorney, Agent, or Firm — Buchanan Ingersoll & Rooney PC

(57) ABSTRACT

A device for causing a display unit to partially display a screen having a scroll region in which a content is scrolled and an operation region is provided. The device includes: a setting portion that sets a target region which is a part of the screen displayed by the display unit; a change instructing portion that instructs the setting portion to change the target region based on operation on the operation region; a determination portion that judges, when the setting portion changes the target region, whether or not a size of the operation region of the target region is smaller than a set value; a display change portion that causes the setting portion to perform processing of increasing the operation region displayed by the display unit; and a generating portion that generates section screen data representing a content in the target region.

31 Claims, 46 Drawing Sheets

(51) Int. Cl.
*G09G 5/34* (2006.01)
*H04N 1/00* (2006.01)
*G06F 3/0485* (2013.01)
*G06F 3/0488* (2013.01)

(52) U.S. Cl.
CPC ..... *H04N 1/00411* (2013.01); *H04N 1/00464* (2013.01); *H04N 1/00469* (2013.01); *G06F 2203/04806* (2013.01); *H04N 2201/001* (2013.01); *H04N 2201/0074* (2013.01)

(58) Field of Classification Search
USPC ...... 345/671–688, 214, 1.2–9; 358/1.1–3.29, 358/1.11–1.18; 715/795–818, 828–833, 715/856–863
See application file for complete search history.

(56) References Cited

U.S. PATENT DOCUMENTS

| | | | |
|---|---|---|---|
| 2001/0012017 A1* | 8/2001 | Watanabe | G09B 29/106 345/619 |
| 2006/0277489 A1 | 12/2006 | Maehiro et al. | |
| 2006/0290678 A1* | 12/2006 | Lii | G06F 3/0485 345/173 |
| 2010/0199214 A1* | 8/2010 | Mikawa | G06F 3/0481 715/800 |
| 2011/0252363 A1* | 10/2011 | Tsuda | G06F 3/0483 715/788 |
| 2012/0072839 A1 | 3/2012 | Ogino et al. | |
| 2012/0144331 A1* | 6/2012 | Tolonen | G06F 3/0484 715/769 |
| 2013/0044341 A1 | 2/2013 | Uchino | |
| 2013/0167070 A1* | 6/2013 | Tsuda | G06F 3/04845 715/785 |

FOREIGN PATENT DOCUMENTS

| | | |
|---|---|---|
| JP | 2001-290574 A | 10/2001 |
| JP | 2002-063020 A | 2/2002 |
| JP | 2002-244635 A | 8/2002 |
| JP | 2004-192573 A | 7/2004 |
| JP | 2005-189674 A | 7/2005 |
| JP | 2006-331037 A | 12/2006 |
| JP | 2010-278967 A | 12/2010 |
| JP | 2012-068816 A | 4/2012 |
| JP | 2012-168621 A | 9/2012 |
| JP | 2012-208636 A | 10/2012 |
| JP | 2013-041519 A | 2/2013 |

* cited by examiner (A)

SHIFT DISPLAY TARGET REGION TO LEFT (B)

(A)

SHIFT DISPLAY TARGET REGION DOWNWARD (B)

(A)

REDUCE DISPLAY MAGNIFICATION
(INCREASE DISPLAY TARGET REGION)

(B)

(A)

⇩ REDUCE SCROLL REGION TO ONLY UPPER PART THEREOF (B)

(A)

⬇ DISPLAY BUTTON FOR POSITION SHIFT (B)

DEVICE FOR GENERATING DISPLAY DATA, INFORMATION DEVICE, AND DISPLAY SYSTEM FOR DISPLAYING SCROLL REGION AND OPERATION REGION

This application is based on Japanese patent application No. 2013-063291 filed on Mar. 26, 2013, the contents of which are hereby incorporated by reference.

BACKGROUND OF THE INVENTION

1. Field of the Invention

The present invention relates to a display data generating device for selectively displaying a part of an operating screen, an information device, and a display system.

2. Description of the Related Art

Multi-functional Peripherals (MFPs) known as information equipment for business use are provided with a display on which an operating screen (image for operation) is displayed, and a touch-sensitive panel functioning as an operation input means. The touch-sensitive panel herein is a touchpad pointing device to be placed on a display in use. The display is operable to selectively display a plurality of predetermined operating screens depending on operation. The surface of the touch-sensitive panel functions both as a display surface on which an operating screen is displayed and as a touch-sensitive surface on which a user performs operation.

Some operating screens displayed in an MFP have a scroll region in which an image is scrolled for display. For example, an operating screen for a user to make settings for facsimile communication operation has a scroll region in which a list of records of communication destinations is displayed. As for an operating screen in which a user selects a desired function from among many functions, select buttons which cannot be displayed at one time on the display surface are scrolled for display in a scroll region.

Meanwhile, in portable information devices such as a smartphone and a tablet personal computer, the variety of touch gestures detected in a touch-sensitive panel is wide. The touch gestures made by using one finger or pen include: "Tap" which is a most common gesture of briefly touching one position of the surface of the entry screen; "Hold" which is a gesture of touching one position of the surface of the entry screen for extended period of time; and operation of sliding the finger or pen over the surface without losing contact therefrom (hereinafter, the operation being refereed to as "slide"). The slide gesture includes "flick" which is a gesture of quickly brushing the surface with the fingertip or pen; and "drag (also called swipe in some cases)" which is a gesture of moving the finger or pen over the touch-sensitive surface. The "flick" gesture is made to give a command for scroll display. The "drag" gesture is made to give a command for moving an icon or a specific region in the screen.

A conventional technology related to scroll display is disclosed in Japanese Laid-open Patent Publication No. 2006-331037. According to a car navigation system described in the document, when a cursor is located in a scroll region where a map is displayed, the map is scrolled through in accordance with direction key operation with a numeric "1" key inputted. In the system, the cursor is moved within the entire region of a display surface in accordance with direction key operation with the numeric "1" key not inputted.

Another technology is proposed for automatically changing the layout of a screen displayed on a display unit in accordance with the size of the display unit. There is disclosed an example of automatic conversion in which the size of a screen for displaying a list of a plurality of letter strings is reduced along the letter string direction to fit in a small display unit, and a scroll bar is provided to enable scroll display in the letter string direction (Japanese Laid-open Patent Publication No. 2010-278967).

A part of an operating screen for MFP is sometimes displayed in the entire surface of a display surface. For example, in a system in which a portable information device (hereinafter, referred to as a "portable terminal") is used as an external operating panel for MFP, only a part of an operating screen is displayed in the portable terminal. The reason is as follows: The portable terminal has a display smaller than that of the MFP, and reducing the size of the entirety of the operating screen makes it difficult to make a touch gesture on the display of the portable terminal. When an enlarged display mode is designated in the operating panel of the MFP, a part of the operating screen is enlarged to fit in the operating screen and displayed.

When only a part of the operating screen is displayed as discussed above, it is necessary to display hidden parts of the operating screen in accordance with user operation. The slide gesture such as flick or drag is preferable as operation by a user to give a command to change a display target region of the operating screen. The slide gesture is often made by a user of a portable terminal.

As the user performs a slide gesture of touching the display surface on which the display target region is displayed to move the touch point, the position of the display target region in the operating screen is changed depending on the direction and distance of the movement. Changing the position of the display target region involves shifting the operating screen with respect to the display surface. Thus, changing the position of the display target region is sometimes referred to as "screen position shift" in the description provided below.

In the meantime, in displaying an operating screen having a scroll region, a display target region includes the entire or a part of the scroll region in some cases. In such a case, even if a user performs a slide gesture of touching the scroll region to move the touch point with the intention to give a screen position shift command, and if the slide direction corresponds to a scroll direction, the screen position shift is not performed, and instead, scroll display is made despite the user's intention. Accordingly, when the scroll region occupies the entirety of the display target region, the user cannot give a screen position shift command via a slide gesture.

In order to address the problem, the technology described in Japanese Laid-open Patent Publication No. 2006-331037 is applicable. To be specific, a slide gesture made in the scroll region is determined to be operation for giving a screen position shift command or operation for giving a scroll display command depending on whether or not specific key operation is performed. Combining the slide gesture with key operation, however, makes the operation procedure complicated. This loses gesture consistency for operation, which possibly prevents a user from performing intuitive operation.

The present disclosure has been achieved in light of such an issue, and therefore, an object of an embodiment of the present invention is to prevent, in displaying a part of an operating screen having a scroll region, a situation in which a command to shift a displayed part in the operating screen cannot be given through operation of designating a position on a display surface.

SUMMARY

According to an embodiment of the present invention, a data generating device for causing a display unit to partially display a screen having a scroll region in which a content is scrolled and an operation region other than the scroll region is provided. The data generating device includes a setting portion configured to set a target region which is a part of the screen displayed by the display unit; a change instructing portion configured to instruct, in a state where the display unit displays the target region which is set to contain at least a part of the operation region, when operation of designating a position in the operation region of the target region and shifting the position designated is performed, the setting portion to change the target region in the screen; a determination portion configured to judge, when the setting portion changes the target region in accordance with a command given by the change instructing portion, whether or not a size of the operation region of the target region is equal to or greater than a set value; a display change portion configured to, when the determination portion judges that the size of the operation region of the target region is not equal to or greater than the set value, cause the setting portion to perform display change processing of increasing the operation region displayed by the display unit; and a generating portion configured to generate section screen data representing a content in the target region.

These and other characteristics and objects of the present invention will become more apparent by the following descriptions of preferred embodiments with reference to drawings.

DESCRIPTION OF THE PREFERRED EMBODIMENTS

Figure 1:
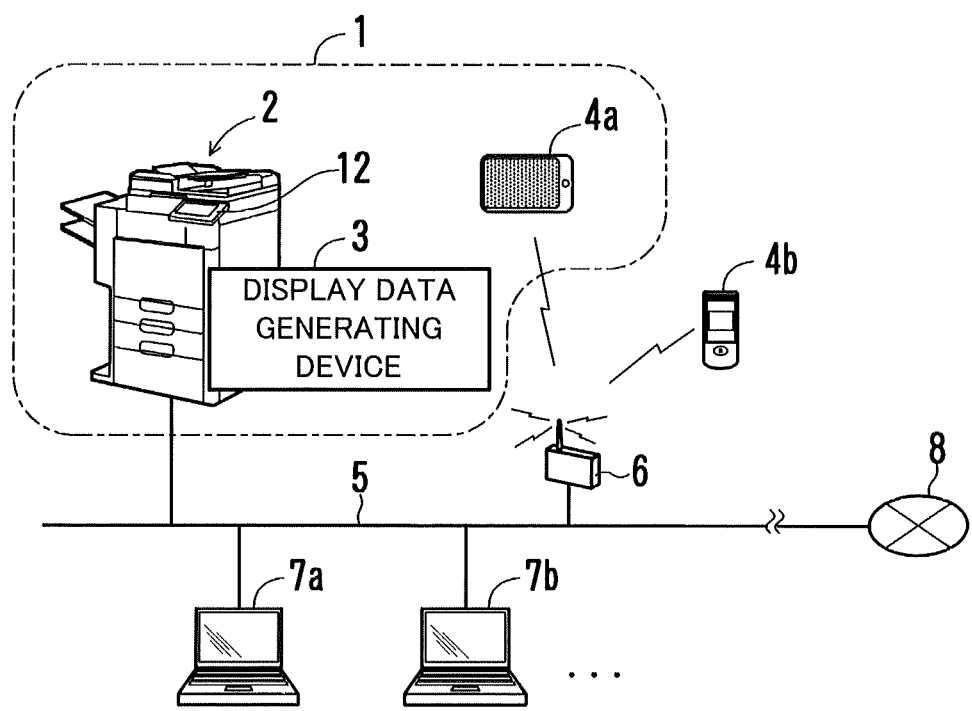
FIG. 1 is a diagram showing an example of the configuration of a display system including a display data generating device according to an embodiment of the present invention.

FIG. 1 shows an example of a display system 1 according to an embodiment of the present invention. The display system 1 is configured of an MFP 2 which is a composite information device, at least one portable terminal 4a, and so on. The MFP 2 is provided with a display data generating device 3 for generating screen data which is displayed for operation of the MFP 2.

The MFP 2 is connected to a Local Area Network (LAN) 5, and is capable of performing communication with personal computers 7a and 7b, and other external devices. Such external devices are, for example, the portable terminals 4a and 4b which are portable information devices such as a smartphone and a tablet PC. For communication between the MFP 2 and the portable terminals 4a and 4b, an access point 6 conforming to the Wireless Local Area Network (WLAN) standards is used. Instead of this, the communication therebetween may be performed via another interface conforming to another standard such as Bluetooth (registered trademark) or Universal Serial Bus (USB).

The MFP 2 has a web browser installed therein as one application for expanding the use of the MFP 2. A user of the MFP 2 browses, in an operating panel 12, a Web page over the Internet 8 connected to the MFP 2 via the LAN 5. The operating panel 12 is provided on the upper part of the front face of the MFP 2.

The MFP 2 has a function to enable a user to perform remote operation of using the portable terminals 4a and 4b as external operating panels. The function enables users of the portable terminals 4a and 4b to display, thereon, an operating screen which appears as a user interface (UI) on the operating panel 12 of the MFP 2. The MFP 2 is informed of operation on the operating screens displayed in the portable terminals 4a and 4b. The MFP 2 then executes a job given through the operation on the operating screens.

Figure 2:
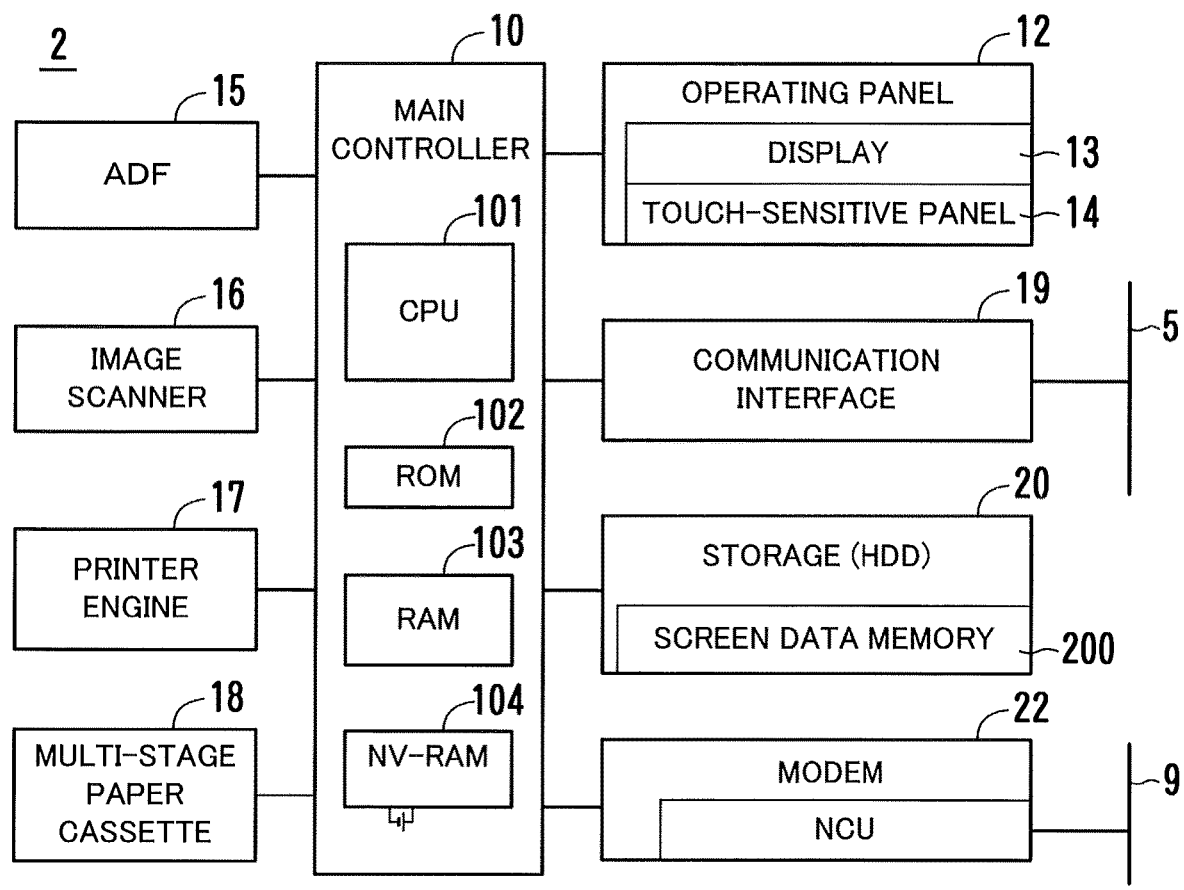
FIG. 2 is a diagram showing an example of the hardware configuration of an MFP operating as a display data generating device.

Referring to FIG. 2, the MFP 2 is configured of an Auto Document Feeder (ADF) 15, an image scanner 16, a printer engine 17, a communication interface 19, a storage 20, a modem 22, and so on. The MFP 2 can therefore be used as a copier, a printer, a network scanner, a facsimile machine, a document server, and so on.

In the case of copying, image input, or facsimile transmission, the ADF 15 feeds a document sheet to a scan position of the image scanner 16. The image scanner 16 optically reads image information recorded on the document sheet. The printer engine 17 is operable to print, through electrophotography, a monochrome or color image onto a single side or both sides of paper supplied from a multi-stage paper cassette 18.

The communication interface 19 connects the MFP 2 to the LAN 5. The storage 20 is a hard disk drive (HDD) or another mass storage device. The storage 20 is used as a medium for storing programs and data for control. The storage 20 has a screen data memory 200 for storing therein components images used to generate an operating screen. The data and programs stored in the storage 20 are loaded, if necessary, into a work area where programs are executed. The modem 22 is provided with a Network Control Unit (NCU) and is used for facsimile communication via a public telephone line 9.

The operating panel 12 is provided with a display 13 and a touch-sensitive panel 14. The display 13 is, for example, a liquid crystal panel, and is operable to display an operating screen in accordance with a command from a main controller 10. The touch-sensitive panel 14 detects a touch gesture on a display surface of the display 13 and outputs a signal indicating the position of a touch point. The touch-sensitive panel 14 is a project-type capacitive touch-sensitive panel having multi-touch capabilities.

The main controller 10 serves to control an overall operation of the MFP 1. The main controller 10 has a Central Processing Unit (CPU) 101 functioning as a computer for executing a control program and a variety of applications, a Read Only Memory (ROM) 102 for storing the control program therein, a Random Access Memory (RAM) 103 used as a work area for program execution, a battery-packed Non-Volatile memory (NV-RAM) 104 for storing therein setting data necessary for control, and so on.

Figure 3:
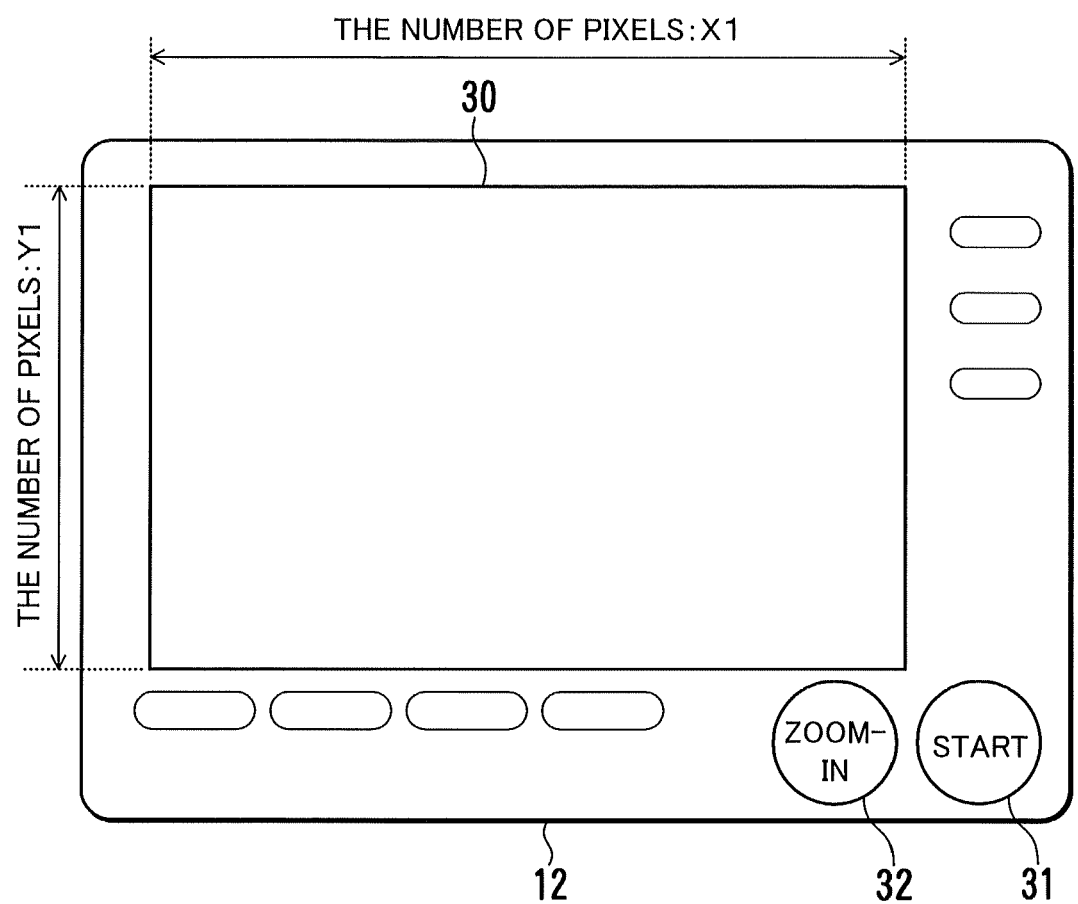
FIG. 3 is a diagram showing an example of the appearance of an operating panel of an MFP.

FIG. 3 shows an example of the appearance of the operating panel 12. The operating panel 12 has a display surface 30 which also functions as a touch-sensitive surface to receive touch gestures, and a zoom-in key 32. It is supposed that, as an example of a resolution of the display surface 30, a concrete value of the number of pixels X1 in the horizontal (transverse) direction is "1280" and a concrete value of the number of pixels Y1 in the vertical (longitudinal) direction is "800". The zoom-in key 32 is used to give a command to switch between a same size display mode (100% scaling factor) mode and an enlarged display mode which are prepared as display modes of the operating screen. The zoom-in key 32 is provided next to a start key 31 used to give a job execution command, which makes it easy for a user who would like to enlarge a display image.

Figure 4:
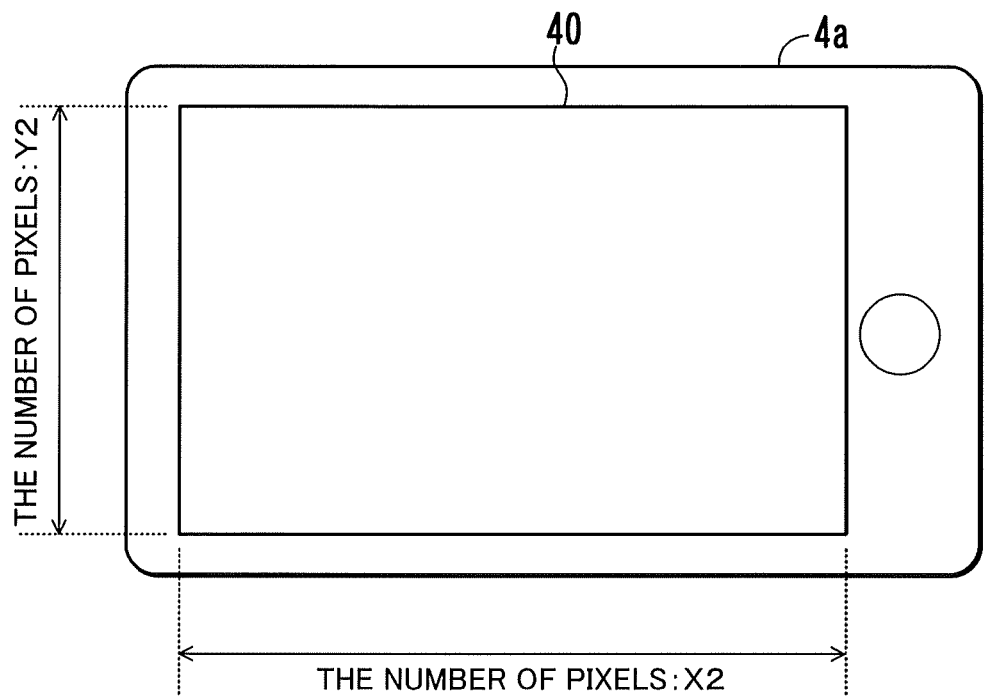
FIG. 4 is a diagram showing an example of the appearance of a portable terminal with which an MFP performs communication.

FIG. 4 shows an example of the appearance of the portable terminal 4a. The portable terminal 4a has a display surface 40 which also functions as a touch-sensitive surface for operation. It is supposed that, as an example of a resolution of the display surface 40, a concrete value of the number of pixels X2 in the long-side direction of the display surface 40 is "640" and a concrete value of the number of pixels Y2 in the short-side direction of the display surface 40 is "400". When the portable terminal 4a is used as an external operating panel, it is assumed that the long side direction is deemed as the transverse direction. In short, the resolution of the display surface 40 of the portable terminal 4a is a half of the resolution of the display surface 30 of the MFP 2 in both the longitudinal direction and the transverse direction. If the display surface 40 has the same pixel size as that in the display surface 30, the display surface 40 has an area which is a quarter of that of the display surface 30.

Figure 5:
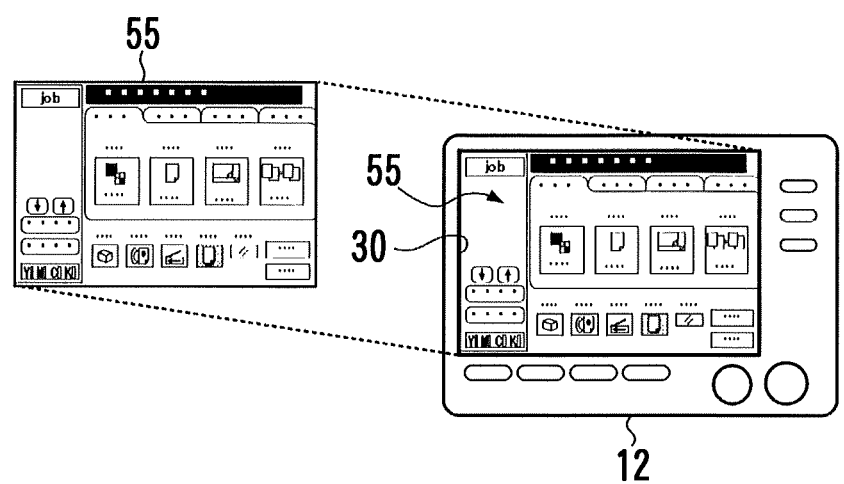
FIG. 5 is a schematic diagram showing an example of normal display on an operating screen of an operating panel of an MFP.

FIG. 5 is a schematic diagram showing an example of normal display on an operating screen 55 of the operating panel 12 of the MFP 2. Many operating screens are designed for operation on the MFP 2 which is used by users in different ways. One of the operating screens is the illustrated operating screen 55. The entirety of each of the operating screens appears on the display surface 30 in a normal display mode, i.e., a same magnification display mode. For screen design, an image size of the operating screen is selected to be substantially the same as the size of the display surface 30.

Figure 6A:
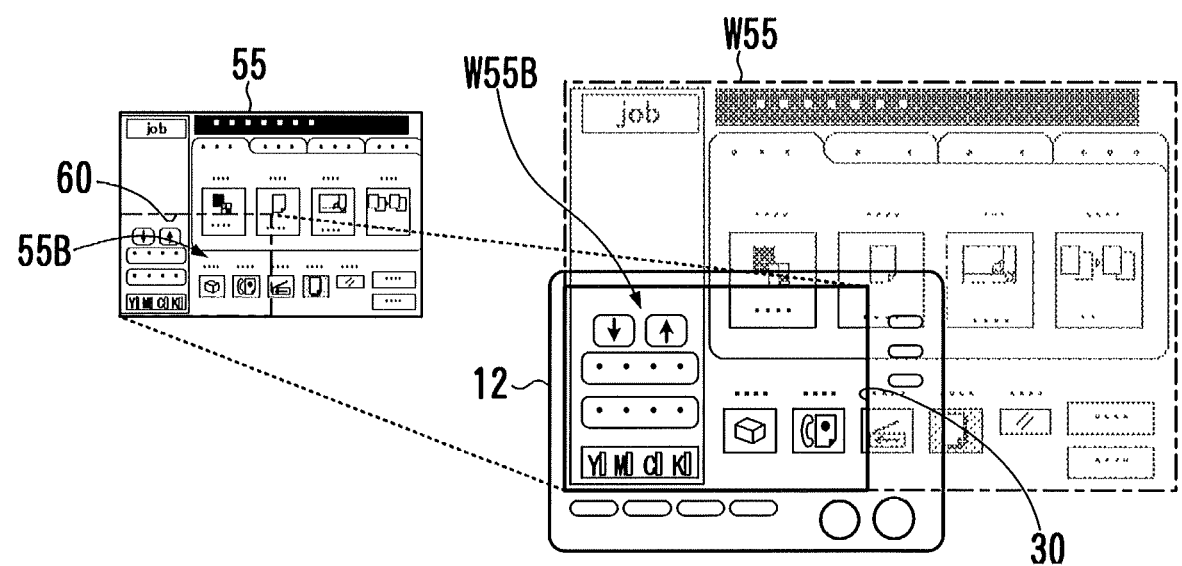
FIG. 6A is a schematic diagram showing an example of enlarged display on an operating screen of an operating panel of an MFP.

FIG. 6A is a schematic diagram showing an example of enlarged display of the operating screen. In the enlarged display mode, a section screen W55B obtained by enlarging a section 55B which corresponds to a display target region 60 and is extracted from the operating screen 55 is displayed on the display surface 30. In a different point of view, such an enlarged display state is a state in which, within an enlarged operating screen W55 which is obtained by enlarging the original operating screen 55 at a predetermined scaling factor and is virtually laid out on the rear of the display surface 30, only a part overlapping the display surface 30 appears on the display surface 30.

Figure 6B:
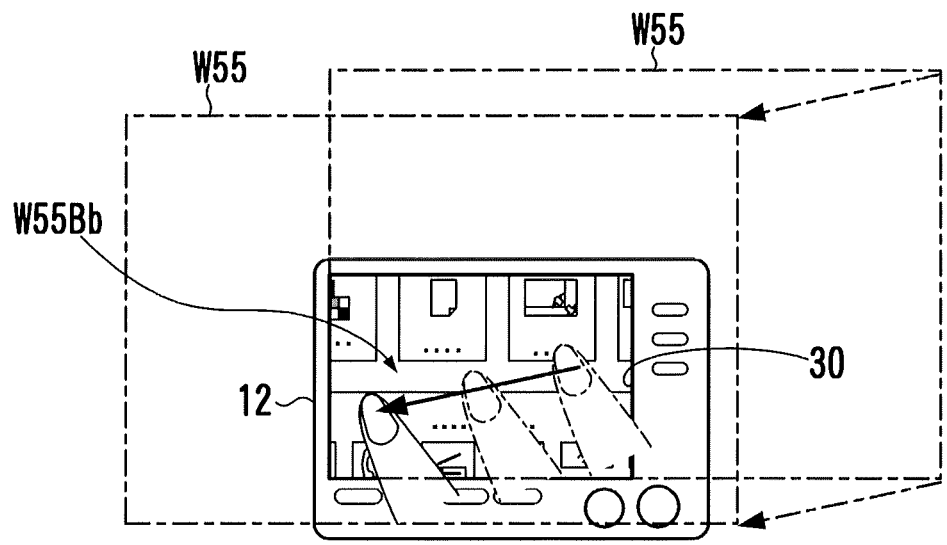
FIG. 6B is a schematic diagram showing an example of screen position shift in an operating screen of an MFP.

FIG. 6B is a schematic diagram showing an example of screen position shift in the operating panel 12. In a state where only a part of the operating screen 55 appears in the entirety of the display surface 30, the user cannot see the other part (hidden part) of the operating screen 55 in the display surface 30. Even if a message is laid out in the hidden part, the user cannot realize the existence of the message. Likewise, even if an operation button is provided in the hidden part, the user cannot touch the operation button. The user therefore performs screen position shift operation, if necessary, for changing a part appearing in the display surface 30.

As the screen position shift operation, a slide gesture on the display surface 30 is defined. The slide gesture may be flick or drag. The user touches the display surface 30, for example, with a finger (pen or pen-like tool may be used instead of the finger) and moves the touch point without losing contact from the display surface 30. Due to the slide gesture, the display surface 30 and an imaginary enlarged operating screen W55 move relatively to each other. Referring to FIG. 6B, a slide gesture of moving the finger slightly downwardly from right to left is made. Due to this, the enlarged operating screen W55 moves slightly downwardly from right to left with respect to the display surface 30. The relative movement in FIG. 6B corresponds to change in position of the display target region 60 shown in FIG. 6A in which the display target region 60 is shifted slightly upwardly from left to right in the original operating screen 55 of FIG. 6A. A section screen W55Bb corresponds to the display target region 60 after the position change is made.

Figure 7A:
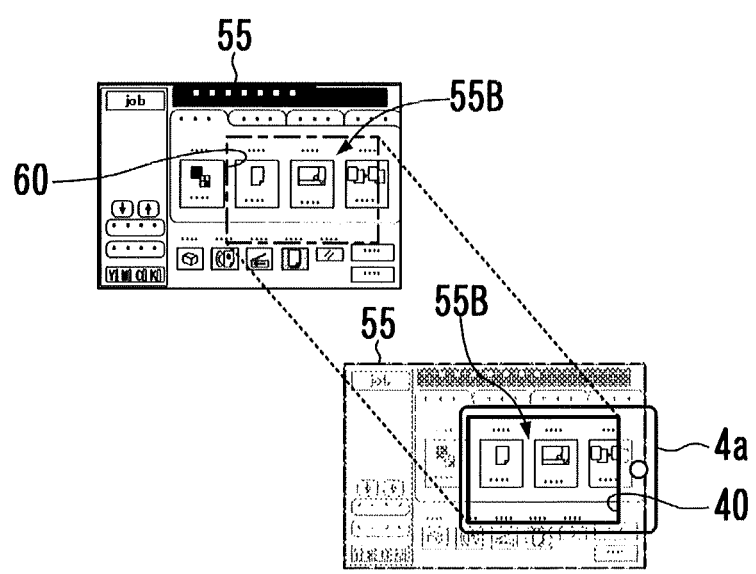
FIGS. 7A-7C are schematic diagrams showing an example of display and screen position shift on an operating screen of a portable terminal.

FIG. 7A is a schematic diagram showing an example of display on the operating screen 55 of the portable terminal 4a. With the portable terminal 4a, a section screen 55B corresponding to a display target region 60 of the operating screen 55 appears on the display surface 40. In a different point of view, the display state shown in FIG. 7A is a state in which, of the operating screen 55 virtually laid out on the rear of the display surface 40, only a part overlapping the display surface 40 appears on the display surface 40.

Figure 7B:
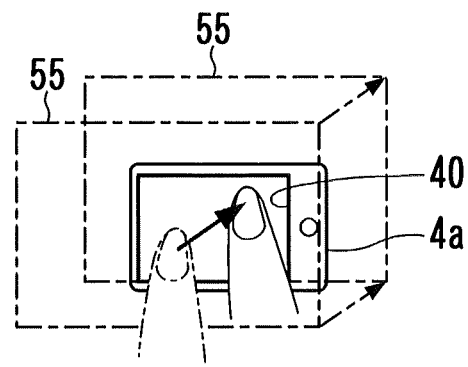
Figure 7C:
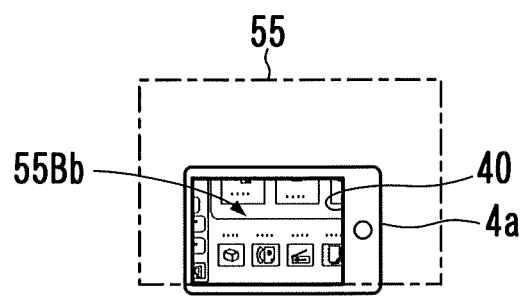

FIG. 7B is a schematic diagram showing an example of steps of screen position shift in the portable terminal 4a. FIG. 7C is a schematic diagram showing an example of the display state after the screen position shift is made. When a slide gesture is made on the display surface 40 as shown in FIG. 7B, the display surface 40 and the operating screen 55 virtually laid out move with respect to each other. Referring to FIG. 7B, a slide gesture of moving the finger from left to upper right is made. In association with this5 the operating screen 55 is moved from left to upper right with respect to the display surface 40. The relative movement in FIG. 7B corresponds to change in position of the display target region 60 from right to lower left in the operating screen 55. A section screen 55Bb in FIG. 7C corresponds to the display target region 60 after the position change is made.

FIGS. 8A-8D show an example of an operating screen having a scroll region. In all of operating screens 51, 52, 53, and 54 shown in FIGS. 8A-8D, a slide gesture in a scroll region in a scroll direction is defined as the scroll operation. As with the foregoing screen position shift operation, either one of flick and drag is valid as the scroll operation.

Figure 8A:
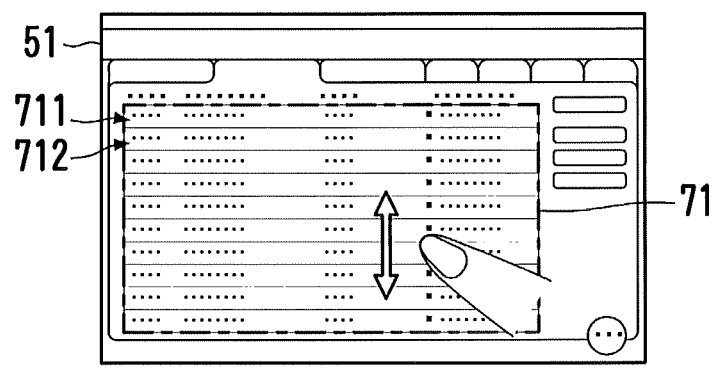
FIGS. 8A-8D are diagrams showing an example of an operating screen having a scroll region.

An operating screen 51 of FIG. 8A is used to select a destination for facsimile transmission or another data communication. In a scroll region 71 which is a part of the operating screen 51, a registered destination list is displayed in which records of destination information are provided in many lines including lines 711 and 712. When destinations whose number is greater than the number of lines that can be provided in the scroll region 71 are registered in the destination list, the scroll region 71 is scrolled through to change lines to be displayed in accordance with scroll operation. As indicated by the hollow arrow line of FIG. 8A, the scroll direction is the up-down direction of the drawing (hereinafter, sometimes referred to as the longitudinal direction).

Figure 8B:
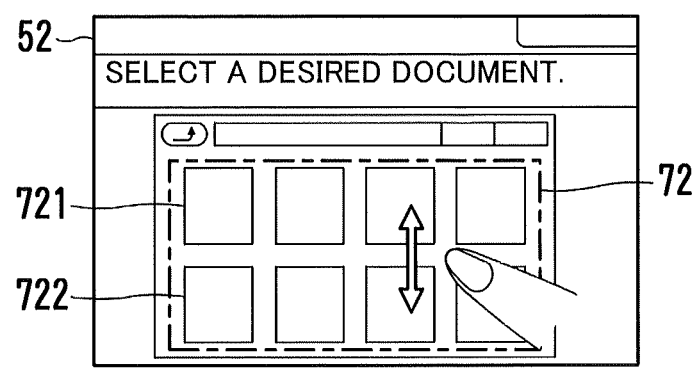

An operating screen 52 of FIG. 8B is used to select a document which is saved in a memory region called a box in the storage 20 and for which processing (printing, transmission, deletion, and so on) is to be performed. In a scroll region 72 which is a part of the operating screen 52, many icons including icons 721 and 722 are displayed. The icons correspond to documents saved in the memory region. When documents whose number is greater than the number of icons that can be provided in the scroll region 72 are saved, the scroll region 72 is scrolled through to change icons to be displayed in accordance with scroll operation. The scroll direction is the up-down direction of the drawing.

Figure 8C:
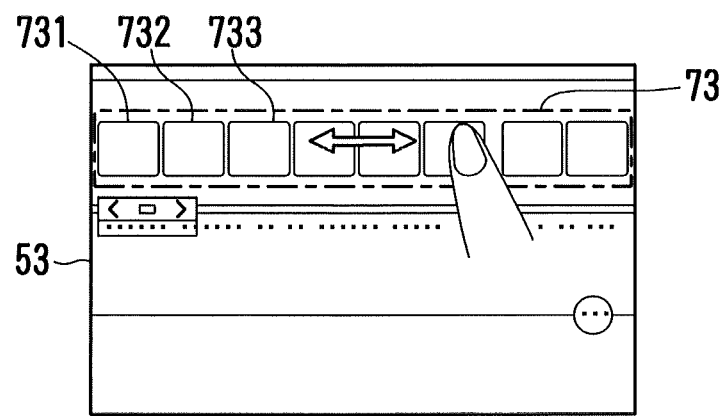

An operating screen 53 of FIG. 8C is used to select a function item of operation settings based on which a job to be executed by the MFP 2 is determined. In a band-like scroll region 73 extending in the right-left direction to the entire length of the operating screen 53, a plurality of icons including icons 731, 732, and 733 is displayed side-by-side. The icons represent options for function items. Because the total number of options is greater than the number of icons that can be provided in the scroll region 73, the scroll region 73 is scrolled through to change icons to be displayed in response to scroll operation. The scroll direction in this example is the right-left direction of the drawing (hereinafter, sometimes referred to as the transverse direction).

Figure 8D:
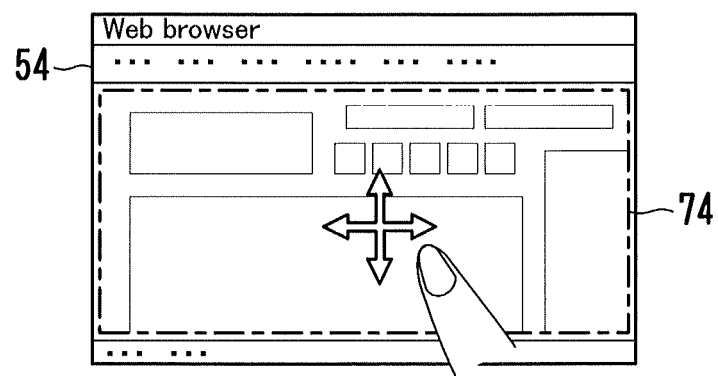

An operating screen 54 of FIG. 8D is used for Web browsing. In a scroll region 74 which is a part of the operating screen 54, a Web page is displayed. When a Web page having a size larger than that of the scroll region 74 is displayed, the scroll region 74 is scrolled through in response to scroll operation. The scroll direction is the up-down direction and the right-left direction of the drawing.

As discussed above in these examples, when a part of an operating screen having a scroll region is displayed on the display surface 30 of the MFP 2 or the display surface 40 of the portable terminal 4a, the display data generating device 3 performs processing for automatically changing what is displayed. The processing ensures, on the display surface 30 and the display surface 40, a region within which a slide gesture by a user is received as the screen position shift operation.

Figure 9:
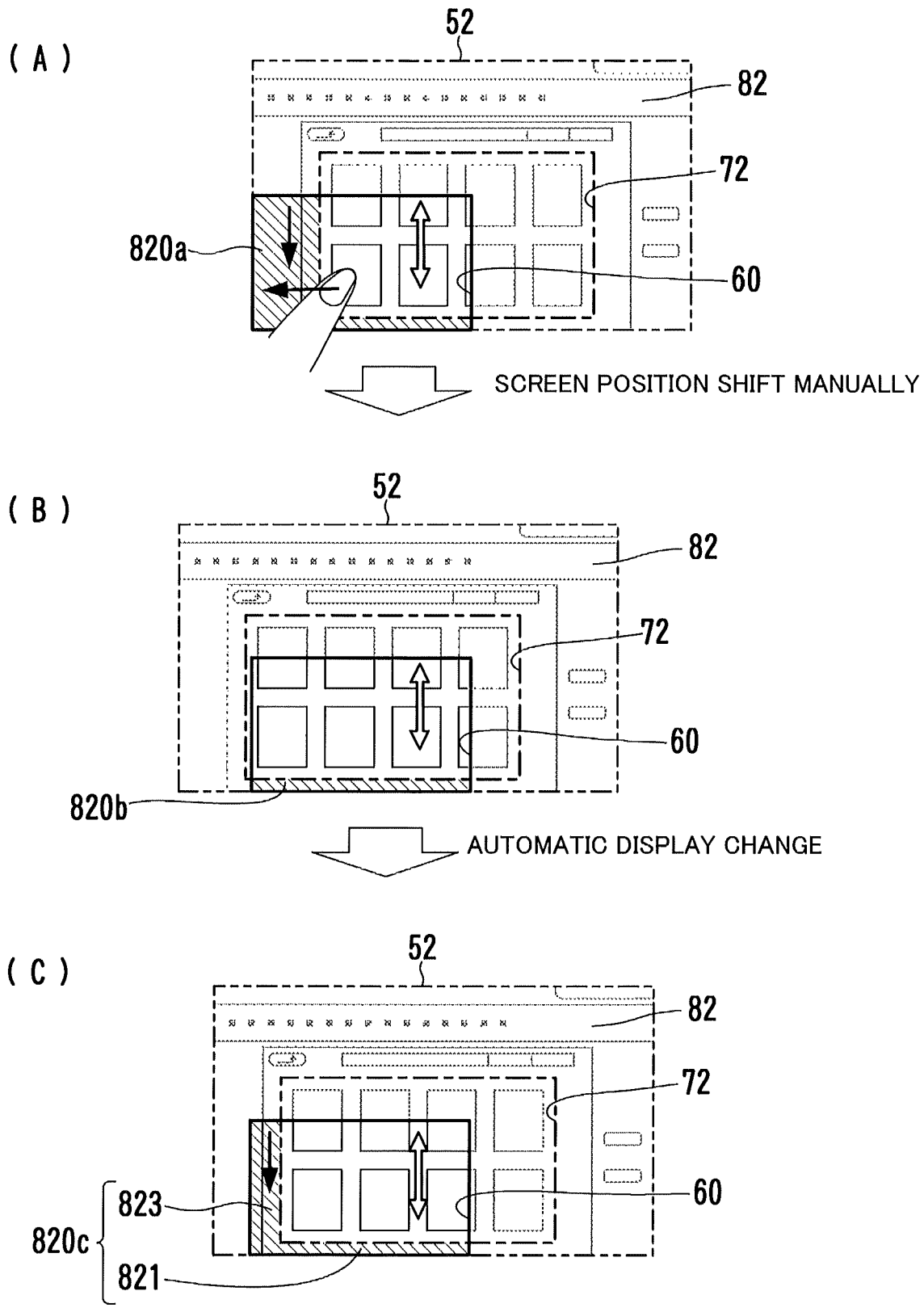
FIG. 9 is a diagram showing an example of automatic display change implemented by a display data generating device.

FIG. 9 is a diagram showing an example of automatic display change implemented by the display data generating device 3. In (A) of FIG. 9, a state is shown in which a user intends to perform screen position shift operation. In (B) of FIG. 9, a state is shown in which screen position shift was made in response to user operation. Stated differently, the state of (B) of FIG. 9 is a display state before the automatic display change is performed. In (C) of FIG. 9, a state is shown in which the automatic display change was performed.

Referring to (A) of FIG. 9, a lower left region of the operating screen 52 is a display target region 60. The operating screen 52 includes a scroll region 72 and a screen position shift operation region 82 therearound. The screen position shift operation region 82 is referred to as a "non-scroll region" for the sake of convenience. The display target region 60 has a part of the scroll region 72 and a part of the non-scroll region 82. In the display target region 60, a non-scroll region 820a, which is a part of the non-scroll region 82, is hatched.

In the state shown in (A) of FIG. 9, in order to give a command to perform screen position shift in the right-left direction, the user preferably makes a slide gesture in the right-left direction at any position in the display target region 60. Since the scroll direction is the up-down direction, the slide gesture in the right-left direction corresponds to the screen position shift operation independent of whether or not the slide gesture is made within the scroll region 72. On the other hand, in order to give a command to perform screen position shift in the up-down direction, the user needs to make a slide gesture in the up-down direction at a position within the non-scroll region 820a. This is because the slide gesture in the up-down direction within the scroll region 72 corresponds to scroll operation.

In the state shown in (A) of FIG. 9, the display target region 60 is positioned on the left side and the lower side of the operating screen 52. Stated differently, the operating screen 52 is shifted, with respect to the display target region 60, to the rightmost in the right-left direction and to the topmost in the up-down direction. Therefore, slide gestures valid as the screen position shift operation are limited to a slide gesture from right to left and a slide gesture from top to bottom.

For example, when the user makes a slide gesture from right to left, what is displayed is changed from the state shown in (A) of FIG. 9 to the state shown in (B) of FIG. 9 in which the operating screen 52 is moved to left. In (B) of FIG. 9, a non-scroll region 820b of the display target region 60 is a region which is a lower part of the scroll region 72 and is a part elongated in the right-left direction.

In (B) of FIG. 9, the user can also give a command to perform screen position shift in the right-left direction. Since the non-scroll region 820b is small in the up-down direction, it is difficult to give a command to perform screen position shift in the up-down direction. Even if the user makes a slide gesture in the up-down direction with the intention of giving a command to perform screen position shift, the slide gesture is erroneously deemed as the scroll operation in many cases.

To cope with this, the display data generating device 3 modifies the display content to make it easy for the user to give a command to perform screen position shift in the up-down and right-left directions. Such modification is immediately reflected in display on the display surface 30 and the display surface 40. In short, from the standpoint of the user, the display on the screen is automatically changed.

As shown in (C) of FIG. 9, in the display state after the automatic change, the display target region 60 has a non-scroll region 820c which is larger than the non-scroll region 820b in (B) of FIG. 9. The non-scroll region 820c has a part 821 provided below the scroll region 72 and a part 823 provided in the left of the scroll region 72. The presence of the part 823 provided in the left side means that the display target region 60 is moved to left in the operating screen 52.

The non-scroll region 820c extends to the entire length of the display target region 60 in the up-down direction. This enables the user to make a slide gesture in the up-down direction in the non-scroll region 820c. Therefore, the user can easily give a command to perform screen position shift in the up-down direction which is the same direction as the scroll direction.

The description goes on to the details of the configuration and operation of the display system 1 with a focus on the display data generating device 3.

Figure 10:
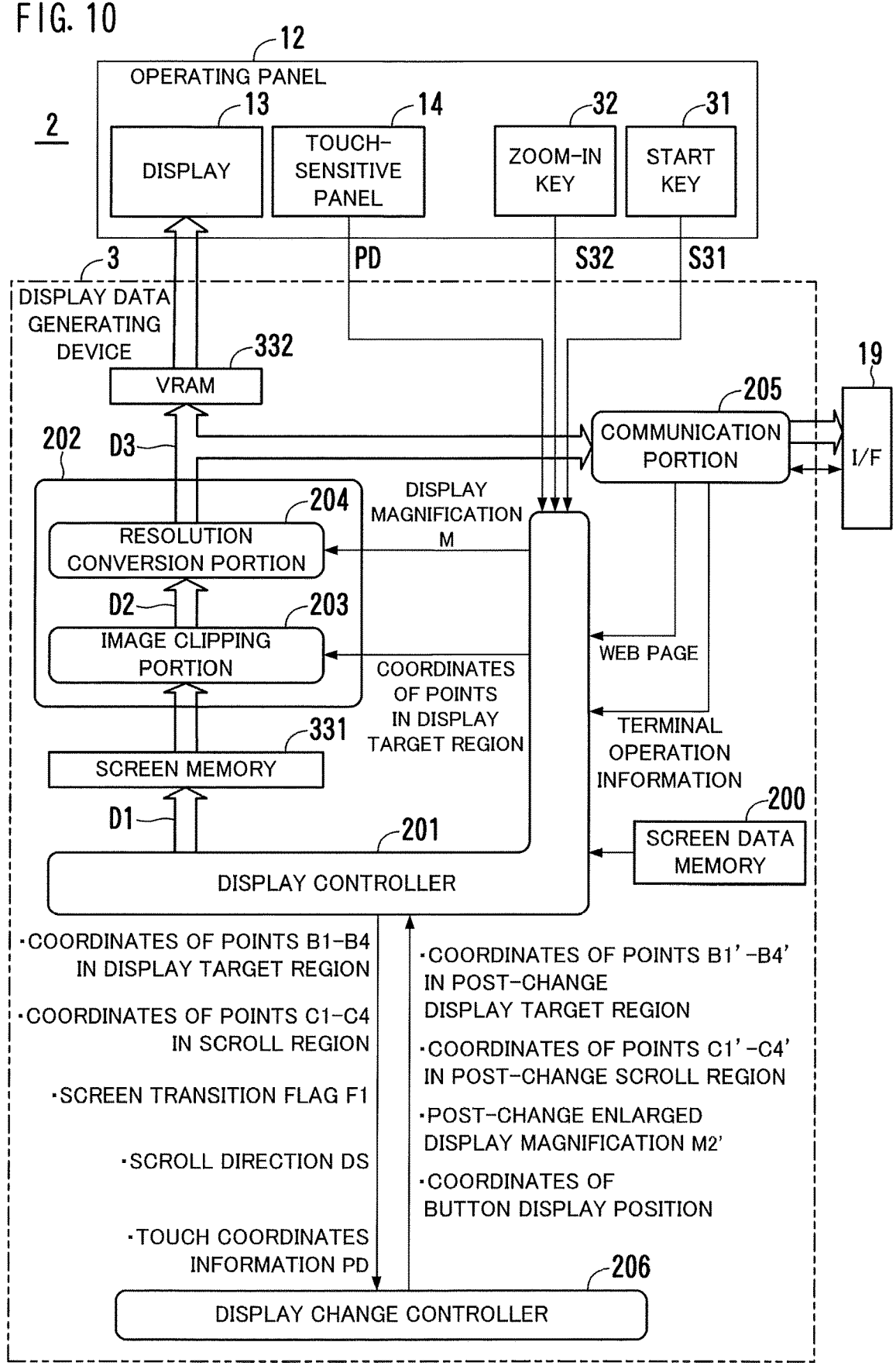
FIG. 10 is a diagram showing an example of the functional configuration of a display data generating device.

FIG. 10 is a diagram showing an example of the functional configuration of the display data generating device 3. The display data generating device 3 generates, for operation of the MFP 2, data to be displayed in the operating panel 12 of the MFP 2 or in the portable terminal 4a functioning as an external operating panel.

As shown in FIG. 10, the display data generating device 3 includes a display controller 201, an image clipping portion 203, a resolution conversion portion 204, a communication portion 205, and a display change controller 206. These portions are functional elements implemented in response to execution of a predetermined control program by the CPU 101 of the main controller 10. By virtue of the display change controller 206, when a part of an operating screen having a scroll region is displayed, the display data generating device 3 is capable of outputting data for display in which screen position shift operation is easily performed.

The display controller 201 generates screen data D1 representing an operating screen to be displayed on the display 13 by combining components images obtained from the screen data memory 200. In generating an operating screen for Web browsing, a Web page inputted from the communication portion 205 is incorporated into the screen data D1. The screen data D1 thus generated is written into the screen memory 331.

The display controller 201 receives inputs of a signal S31 and a signal S32 indicating that the start key 31 and the zoom-in key 32 are pressed respectively, and also receives an input of touch coordinates information PD from the touch-sensitive panel 14. The display controller 201 determines a user command based on the touch coordinates information PD, and updates the screen data D1 in accordance with the user command. In a mode where only a part of an operating screen having a scroll region is displayed, the display controller 201 works in conjunction with the display change controller 206 to implement the foregoing automatic display change.

The image clipping portion 203 reads out a part of screen data D1 from the screen memory 331, and sends the part of screen data D1 as section screen data D2 to the resolution conversion portion 204. The part of screen data D1 read out by the image clipping portion 203 corresponds to a part of the display target region set by the display controller 201 of the operating screen represented based on the screen data D1. The image clipping portion 203 is given coordinates of the display target region from the display controller 201. In the same magnification display mode, the display target region occupies the entirety of the operating screen. The image clipping portion 203 therefore sends the entirety of the screen data D1 to the resolution conversion portion 204.

The resolution conversion portion 204 performs, on the section screen data D2, resolution conversion processing for making an image size of a section screen represented based on the section screen data D2 equal to a size of the display surface 30 of the display 13. The conversion ratio for resolution conversion depends on a display magnification portion M given from the display controller 201. For example, when a value of the display magnification portion M is set at 2, the resolution conversion portion 204 performs resolution conversion so as to double the number of pixels in the horizontal direction and the number of pixels in the vertical direction. In the same magnification display mode, a value of the display magnification portion M is set at 1, and the resolution conversion portion 204 outputs the section screen data D2 as is.

The image clipping portion 203 and the resolution conversion portion 204 constitute a section screen generating portion 202. The section screen generating portion 202 generates section screen data D3 that is a part of the screen data D1 generated by the display controller 201, and corresponds to a section screen displayed by the display 13. The section screen data D3 generated by the section screen generating portion 202 is expanded on a Video RAM (VRAM) 332, and read out from the VRAM 332 at predetermined timing. The section screen is displayed by the display 13. At this time, the VRAM 332 functions as an output portion to output the section screen data D3 to the display 13. When the portable terminal 4a is connected to the MFP 2 as an external operating panel, the section screen generating portion 202 transfers the section screen data D3 through the communication portion 205 to the portable terminal 4a. In such a case, the communication portion 205 serves as an output portion to output the section screen data D3 to the portable terminal 4a. When a device having a small display, e.g., the portable terminal 4a, is used as an external operating panel, the enlarged display mode is set as the display mode irrespective of whether or not the zoom-in key 32 is pressed.

The communication portion 205 serves to send and receive data with an external device through the communication interface 19. The communication portion 205 sends the section screen data D3 to the portable terminal 4a, and receives, from the portable terminal 4a, terminal operation information indicating operation performed in the portable terminal 4a. Examples of the external device, which is the other party of communication, are the portable terminal 4a and a Web server connected to the MFP 2 through the LAN 5. In the case where the MFP 2 is used for Web browsing, the communication portion 205 receives Web page data from a Web server based on a Hypertext Transfer Protocol (HTTP) or other protocols. The terminal operation information and the Web page data received by the communication portion 205 are conveyed to the display controller 201.

The display change controller 206 is a constituent element to implement automatic display change which is useful for the case where only a part of an operating screen having a scroll region is displayed. The display change controller 206 obtains, from the display controller 201, information indicating display state and operation state, and determines whether or not to perform automatic display change. If it is determined that the automatic display change is necessary, coordinates information for specifying post-change display state is sent to the display controller 201.

The automatic display change according to this embodiment includes: "position shift of display target region"; "change in display magnification (change in size of display target region)"; "reduction in scroll region"; and "display of operational button for screen position shift". A plurality of modes corresponding thereto is defined as options for processing settings. A user and an administrator of the MFP 2 can select a desired mode for automatic display change.

Figure 11:
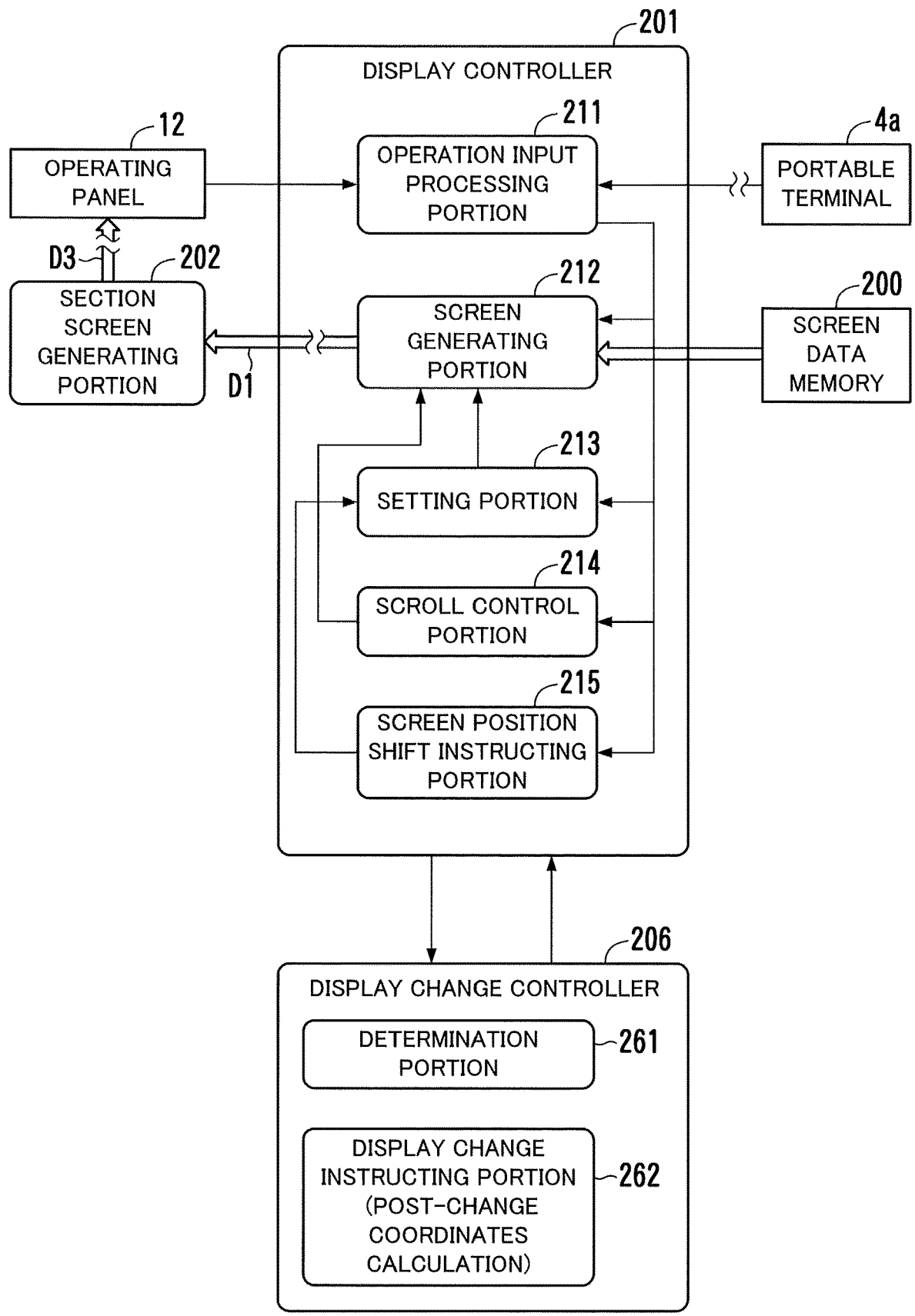
FIG. 11 is a diagram showing an example of the detailed configuration of the principal part of a display data generating device.

FIG. 11 shows the detailed configuration of the display controller 201 and the display change controller 206 of the display data generating device 3.

With the display controller 201, the operation input processing portion 211 determines operation performed by the user based on inputs to the operating panel 12 and the portable terminal 4a. The result of determination is conveyed to a functional element which performs processing according to the result. The setting portion 213 informs the screen generating portion 212 for generating screen data D1 of coordinates of a display target region. When screen transition operation for giving a command to switch between an operating screen currently displayed and another operating screen is performed, the setting portion 213 sets, as a display target region, a part of the operating screen. When the display change controller 206 makes a request to change the position or size of the display target region, the setting portion 213 responds to the request.

The scroll control portion 214 of the display controller 201 causes the screen generating portion 212 to change what is displayed in the scroll region in response to scroll operation. In short, the screen generating portion 212 is caused to provide a scrolled display. The screen position shift instructing portion 215 causes the setting portion 213 to change the position of the display target region in accordance with the screen position shift operation by the user.

The display change controller 206 includes a determination portion 261 and a display change instructing portion 262. When the setting portion 213 sets a new display target region in connection with the screen transition, or, alternatively, when the setting portion 213 changes the position of a display target region in accordance with the screen position shift operation, the determination portion 261 determines whether or not the size of a non-scroll region in the display target region is equal to or greater than a preset value. If the determination portion 261 determines that the size of the non-scroll region in the display target region is not equal to or greater than the preset value, then the display change instructing portion 262 performs display change processing of giving a change command to the setting portion 213 or the screen generating portion 212 to expand the non-scroll region on the display surface.

Figure 12:
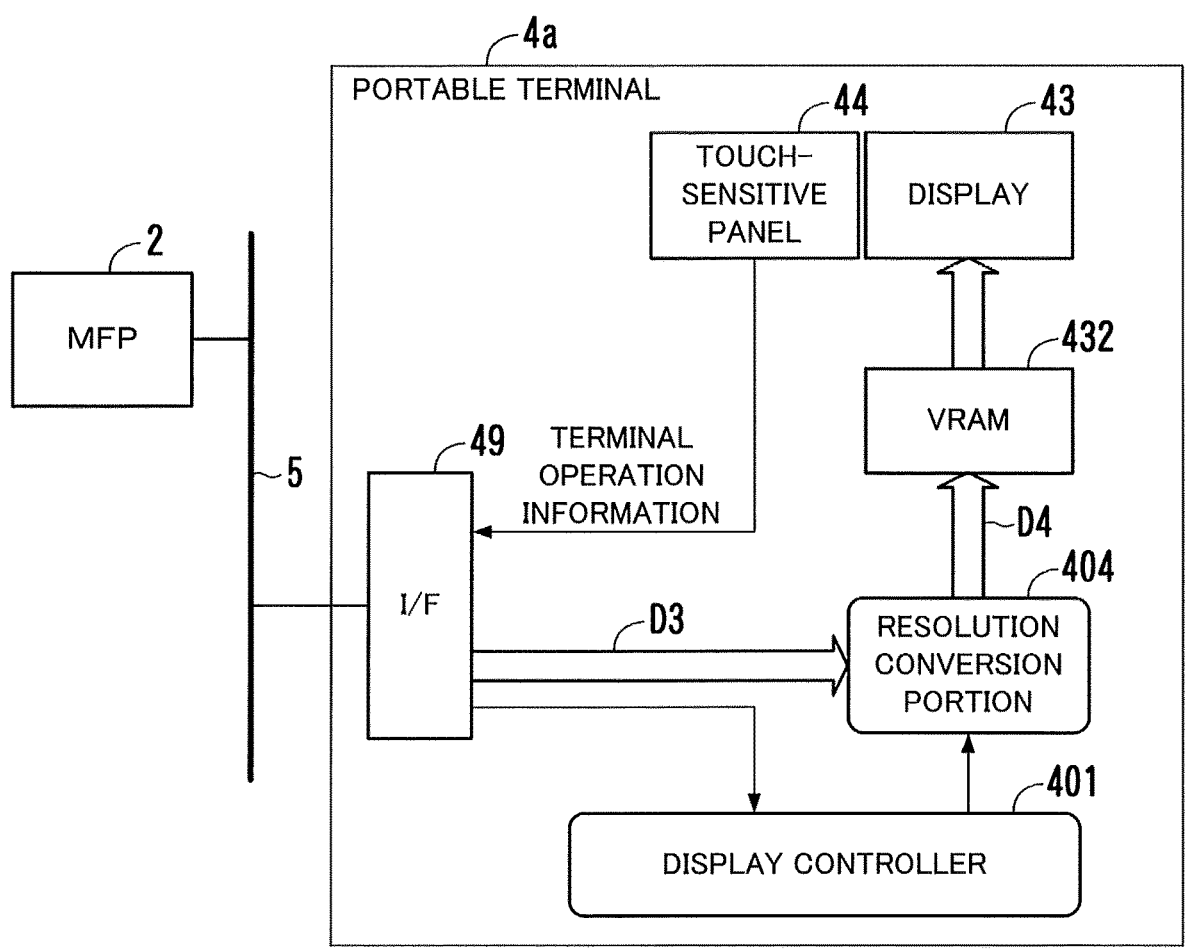
FIG. 12 is a diagram showing an example of structural elements, of a portable terminal, involved in operation of a display system.

FIG. 12 shows structural elements, of the portable terminal 4a, involved in operation of the display system 1.

In the portable terminal 4a, the section screen data D3 received via the communication interface 49 is input to a resolution re-conversion portion 404. The resolution re-conversion portion 404 converts, in accordance with a command from the display controller 401, the section screen data D3 having a resolution compatible with the display surface of the MFP 2 into section screen data D4 having a resolution compatible with the display 43, and writes the resultant onto a VRAM 432. A section screen expanded on the VRAM 432 appears on the display 43. In response to a touch gesture such as button operation, scroll operation, or screen position shift operation in the portable terminal 4a, touch coordinates information outputted from a touch-sensitive panel 44 provided integrally with the display 43 is sent as the terminal operation information to the MFP 2. The touch coordinates information indicates a touch position on the display surface 40.

Figure 13:
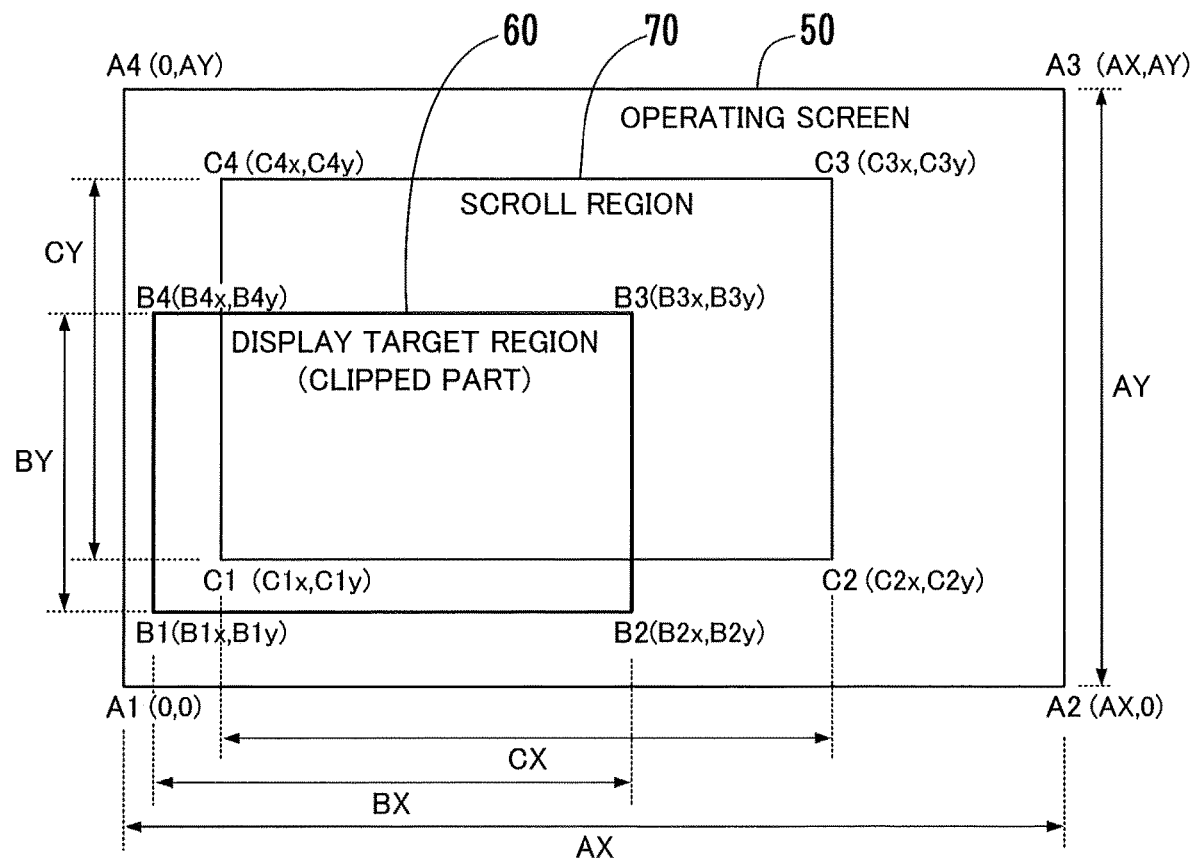
FIG. 13 is a diagram showing an example of coordinates of an operating screen, a display target region, and a scroll region.

FIG. 13 shows an example of coordinates of an operating screen, a display target region, and a scroll region. An operating screen 50 is illustrated as a representative example of operating screens having a scroll region 70. As discussed earlier, in the enlarged display mode, a part of the operating screen 50 is set as the display target region 60.

Any position on the operating screen 50 is represented by coordinates on an XY-rectangular coordinates space of which the origin point is a point A1 on the operating screen 50. The X-axis extends along the right-left direction of the operating screen 50, and the Y-axis extends along the up-down direction thereof. It is supposed that a value of the length (number of pixels) of the operating screen 50 in the right-left direction is denoted by "AX", and a value of the length thereof in the up-down direction is denoted by "AY". In such a case, four points A1, A2, A3, and A4 that are positioned at the bottom left, the bottom right, the top right, and the top left respectively of the operating screen 50 are denoted in the form of coordinates of (0, 0), (AX, 0), (AX, AY), and (0, AY).

The coordinates of four points B1, B2, B3, and B4 of the display target region 60 are denoted by (B1x, B1y), (B2x, B2y), (B3x, B3y), and (B4x, B4y), respectively. It is supposed that a value of the length of the display target region 60 in the right-left direction is denoted by "BX" and a value of the length thereof in the up-down direction is denoted by "BY". In such a case, relationships of the points B1, B2, B3, and B4 in the X and Y coordinates are expressed in the following equations.

$$B2x=B3x=(B1x+BX)$$

$$B4x=B1x$$

$$B4y=B3y=(B1y+BY)$$

$$B2y=B1y$$

The coordinates of four points C1, C2, C3, and C4 in the scroll region 70 are denoted by (C1x, C1y), (C2x, C2y), (C3x, C3y), and (C4x, C4y), respectively. It is supposed that a value of the length of the scroll region 70 in the right-left direction is denoted by "CX" and a value of the length thereof in the up-down direction is denoted by "CY". In such a case, relationships of the points C1, C2, C3, and C4 in the X and Y coordinates are expressed in the following equations.

$$C2x=C3x=(C1x+CX)$$

$$C4x=C1x$$

$$C4y=C3y=(C1y+CY)$$

$$C2y=C1y$$

Figure 14:
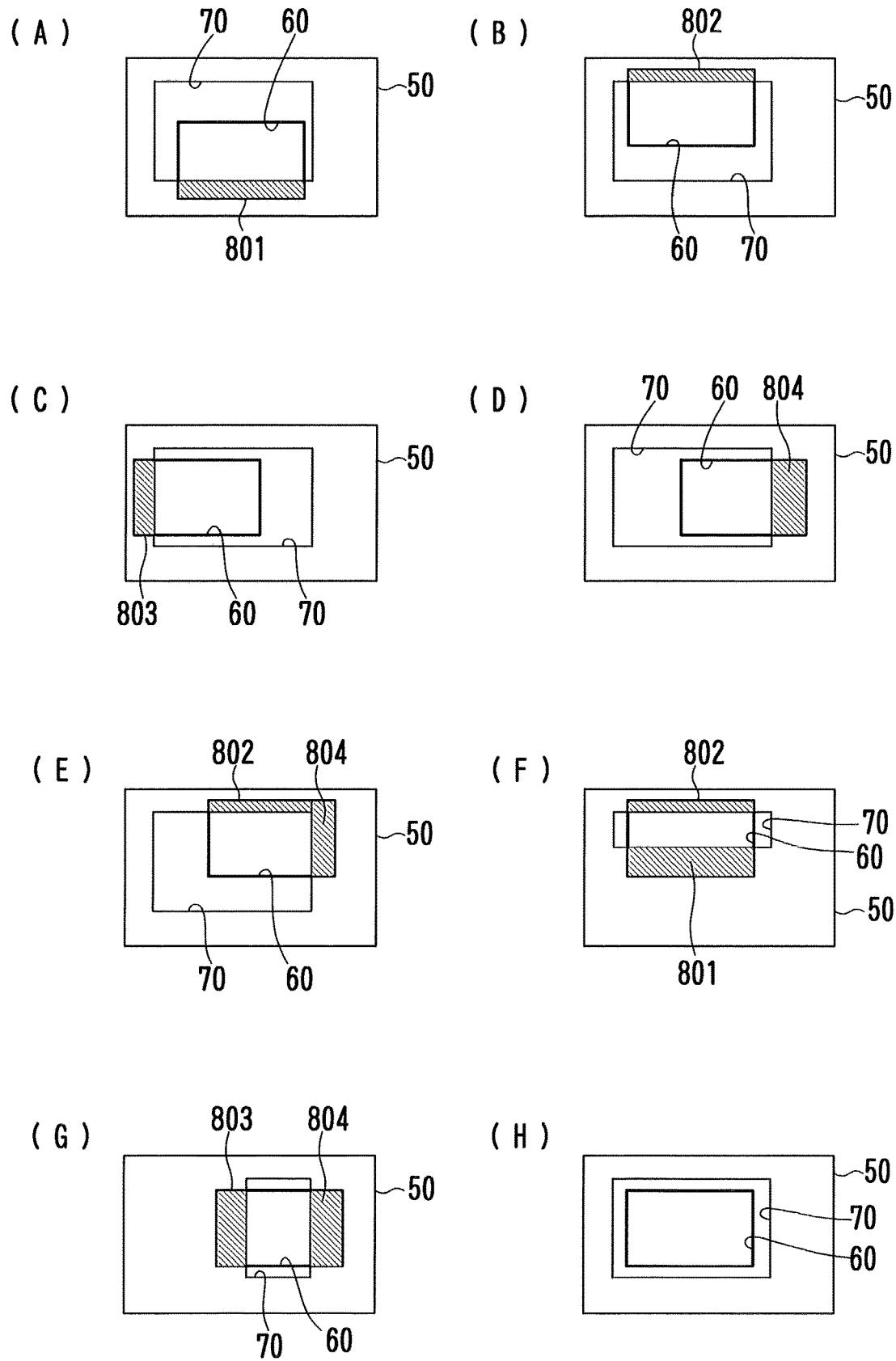
FIG. 14 is a diagram showing examples of a positional relationship between a scroll region and a non-scroll region of a display target region.

FIG. 14 shows examples of a positional relationship between the scroll region 70 and a non-scroll region of the display target region 60. The positional relationship between the scroll region 70 and the display target region 60 changes in response to screen position shift operation performed in a state where the operating screen 50 appears partly. Along with this, the position and size of the non-scroll region in the display target region 60 also changes.

Referring to (A) of FIG. 14, a non-scroll region 801 of the display target region 60 is provided below the scroll region 70. Referring to (B) of FIG. 14, a non-scroll region 802 of the display target region 60 is provided above the scroll region 70. Referring to (C) of FIG. 14, a non-scroll region 803 of the display target region 60 is provided in the left of the scroll region 70. Referring to (D) of FIG. 14, a non-scroll region 804 of the display target region 60 is provided in the right of the scroll region 70.

Referring to (E) of FIG. 14, the display target region 60 includes the non-scroll region 802 provided above the scroll region 70 and the non-scroll region 804 provided in the right of the scroll region 70. Referring to (F) of FIG. 14, the display target region 60 includes the non-scroll region 801 provided below the scroll region 70 and the non-scroll region 802 provided above the scroll region 70. Referring to (G) of FIG. 14, the display target region 60 includes the non-scroll region 803 provided in the left of the scroll region 70 and the non-scroll region 804 provided in the right of the scroll region 70.

Referring to (H) of FIG. 14, the entirety of the display target region 60 corresponds to the scroll region 70. In a state where the display target region 60 has no non-scroll region, the user cannot give a command to perform screen position shift via a slide gesture.

Figure 15:
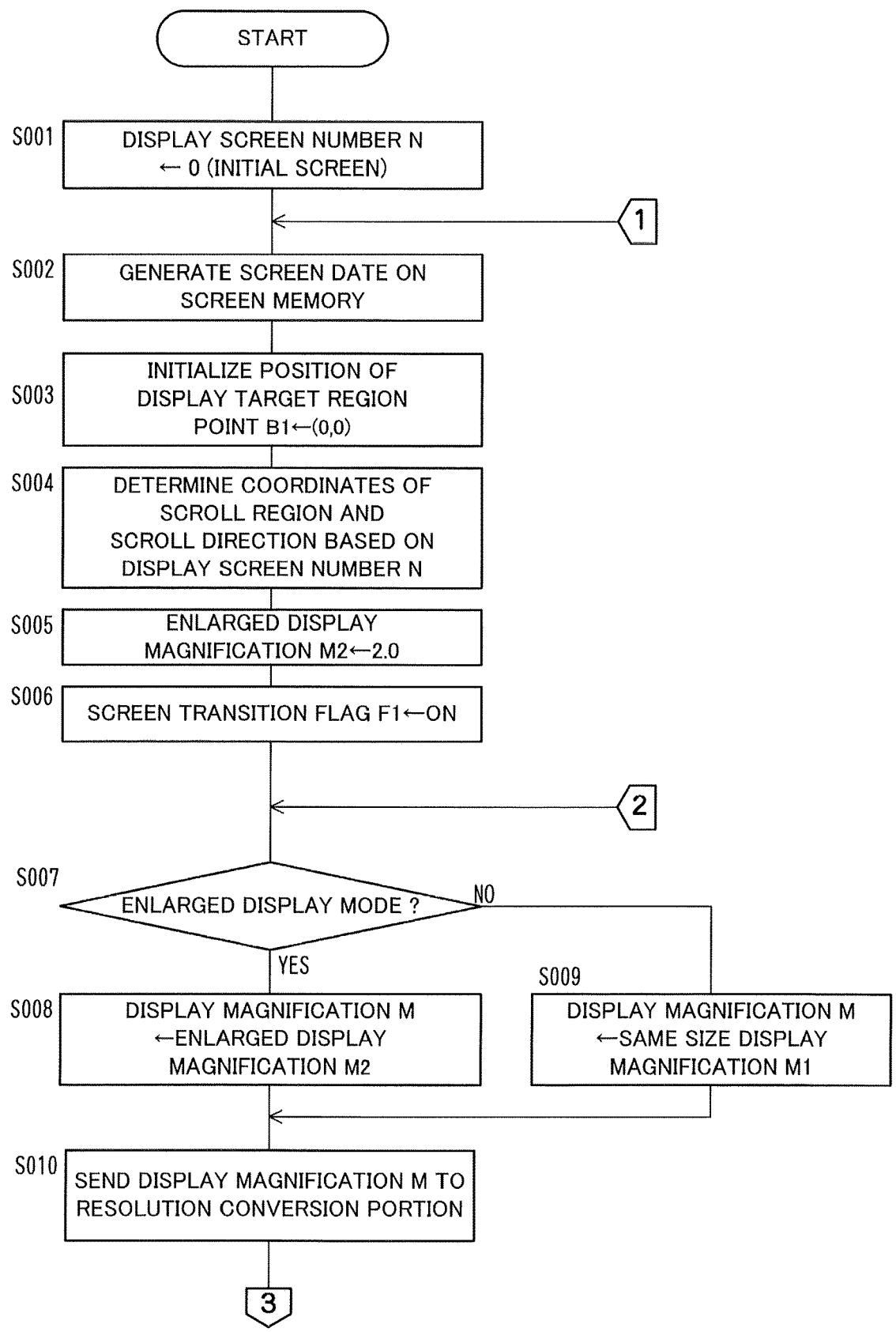
FIG. 15 is a flowchart depicting an example of a first part of the outline of operation by a display data generating device.
Figure 16:
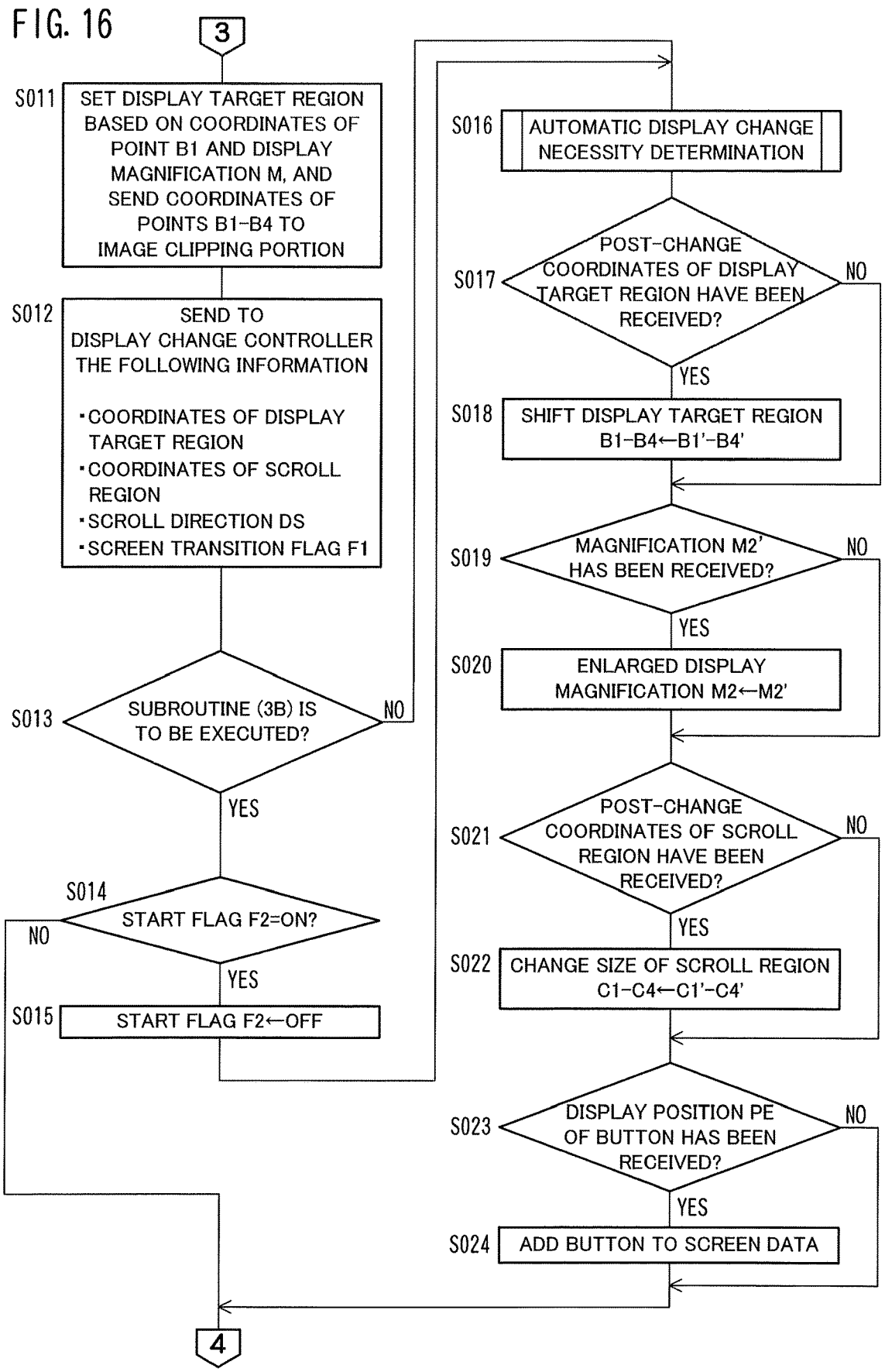
FIG. 16 is a flowchart depicting an example of a second part of the outline of operation by a display data generating device.
Figure 17:
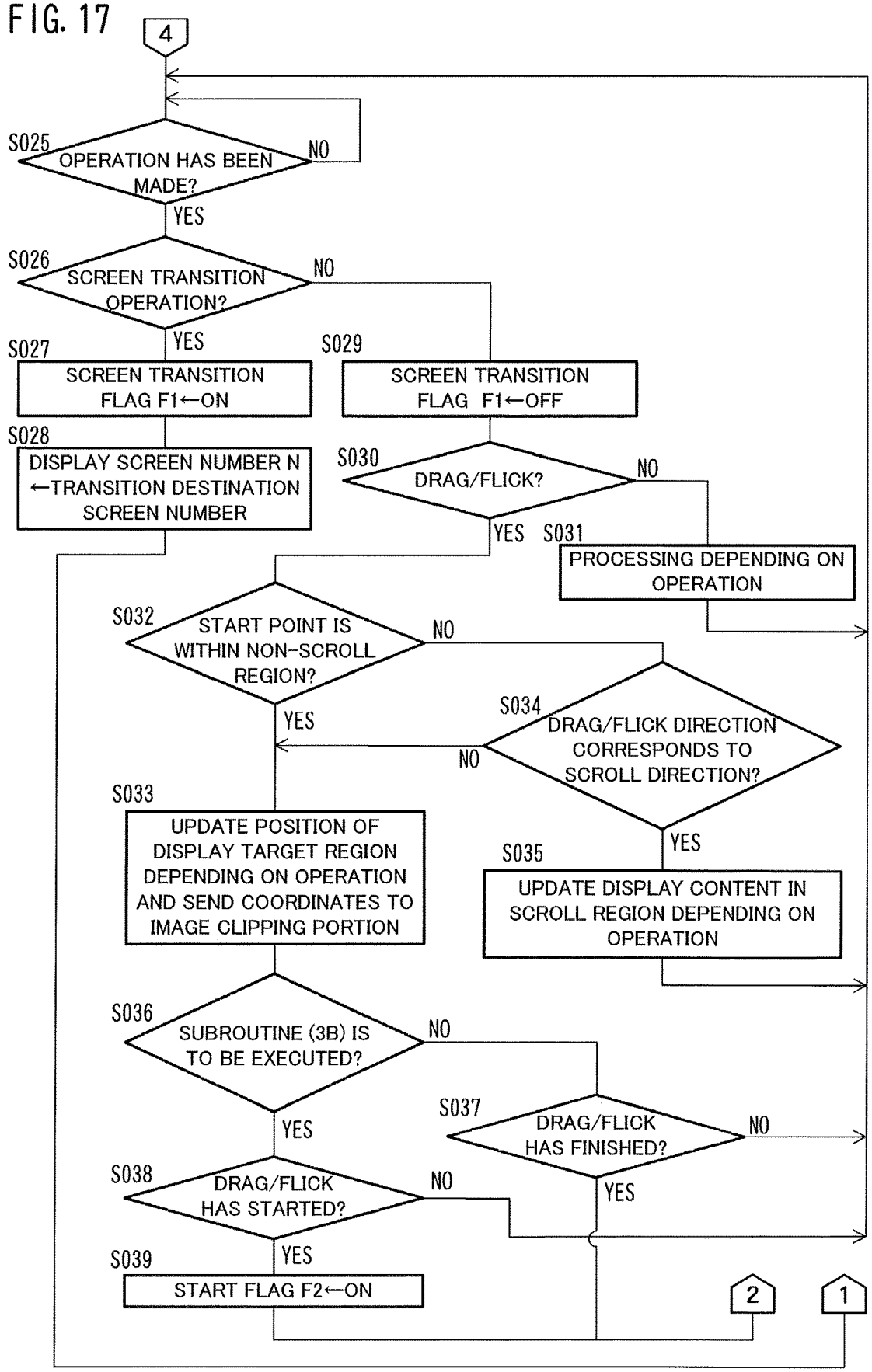
FIG. 17 is a flowchart depicting an example of a third part of the outline of operation by a display data generating device.

FIGS. 15, 16, and 17 show flowcharts depicting an example of operation by the display data generating device 3.

(Step S001 of FIG. 15): When the MFP 2 is turned ON or reset, the display controller 201 sets a value of display screen number N which is a set item indicating an operating screen to be displayed at "0 (zero)". Thereafter, the value of the display screen number N is updated every time when screen transition operation is performed. The screen transition operation is operation responding to which operating screens are switched therebetween. The screen transition operation is, for example, tapping an option button in the operating screen for function selection. When an option button is tapped, what is displayed is changed from the operating screen for function selection to an operating screen for detailed settings of the selected function.

(Step S002): The screen generating portion 212 of the display controller 201 generates another piece of screen data D1 corresponding to an operating screen which is given the same number as the value of the display screen number N, and sends the screen data D1 to the screen memory 331. When the value of the display screen number N is 0, the screen generating portion 212 generates screen data D1 corresponding to an initial screen.

(Step S003 through Step S006): At a time when the screen generating portion 212 generates another piece of screen data D1, the display controller 201 initializes set values for control. To be specific, first, the coordinates of the bottom left point B1 in the display target region 60 are set at (0, 0). Then, among the coordinates and the directions preset for each operating screen, coordinates and direction associated with the current value of the display screen number N are set as the coordinates of the four points C1, C2, C3, and C4, and the scroll direction DS in the scroll region 70. The scroll direction DS is any one of the longitudinal direction, the transverse direction, and the longitudinal/transverse direction. Then, a value of enlarged display magnification M2 that is a display magnification M in the enlarged display mode is set at a normal value of "2.0", and a screen transition flag F1 indicating that screen transition occurs is turned "ON". The screen transition includes switching between operating screens, and change in state from a non-display state at the time of power-ON to a state where the initial screen is displayed.

(Step S007 through Step S010): The display controller 201 checks whether or not the display mode is set at the enlarged display mode. As discussed earlier, the enlarged display mode is set in response to the zoom-in key 32 being pressed, or, at a time when an information device having a display smaller than the display 13 of the operating panel 12, e.g., the portable terminal 4a, is connected as an external operating panel. If the enlarged display mode is currently set, a value of the display magnification M is set at the value of the enlarged display magnification M2 ("2.0" usually). Otherwise, the value of the display magnification M is set at the value of same size display magnification M1 "1.0". The resolution conversion portion 204 is informed of the value of the display magnification M thus set.

(Step S011 of FIG. 16): The setting portion 213 of the display controller 201 sets a display target region 60 based on the coordinates of the point B1 and the value of the display magnification M, and informs the image clipping portion 203 of the coordinates of the points B1-B4. At this time, the size of the display target region 60 is determined based on the display magnification M, and the coordinates of the points B2, B3, and B4 are determined based on the coordinates of the point B1 and the longitudinal and transverse lengths BX and BY. The lengths BX and BY are calculated by operation of dividing the lengths AX and AY of the operating screen having a fixed size by the value of the display magnification M respectively (BX=AX/M, BY=AY/M). For example, when the coordinates of the point B1 is (0, 0) and the value of the display magnification M is "2.0", as shown in the example of (A) of FIG. 6, a lower left part of the operating screen which has a size of one-fourth of the operating screen is set at the display target region 60.

(Step S012): The display controller 201 provides the display change controller 206 with information necessary to determine whether or not automatic display change is necessary. The information provided are coordinates of the display target region 60, coordinates of the scroll region 70, the scroll direction DS, and a status of the screen transition flag F1.

(Step S013 through Step S015): The display change controller 206 checks whether or not a set mode for automatic display change involves executing a necessity determination subroutine (3B) which is described later. If the check result is NO, then the process goes to Step S016. If the check result is YES, then the display change controller 206 checks a status of a start flag F2 indicating that a slide gesture has been started. If the start flag F2 is "ON", then the start flag F2 is turned to "OFF", and then, the process goes to Step S016. If the start flag F2 is "OFF", then the flow goes to Step S025 of FIG. 17.

Stated differently, when a mode involving execution of the necessity determination subroutine (3B) is selected, the processing of Step S016 and the succeeding processing of Step S017 through Step S024 for instructing automatic display change are not performed at a time when a slide gesture has been started. The processing goes to Step S025 of FIG. 17 without the processing of Step S16 through Step S024. Thereby, automatic display change is performed after a predetermined amount of time, e.g., approximately 0.3 seconds to 1 second, has elapsed since the slide gesture has been started, which enables the user to know a display state before the automatic display change.

(Step S016): The display change controller 206 performs processing of automatic display change necessity determination routine. In the routine, whether or not automatic display change is necessary is determined based on the information provided by the display controller 201. When it is determined that automatic display change is necessary, the display change controller 206 informs the display controller 201 of the content to be changed, and requests the same to change the indication on the display.

(Step S017 through Step S018): When receiving designation of post-change coordinates of the display target region 60 from the display change controller 206, the setting portion 213 of the display controller 201 changes the coordinates of the points B1, B2, B3, and B4 accordingly. Hereinafter, in order to distinguish post-change from pre-change in drawings, the reference signs of post-change constituent elements are given the mark "'". The change in coordinates is immediately notified to the image clipping portion 203. The resolution conversion portion 204 outputs section screen data D3 corresponding to a post-change display target region 60'. This automatically changes indication on a display of either one or both of the MFP 2 and the portable terminal 4a.

(Step S019 through Step S020): When receiving designation of the enlarged display magnification M2 from the display change controller 206, the display controller 201 changes the value of the enlarged display magnification M2 accordingly. The change in magnification is immediately notified to the setting portion 213 and the section screen generating portion 202. The resolution conversion portion 204 outputs section screen data D3 corresponding to the post-change display target region 60'. This automatically changes indication on a display of either one or both of the MFP 2 and the portable terminal 4a.

(Step S021 through Step S022): When receiving designation of post-change coordinates of the scroll region 70 from the display change controller 206, the display controller 201 changes the coordinates of the points C1, C2, C3, and C4 of the scroll region 70 accordingly. The change in coordinates is immediately notified to the screen generating portion 212, and screen data D1 is generated which corresponds to a post-change operating screen obtained by reducing the scroll region 70 of the operating screen currently displayed. The resolution conversion portion 204 outputs section screen data D3 corresponding to the display target region 60 having coordinates which retain unchanged even after the operating screen has been changed. This automatically changes indication on a display of either one or both of the MFP 2 and the portable terminal 4a.

(Step S023 through Step S024): When receiving designation of a display position PE of an operational button from the display change controller 206, the screen generating portion 212 of the display controller 201 generates screen data D1 corresponding to a post-change operating screen in which an operational button for screen position shift operation is added to the operating screen currently displayed. The resolution conversion portion 204 outputs section screen data D3 corresponding to the display target region 60 having coordinates which retain unchanged even after the operating screen has been changed. This automatically changes indication on a display of either one or both of the MFP 2 and the portable terminal 4a.

After the foregoing processing from Step S016 through Step S024, the process goes to Step S205 of FIG. 17. The processing from Step S025 through Step S039 of FIG. 17 relates to operation for changing the indication on a display in accordance with manual operation by a user.

(Step S025): The display controller 201 waits for the user to make a touch gesture. Once a touch gesture is made, the process goes to Step S026.

(Step S026 through Step S028): When screen transition operation such as tapping a button to invoke a predetermined operating screen is performed, the display controller 201 turns the screen transition flag F1 "ON", and updates the value of the display screen number N with a value of the number given to an operating screen which is set as a transition destination. After that, the process goes back to Step S002 of FIG. 15, and a series of the processing after Step S002 discussed above is performed on the operating screen corresponding to the updated display screen number N.

(Step S029 through Step S031): When a touch gesture other than the screen transition operation is made, the display controller 201 turns the screen transition flag F1 "OFF", and checks whether or not the touch gesture thus made is a slide gesture. The slide gesture this time is drag or flick. When a touch gesture other than the slide gesture is performed, the display controller 201 performs processing depending on the operation performed in Step S031. For example, when the user taps a line 712 in the operating screen 51 of (A) of FIG. 8, the display controller 201 gives, as the destination designation information, information for identifying the line 712 to a communication control portion (not shown).

(Step S032 through Step S035): When a slide gesture is made, the display controller 201 checks whether or not the start point of the slide gesture is within a non-scroll region of the display target region 60. If the start point is within the non-scroll region, then the setting portion 213 performs processing for screen position shift. To be specific, the setting portion 213 updates the position of the display target region 60 in accordance with the operation, and informs the image clipping portion 203 of coordinates of the post-update points.

If the start point of the slide gesture is not within the non-scroll region, i.e., if the start point is in the scroll region, it is checked whether or not the slide direction corresponds to the scroll direction DS. If the slide gesture is made in a direction different from the scroll direction DS with the start point being within the scroll region, then the process goes from Step S034 to Step S033, and the setting portion 213 performs processing for screen position shift.

On the other hand, if the slide gesture is made in a direction corresponding to the scroll direction DS with the start point being within the scroll region, then the display controller 201 generates screen data D1 in which the content of display in the scroll region 70 of the operating screen 50 is updated. After that, the process goes back to Step S025. Thereby, the process periodically goes to Step S035 while the scroll operation is performed, and the content of display in the scroll region 70 is repeatedly updated. In short, the screen is scrolled through.

(Step S036 through Step S039): After the process for screen position shift is performed in Step S033, the display controller 201 checks whether or not the current mode involves executing the necessity determination subroutine (3B). If the check result is YES, then it is further checked whether or not the present time point corresponds to a slide gesture start time point at which drag or flick has just started. If the check result is NO, then whether or not the detected drag or flick has finished. Stopping moving the touch point or releasing the touch means that the drag or flick has finished.

When the present time point corresponds to the slide gesture start time point, the display controller 201 turns the start flag F2 "ON". The process then goes back to Step S007 of FIG. 15, and a series of the processing after Step S007 discussed earlier is performed. On the other hand, when the present time point does not corresponds to the slide gesture start time point, then the process goes back to Step S025 of FIG. 17.

If the drag or flick is finished at the present time point, then the flow goes back to Step S007 of FIG. 15. Otherwise, the flow goes back to Step S025 of FIG. 17. Thereby, the process periodically goes to Step S033 while the slide gesture is made for screen position shift operation, and the coordinates of the display target region 60 are so updated repeatedly that the display target region 60 moves with respect to the operating screen 50. In short, the screen position shift is performed.

Figure 18:
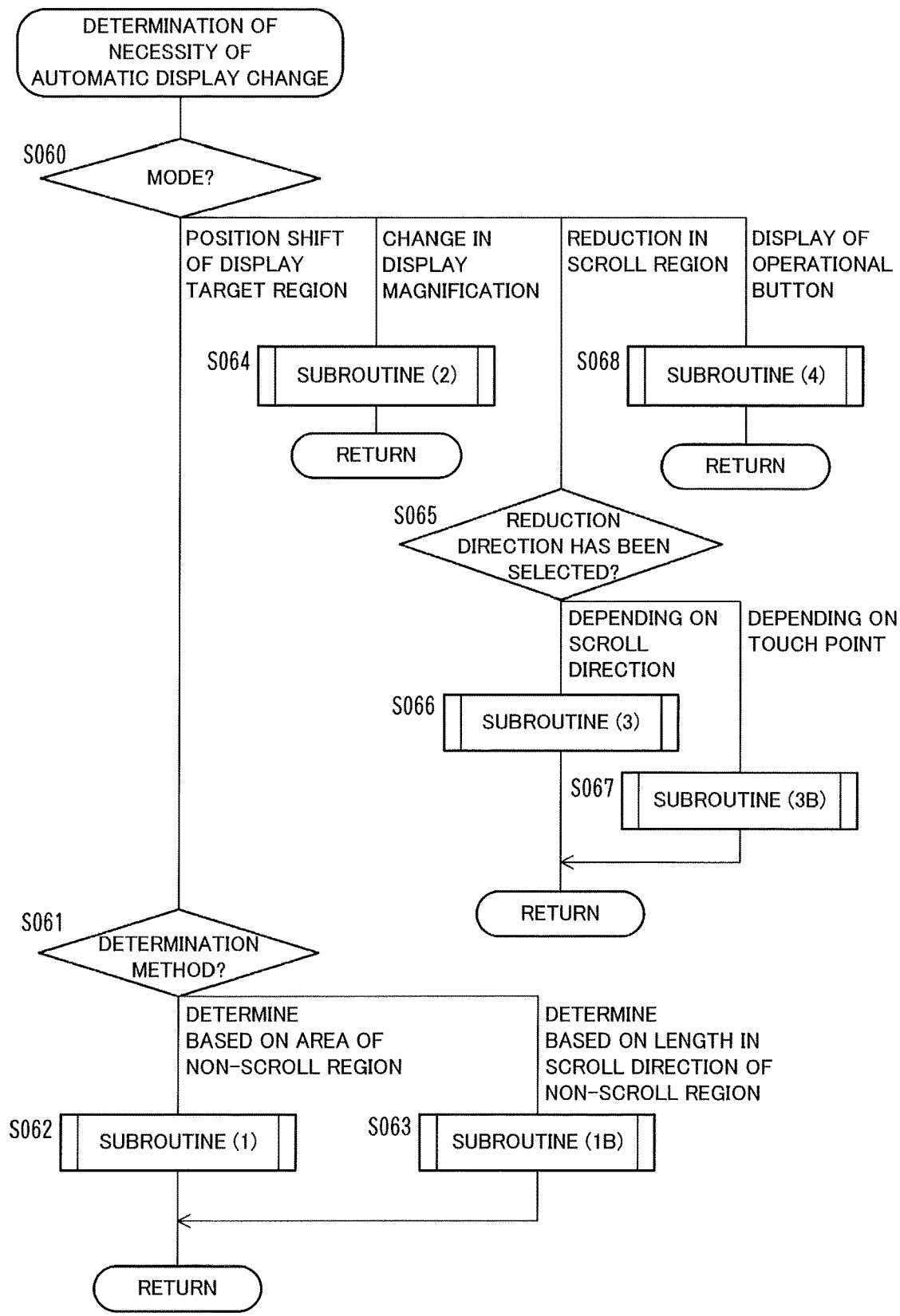
FIG. 18 is a flowchart depicting an example of the outline of a routine for determining necessity or lack of necessity of automatic display change.

FIG. 18 is a flowchart depicting an example of the outline of a routine for determining necessity or lack of necessity of automatic display change. In this routine, the process depends on a mode set for automatic display change.

(Step S060): The determination portion 261 of the display change controller 206 checks which of four modes is currently set. The four modes are: a mode in which a display target region is moved; a mode in which a display magnification is changed; a mode in which a scroll region is reduced; and a mode in which an operational button is displayed.

(Step S061 through S064): In the mode for moving a display target region, either the necessity determination subroutine (1) or the necessity determination subroutine (1B) is executed depending on which of two determination methods is selected by a user or an administrator of the MFP 2. In the mode for changing a display magnification, the necessity determination subroutine (2) is executed.

(Step S065 through Step S068): In the mode for reducing a scroll region, either the necessity determination subroutine (3) or the necessity determination subroutine (3B) is executed depending on which of two options to select the reduction direction is selected by a person who has set the mode. In the mode for displaying an operational button, the necessity determination subroutine (4) is determined.

Figure 19:
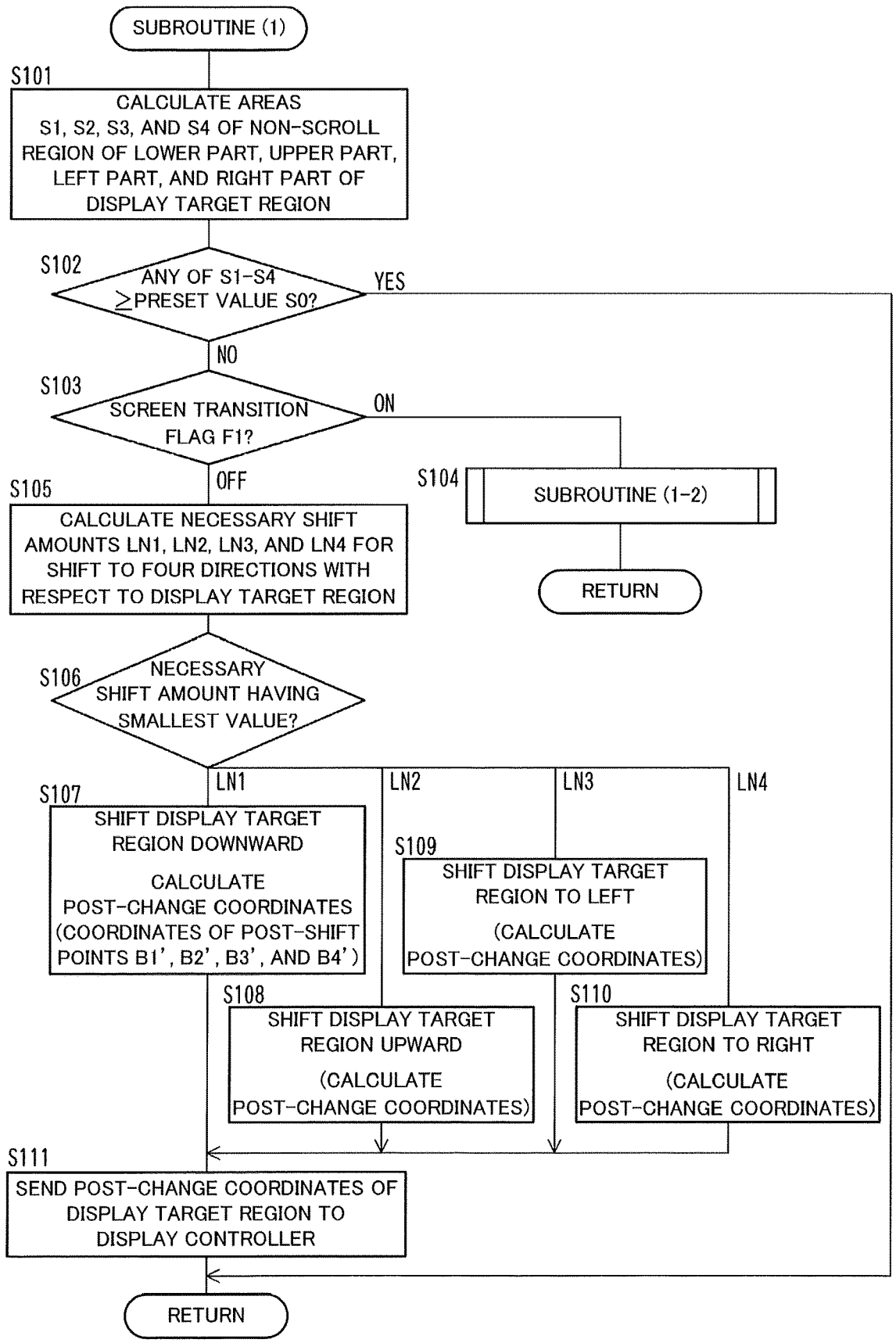
FIG. 19 is a flowchart depicting an example of a necessity determination subroutine (1).
Figure 20A:
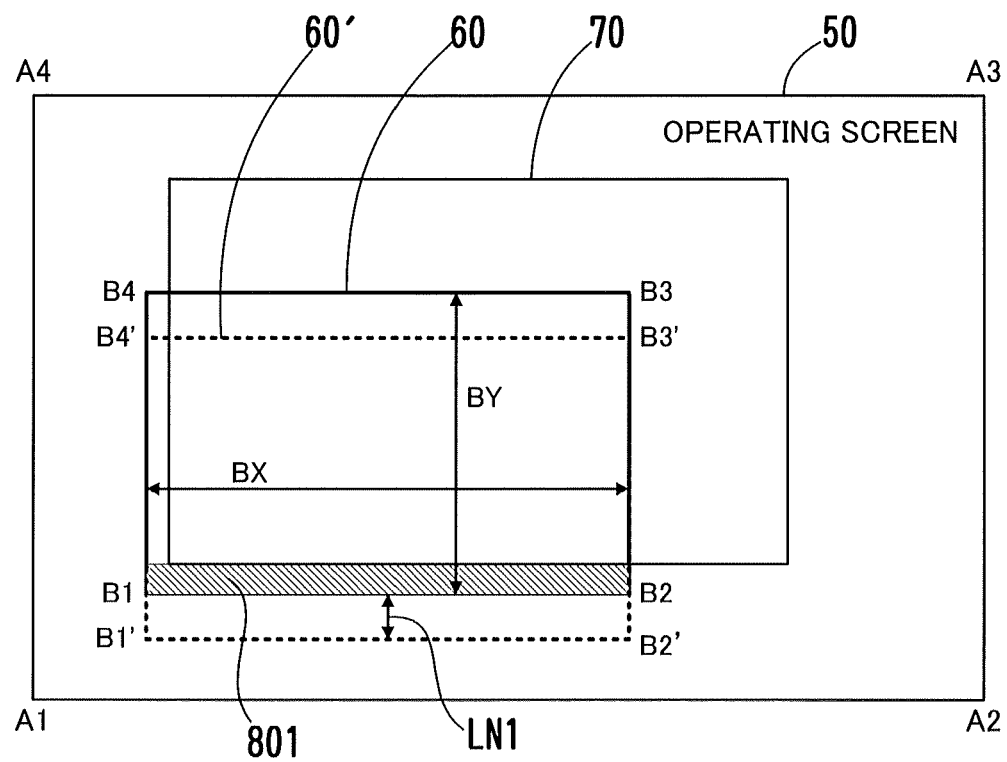
FIGS. 20A and 20B are diagrams showing an example of shift of a display target region according to a necessity determination subroutine (1).
Figure 20B:
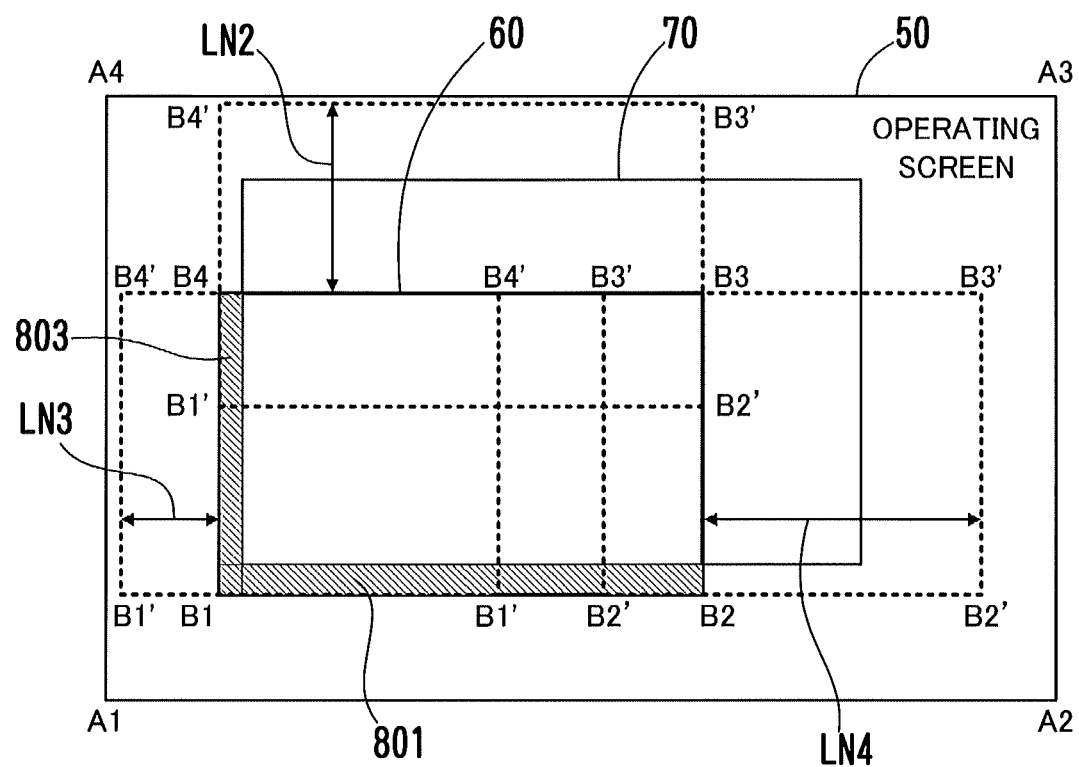

FIG. 19 shows an example of the flow of the necessity determination subroutine (1) depicted in Step S062 of FIG. 18. FIGS. 20A and 20B show an example of shift of a display target region according to the necessity determination subroutine (1).

(Step S101): The determination portion 261 of the display change controller 206 calculates, as areas S1, S2, S3, and S4, the number of pixels of a non-scroll region of each of upper part, lower part, left part, and right part of the display target region 60. The lower non-scroll region herein is a region below the scroll region 70 such as the non-scroll region 801 shown in (A) or (F) of FIG. 14. The upper non-scroll region is a region above the scroll region 70 such as the non-scroll region 802 shown in (B), (E), or (F) of FIG. 14. The left non-scroll region is a region provided in the left of the scroll region 70 such as the non-scroll region 803 shown in (C) or (G) of FIG. 14. The right non-scroll region is a region provided in the right of the scroll region 70 such as the non-scroll region 804 shown in (D), (E), or (G) of FIG. 14.

The display target region 60 has some of the four non-scroll regions 801, 802, 803, and 804 in some cases, has only one of the same in some cases, and has none of the same in other cases. As for a region having no non-scroll regions, the calculated value of the area is set at "0".

(Step S102): The determination portion 261 compares each of the four areas S1, S2, S3, and S4 with a preset value S0. Through the comparison, whether or not automatic display change is necessary is determined. The preset value S0 is preset as a normal area necessary for a finger to touch on a display surface.

If at least one of the four areas S1, S2, S3, and S4 has a value equal to or larger than the preset value S0, then the determination portion 261 determines that "automatic display change is not necessary". In such a case, the process bypasses the necessity determination subroutine (1) to go to Step S017 of FIG. 16.

If each of the four areas S1, S2, S3, and S4 has a value smaller than the preset value S0, then the determination portion 261 determines that "automatic display change is required". In such a case, the process goes to the next Step S103 where processing for shifting the display target region 60 is performed.

(Step S103 through Step S104): The determination portion 261 checks the screen transition flag F1. If the screen transition flag F1 is "ON", then the determination portion 261 executes a necessity determination subroutine (1-2) associated with automatic display change immediately after the screen transition. The case where the screen transition flag F1 is "OFF" is a case where the automatic display change is required in response to screen position shift operation or other operation by a user while the operating screen after the screen transition partly appears. In such a case, the process goes to Step S105.

(Step S105): The determination portion 261 calculates necessary shift amounts LN1, LN2, LN3, and LN4 indicating amounts for shift downward, upward, left side, and right side respectively with respect to the display target region 60. The necessary shift amounts LN1, LN2, LN3, and LN4 are shift amounts necessary for post-shift areas S1, S2, S3, and S4 to have a preset value S0. The necessary shift amounts LN1, LN2, LN3, and LN4 are expressed in the following expressions.

$$LN1=(S0-S1)/BX$$

$$LN2=(S0-S2)/BX$$

$$LN3=(S0-S3)/BY$$

$$LN4=(S0-S4)/BY$$

(Step S106): The determination portion 261 selects, from among the four necessary shift amounts LN1, LN2, LN3, and LN4 calculated, one having the smallest value. At this time, if there is a plurality of necessary shift amount having the smallest value, one of the same is selected in accordance with a predetermined algorithm. An example of such methods is to preset, for each operating screen, the priority order for selection, and to make a selection based on the priority order. The determination portion 261 sends the necessary shift amount thus selected to the display change instructing portion 262.

(Step S107): When being advised of the necessary shift amount LN1 from the determination portion 261, the display change instructing portion 262 calculates post-change coordinates based on which the display target region 60 is shifted downward. The post-change coordinates for identifying post-shift points B1', B2', B3', and B4' are as follows:

$$B1': (B1x, B1y-LN1)$$

$$B2': (B2x, B2y-LN1)$$

$$B3': (B3x, B3y-LN1)$$

$$B4': (B4x, B4y-LN1)$$

(Step S108): When being advised of the necessary shift amount LN2 from the determination portion 261, the display change instructing portion 262 calculates post-change coordinates based on which the display target region 60 is shifted upward. The post-change coordinates calculated are as follows:

$$B1': (B1x, B1y+LN2)$$

$$B2': (B2x, B2y+LN2)$$

$$B3': (B3x, B3y+LN2)$$

$$B4': (B4x, B4y+LN2)$$

(Step S109): When being advised of the necessary shift amount LN3 from the determination portion 261, the display change instructing portion 262 calculates post-change coordinates based on which the display target region 60 is shifted to the left. The post-change coordinates calculated are as follows:

$$B1': (B1x-LN3, B1y)$$

$$B2': (B2x-LN3, B2y)$$

$$B3': (B3x-LN3, B3y)$$

$$B4': (B4x-LN3, B4y)$$

(Step S110): When being advised of the necessary shift amount LN4 from the determination portion 261, the display change instructing portion 262 calculates post-change coordinates based on which the display target region 60 is shifted to the right. The post-change coordinates calculated are as follows:

$$B1': (B1x+LN4, B1y)$$

$$B2': (B2x+LN4, B2y)$$

$$B3': (B3x+LN4, B3y)$$

$$B4': (B4x+LN4, B4y)$$

(Step S111): The display change instructing portion 262 sends the post-change coordinates thus calculated to the display controller 201. The post-change coordinates are used, in Step S018 of FIG. 16, for generating section screen data D3 corresponding to the post-shift display target region 60'.

FIG. 20A shows an example of automatic display change by which the display target region 60 is shifted downward. The necessary shift amount LN1 for this case corresponds to the distance between the lower side of the display target region 60 before shift and the lower side of the post-shift display target region 60' shown in the broken line. The shift increases downward the non-scroll region 801 provided below the scroll region 70.

FIG. 20B shows an example of necessary shift amounts LN2, LN3, and LN4 for the case where the display target region 60 is shifted upward, to the left, and to the right, respectively. In the illustrated example, before the shift, the lower non-scroll region 801 and the left non-scroll region 803 are present. However, no upper non-scroll region and no right non-scroll region are present. Thus, the necessary shift amount LN2 for upward shift is larger than the necessary shift amount LN1 for downward shift, and further, the necessary shift amount LN4 for shift to the right is larger than the necessary shift amount LN3 for shift to the left.

Figure 21:
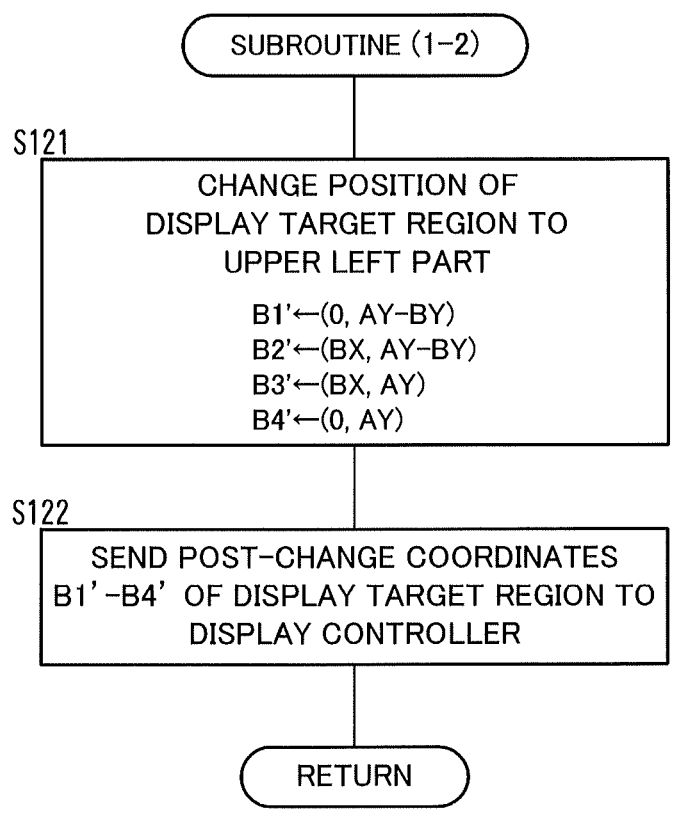
FIG. 21 is a flowchart depicting an example of a necessity determination subroutine (1-2).
Figure 22:
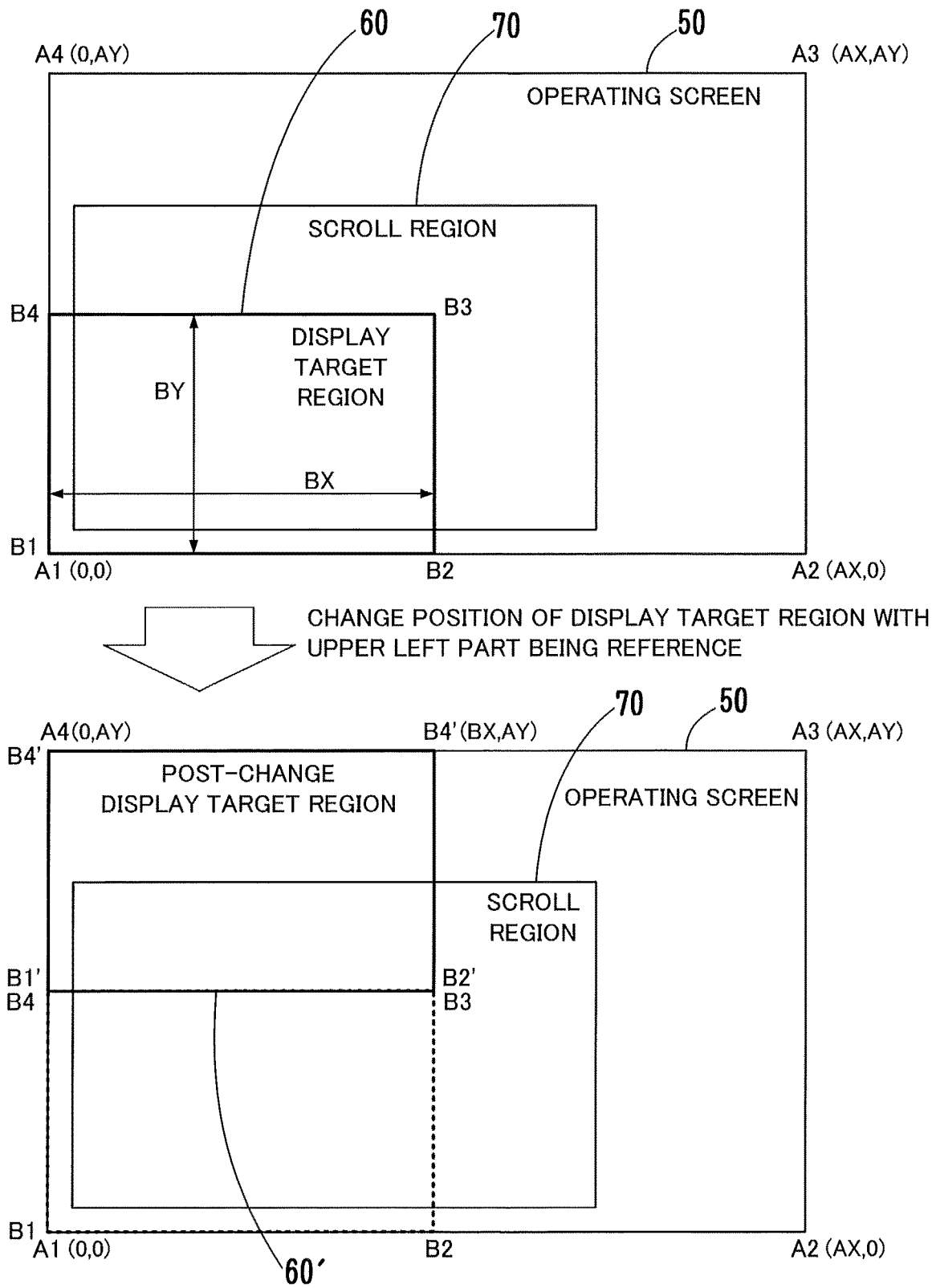
FIG. 22 is a diagram showing an example of shift of a display target region according to a necessity determination subroutine (1-2).

FIG. 21 is a flowchart depicting an example of the flow of a necessity determination subroutine (1-2) in Step S104 of FIG. 19; and FIG. 22 is a diagram showing an example of shift of a display target region according to the necessity determination subroutine (1-2).

(Step S121 through Step S122): The display change instructing portion 262 calculates post-change coordinates for moving the display target region 60 from "the lower left part" to "the upper left part" of the operating screen 50 as shown in FIG. 22. As discussed earlier, the coordinates of the point B1 are set at (0, 0) for each time of screen transition, the display target region 60 is initially positioned in "the lower left part" of the operating screen 50. In the case where the display target region 60 at the initial position has no non-scroll regions having a predetermined area, the position of the display target region 60 is changed. In actuality, the automatic display change is instantly completed, the user cannot even recognize the change. Accordingly, in designing the operating screen 50, it is preferable that the non-scroll region is positioned in the upper left part for the case where it cannot be positioned in the lower left part. This prevents a situation where, immediately after the screen transition, "a user cannot give a command for screen position shift via a slide gesture" from occurring.

The post-change coordinates are sent to the display controller 201. The following post-change coordinates are sent.

B1': (0,AY−BY)

B2': (BX,AY−BY)

B3': (BX,AY)

B4': (0,AY)

Figure 23:
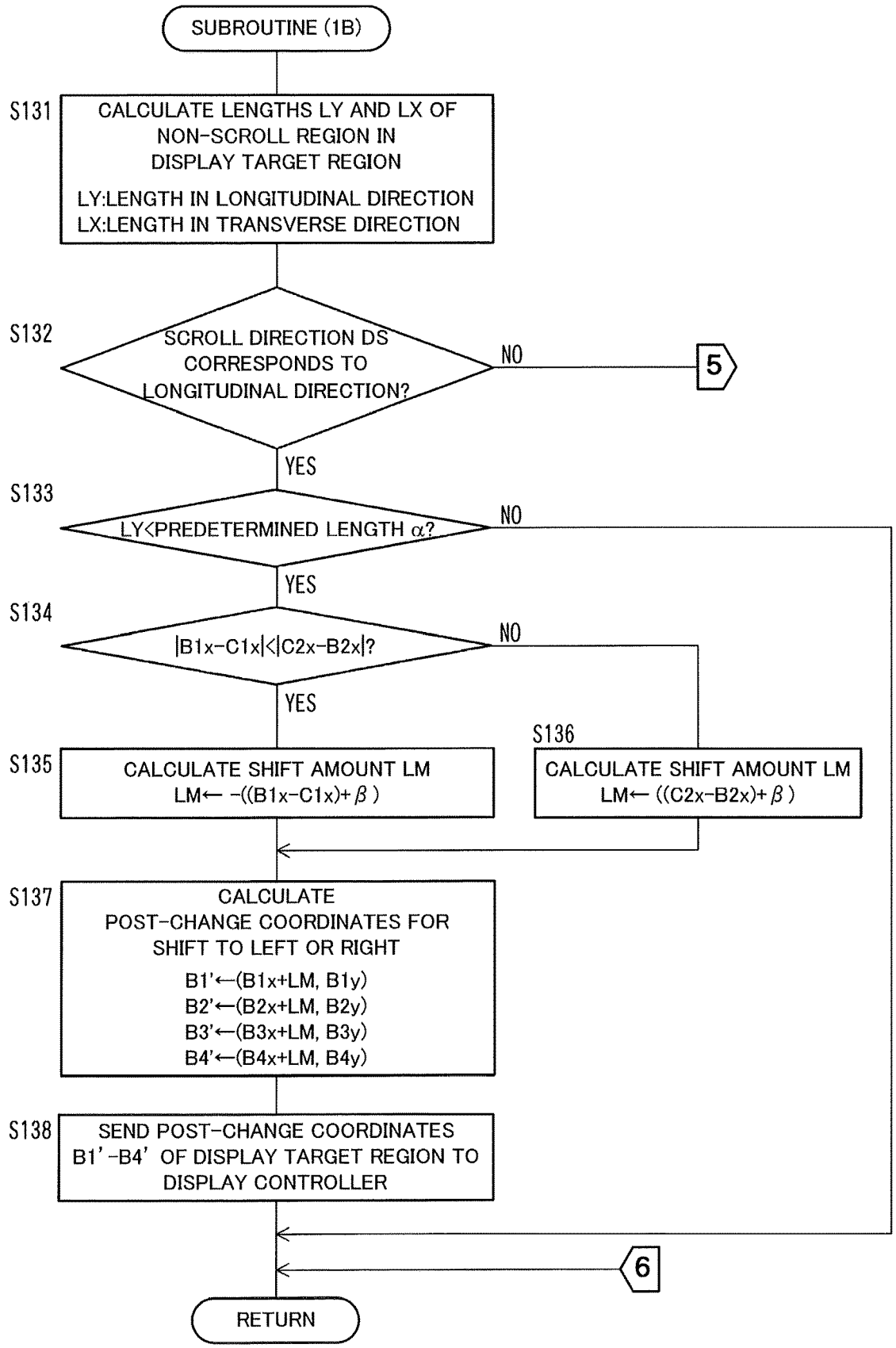
FIG. 23 is a flowchart depicting an example of a first part of a necessity determination subroutine (1B).
Figure 24:
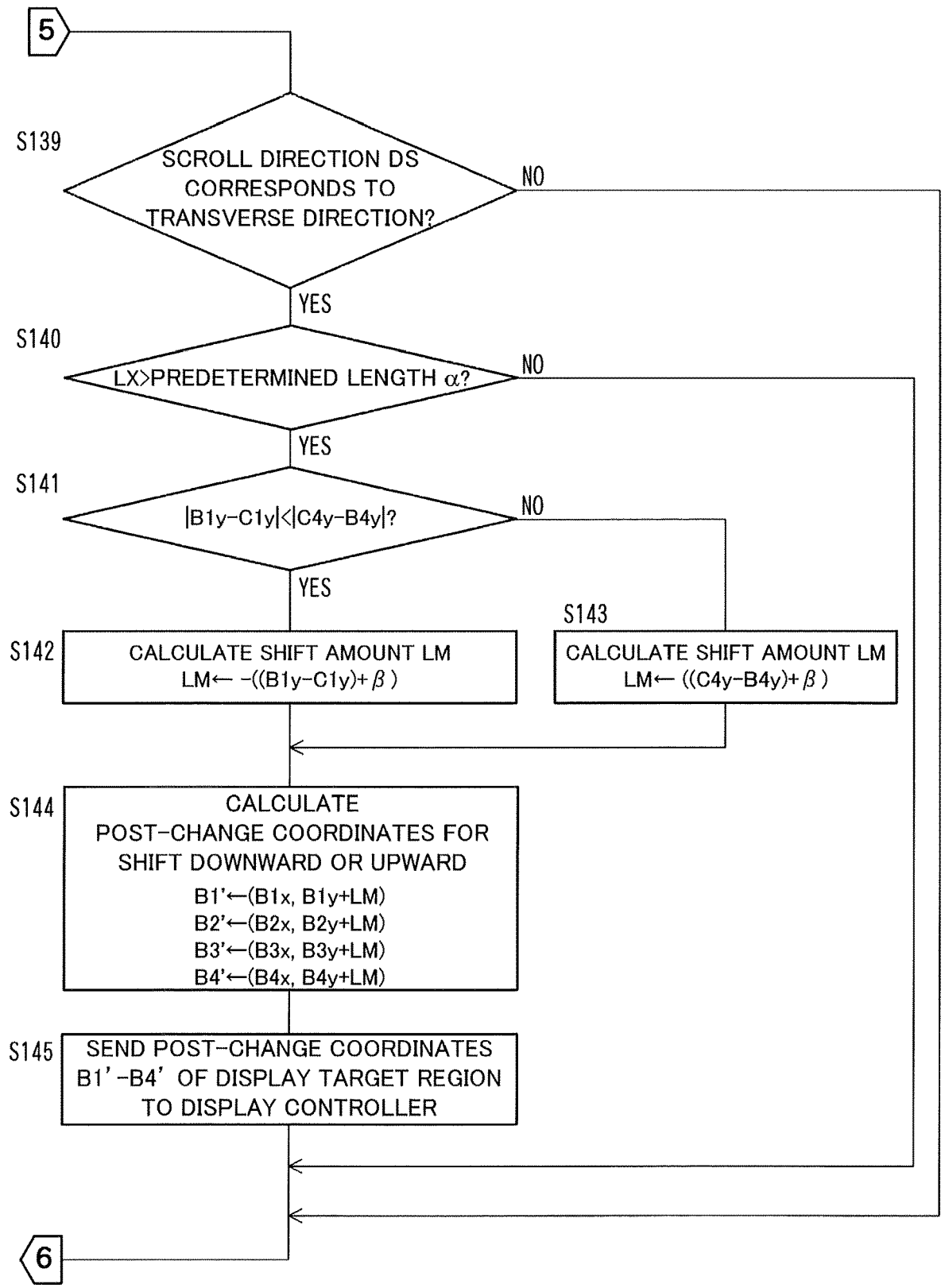
FIG. 24 is a flowchart depicting an example of a second part of a necessity determination subroutine (1B).
Figure 25:
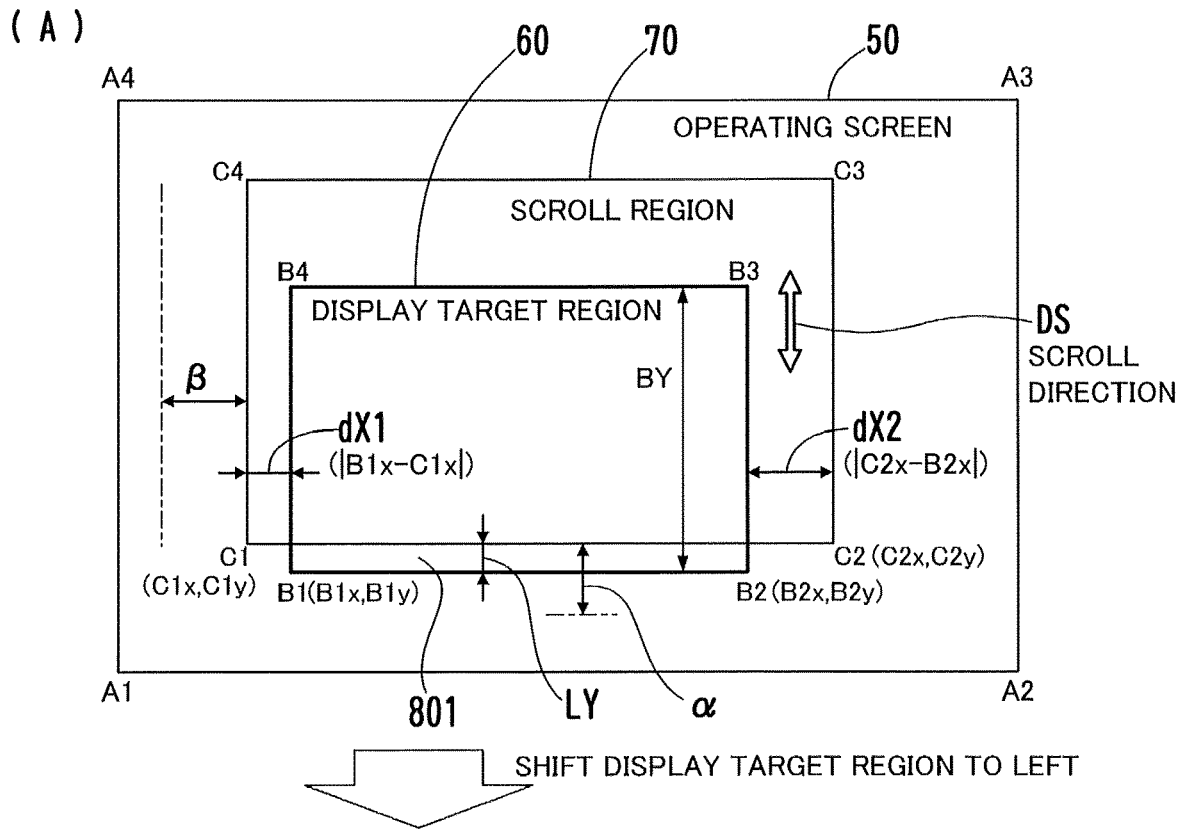
FIG. 25 is a diagram showing an example of shift of a display target region according to a necessity determination subroutine (1B).
Figure 25:
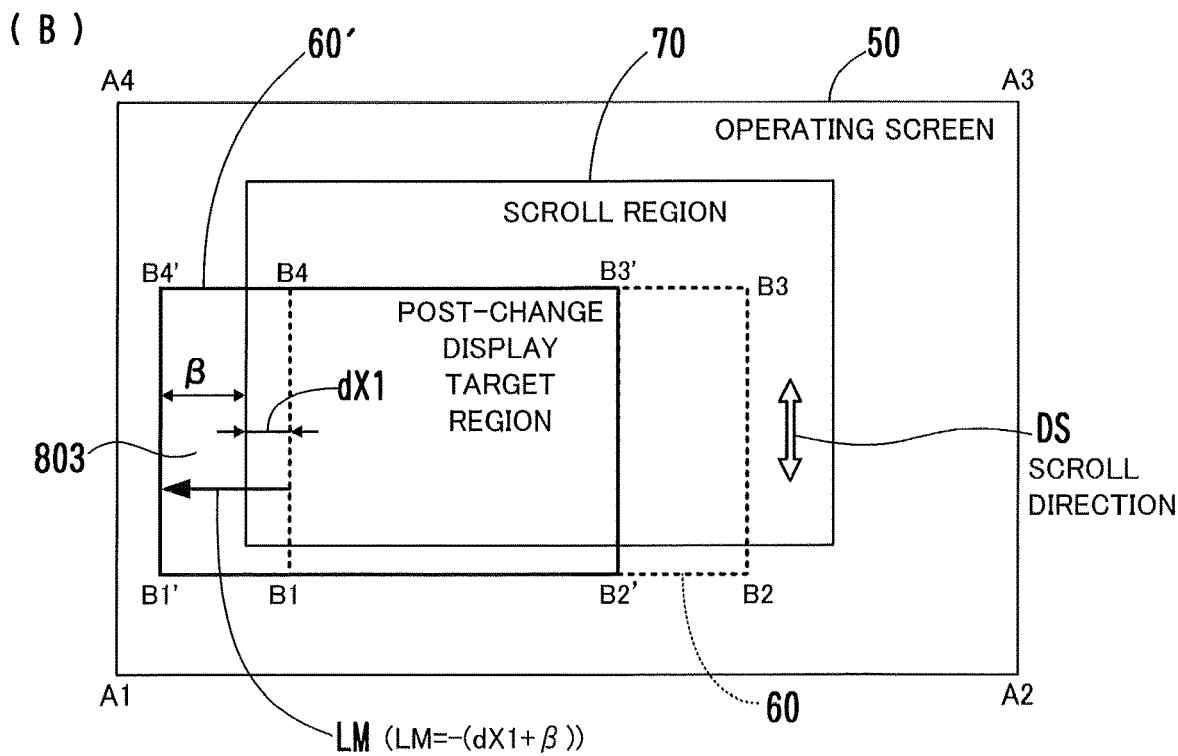
Figure 26:
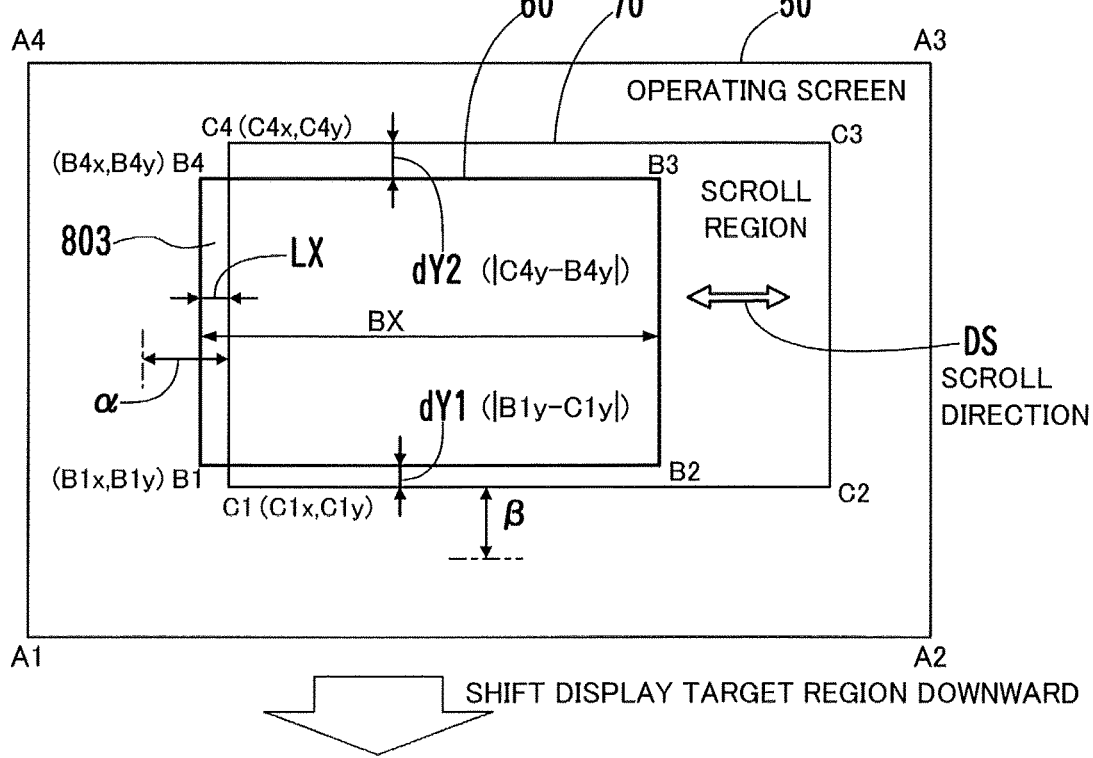
FIG. 26 is a diagram showing an example of shift of a display target region according to a necessity determination subroutine (1B).
Figure 26:
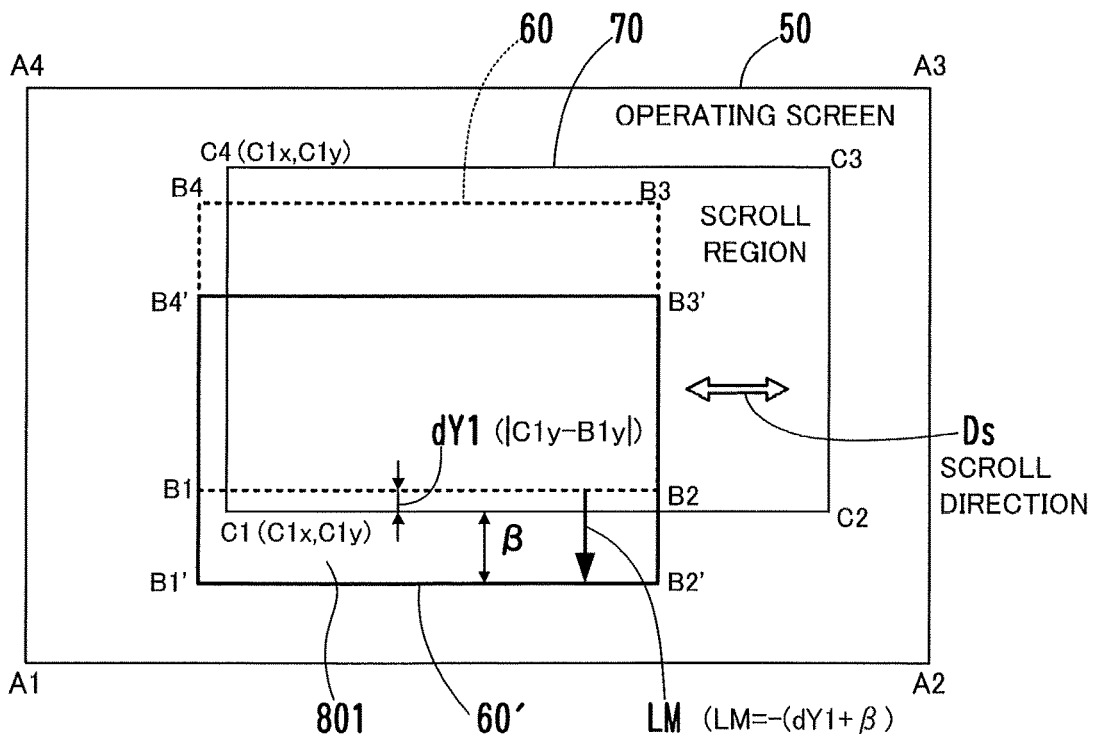

FIGS. 23 and 24 show a part and another part of the flow of the necessity determination subroutine (1B), respectively; and FIGS. 25 and 26 show an example of shift of a display target region according to the necessity determination subroutine (1B).

(Step S131 of FIG. 23): The determination portion 261 of the display change controller 206 calculates lengths LY and LX in the longitudinal (up-down) direction and the transverse (right-left) direction of a non-scroll region present in the display target region 60. If there are non-scroll regions 801, 802, 803, and 804 that are spaced away from each other in the longitudinal direction or transverse direction as shown in (F) and (G) of FIG. 14, the determination portion 261 calculates the lengths LY and LX of each of the regions.

(Step S132): The determination portion 261 checks whether or not a scroll direction DS set defined for the scroll region 70 of the operating screen 50 corresponds to the longitudinal direction. If the scroll direction DS does not correspond to the longitudinal direction, then the flow goes to Step S139 of FIG. 24. If the scroll direction DS corresponds to the longitudinal direction, then the flow goes to the next Step S133.

(Step S133): The determination portion 261 compares the calculated length LY in the longitudinal direction with a predetermined length α. When a plurality of the lengths LY is obtained by the calculation on a plurality of non-scroll regions, the largest calculation value is used as a comparison target. The necessity or lack of the necessity of the automatic display change is determined through the comparison. The predetermined length α is defined as a normal length necessary for a slide gesture, and for example, is set at 3 cm.

If the length LY in the longitudinal direction is longer than the predetermined length α, then the determination portion 261 determines that "automatic display change is not necessary". In such a case, the flow bypasses the necessity determination subroutine (1B) to go to Step S017 of FIG. 16.

If the length LY in the longitudinal direction is shorter than the predetermined length α, then the determination portion 261 determines that "automatic display change is required". In such a case, the flow goes to the next Step S134 in which processing for moving the display target region 60 is performed.

(Step S134 through Step S136): The determination portion 261 compares the distance dX1 (see FIG. 25) between the left side of the display target region 60 and the left side of the scroll region 70 with the distance dX2 between the right side of the display target region 60 and the right side of the scroll region 70. Prior to the comparison, the distances dX1 and dX2 are calculated based on the X-coordinates of the points B1, B2, C1, and C2. The distances dX1 and dX2 are expressed in the following expressions.

$dX1 = |B1x - C1x|$ $dX2 = |C2x - B2x|$

If the distance dX1 between the left sides is shorter than the distance dX2 between the right sides, then the determination portion 261 calculates a shift amount LM in order to move the display target region 60 to the left. This is because the shift amount LM is shorter in a case where the display target region 60 is shifted to the left than in a case where the display target region 60 is shifted to the right. The shift amount LM for this case is expressed in the following expression and the shift amount LM has a negative value.

$LM = -((B1x - C1x) + β)$

On the other hand, if the distance dX2 between the right sides is shorter than the distance dX1 between the left sides, then the determination portion 261 calculates a shift amount LM in order to move the display target region 60 to the right. This is because the shift amount LM is shorter in a case where the display target region 60 is shifted to the right than in a case where the display target region 60 is shifted to the left. The shift amount LM for this case is expressed in the following expression and the shift amount LM has a positive value.

$LM = (C2x - B2x) + β$

In both cases of the shift to the left and the shift to the right, the calculated shift amount LM is sent to the display change instructing portion 262. The value of β is set at, for example, 1 cm.

(Step S137): When being advised of the shift amount LM from the determination portion 261, the display change instructing portion 262 calculates post-change coordinates based on which the display target region 60 is shifted to the left or the right. The post-change coordinates for identifying the post-shift points B1', B2', B3', and B4' are as follows.

B1': (B1x+LM,B1y)

B2': (B2x+LM,B2y)

B3': (B3x+LM,B3y)

B4': (B4x+LM,B4y)

(Step S138): The display change instructing portion 262 sends the post-change coordinates thus calculated to the display controller 201. The post-change coordinates are used, in Step S018 of FIG. 16, to generate section screen data D3 corresponding to the post-shift display target region 60'.

(Step S139 of FIG. 24): The determination portion 261 checks whether or not the scroll direction DS corresponds to the transverse direction. This check is made for the case where the result in Step S132 of FIG. 23 shows that the scroll direction DS does not correspond to the longitudinal direction. Therefore, if it is found that the scroll direction DS does not correspond to the transverse direction in Step S139 of FIG. 24, then both of the longitudinal direction and the transverse direction are set as the scroll direction DS. In such a case, then the flow bypasses the necessity determination subroutine (1B) to go to Step S017 of FIG. 16. If the scroll direction DS corresponds to the transverse direction, then the flow goes to the next Step S140.

(Step S140): The determination portion 261 compares the calculated length LX in the transverse direction with the predetermined length α. When a plurality of the lengths LX is obtained by the calculation on a plurality of non-scroll regions, the largest calculation value is used as a comparison target. The necessity or lack of the necessity of the automatic display change is determined through the comparison.

If the length LX in the transverse direction is longer than the predetermined length α, then the determination portion 261 determines that "automatic display change is not necessary". In such a case, the flow bypasses the necessity determination subroutine (1B) to go to Step S017 of FIG. 16.

If the length LX in the transverse direction is shorter than the predetermined length α, then the determination portion 261 determines that "automatic display change is required". In such a case, the flow goes to the next Step S141 in which processing for moving the display target region 60 is performed.

(Step S141 through Step S143): The determination portion 261 compares the distance dY1 (see FIG. 26) between the lower side of the display target region 60 and the lower side of the scroll region 70 with the distance dY2 between the upper side of the display target region 60 and the upper side of the scroll region 70. Prior to the comparison, the distances dY1 and dY2 are calculated based on the Y-coordinates of the points B1, B4, C1, and C4. The distances dY1 and dY2 are expressed in the following expressions.

$$dY1 = |B1y - C1y|$$

$$dY2 = |C4y - B4y|$$

If the distance dY1 between the lower sides is shorter than the distance dY2 between the upper sides, then the determination portion 261 calculates a shift amount LM in order to move the display target region 60 downward. This is because the shift amount LM is shorter in a case where the display target region 60 is shifted downward than in a case where the display target region 60 is shifted upward. The shift amount LM for this case is expressed in the following expression, and the shift amount LM has a negative value.

$$LM = -((B1y - C1y) + \beta)$$

On the other hand, if the distance dY2 between the upper sides is shorter than the distance dY1 between the lower sides, then the determination portion 261 calculates a shift amount LM in order to move the display target region 60 upward. This is because the shift amount LM is shorter in a case where the display target region 60 is shifted upward than in a case where the display target region 60 is shifted downward. The shift amount LM for this case is expressed in the following expression, and the shift amount LM has a positive value.

$$LM = (C4y - B4y) + \beta$$

In both cases of the downward shift and the upward shift, the calculated shift amount LM is sent to the display change instructing portion 262.

(Step S144): When being advised of the shift amount LM from the determination portion 261, the display change instructing portion 262 calculates post-change coordinates based on which the display target region 60 is shifted downward or upward. The post-change coordinates for identifying the post-shift points B1', B2', B3', and B4' are as follows.

$$B1': (B1x, B1y + LM)$$

$$B2': (B2x, B2y + LM)$$

$$B3': (B3x, B3y + LM)$$

$$B4': (B4x, B4y + LM)$$

(Step S145): The display change instructing portion 262 sends the post-change coordinates thus calculated to the display controller 201. The post-change coordinates are used, in Step S018 of FIG. 16, to generate section screen data D3 corresponding to the post-shift display target region 60'.

FIG. 25 shows, in (A), a state before moving the display target region 60 for the case where the scroll direction DS corresponds to the longitudinal direction. FIG. 25 shows, in (B), a state after shifting the display target region 60 to the left.

In (A) of FIG. 25, the display target region 60 has, in its lower part, a non-scroll region 801. The length LY in the longitudinal direction corresponding to the scroll direction DS in the non-scroll region 801 is shorter than the predetermined length α. Therefore, in order to enable a slide gesture for giving a command for screen position shift in the longitudinal direction, it is necessary to perform automatic display change. Shifting the display target region 60 to the left or the right makes the length LY be equal to the length BY in the longitudinal direction of the display target region 60. Thereby, a stroke range sufficient to make a slide gesture for screen position shift is secured.

Referring to (A) of FIG. 25, the distance dX1 is shorter than the distance dX2. Stated differently, shifting the display target region 60 to the left is advantageous compared to shifting the same to the right. In view of this, the display target region 60 is moved to the left as shown in (B) of FIG. 25. The broken line in the drawing shows the position of the display target region 60 before the shift. The absolute value of shift amount LM is the sum of the distance dX1 and the predetermined length β. The post-shift display target region 60' has, in its left, the non-scroll region 803.

FIG. 26 shows, in (A), a state before moving the display target region 60 for the case where the scroll direction DS corresponds to the transverse direction. FIG. 25 shows, in (B), a state after shifting the display target region 60 downward.

In (A) of FIG. 26, the display target region 60 has, in its left, a non-scroll region 803. The length LX in the transverse direction corresponding to the scroll direction DS in the non-scroll region 803 is shorter than the predetermined length α. Therefore, in order to enable a slide gesture for giving a command for screen position shift in the transverse direction, it is necessary to perform automatic display change. Shifting the display target region 60 downward or upward makes the length LX be equal to the length BX in the transverse direction of the display target region 60. Thereby, a stroke range sufficient to make a slide gesture for screen position shift is secured.

Referring to (A) of FIG. 26, the distance dY1 is shorter than the distance dY2. Stated differently, shifting the display target region 60 downward is advantageous compared to shifting the same upward. In view of this, the display target region 60 is moved downward as shown in (B) of FIG. 26. The broken line in the drawing shows the position of the display target region 60 before the shift. The absolute value of shift amount LM is the sum of the distance dY1 and the predetermined length β. The post-shift display target region 60' has, in its lower part, the non-scroll region 803.

Figure 27:
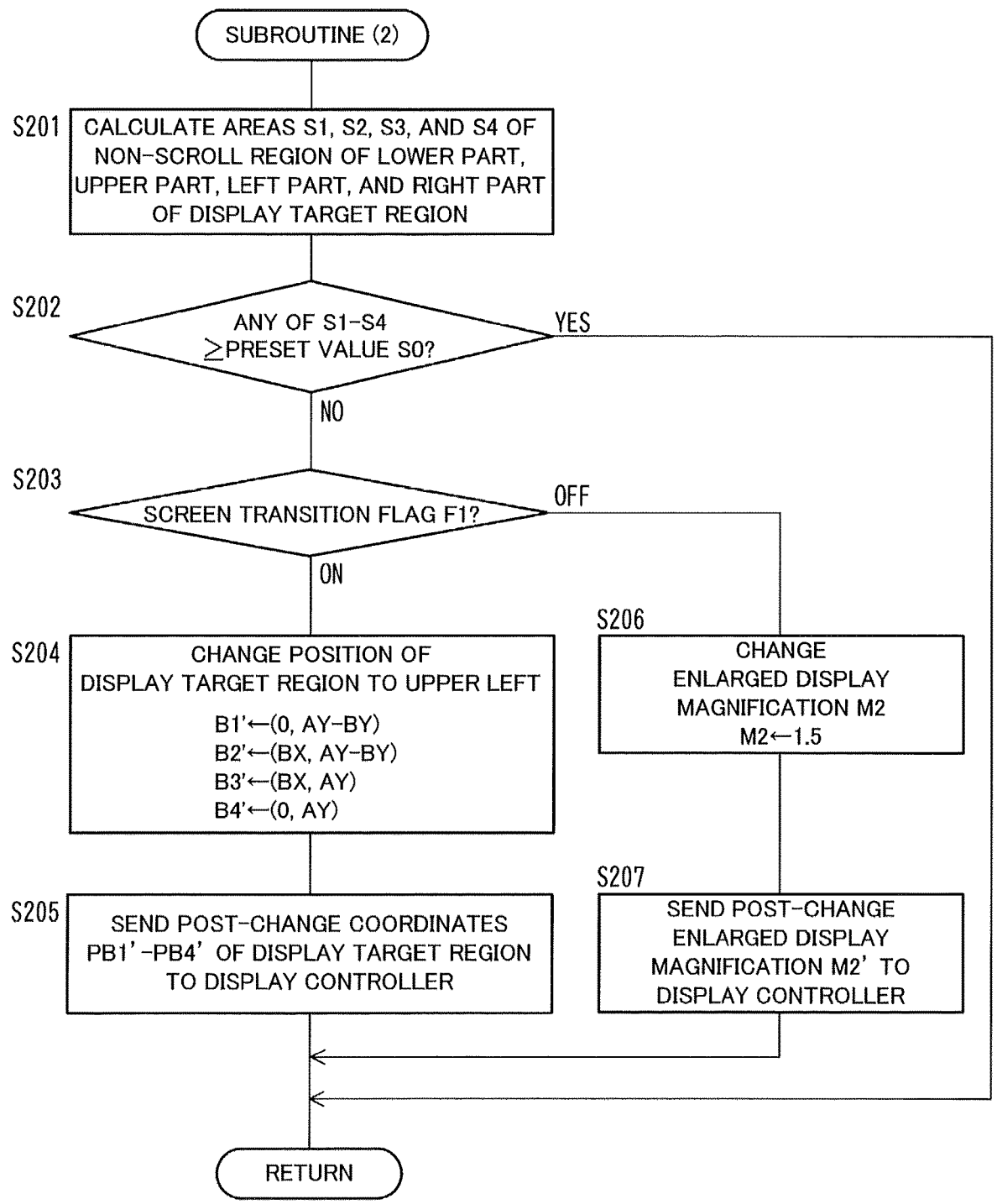
FIG. 27 is a flowchart depicting an example of a necessity determination subroutine (2).
Figure 28:
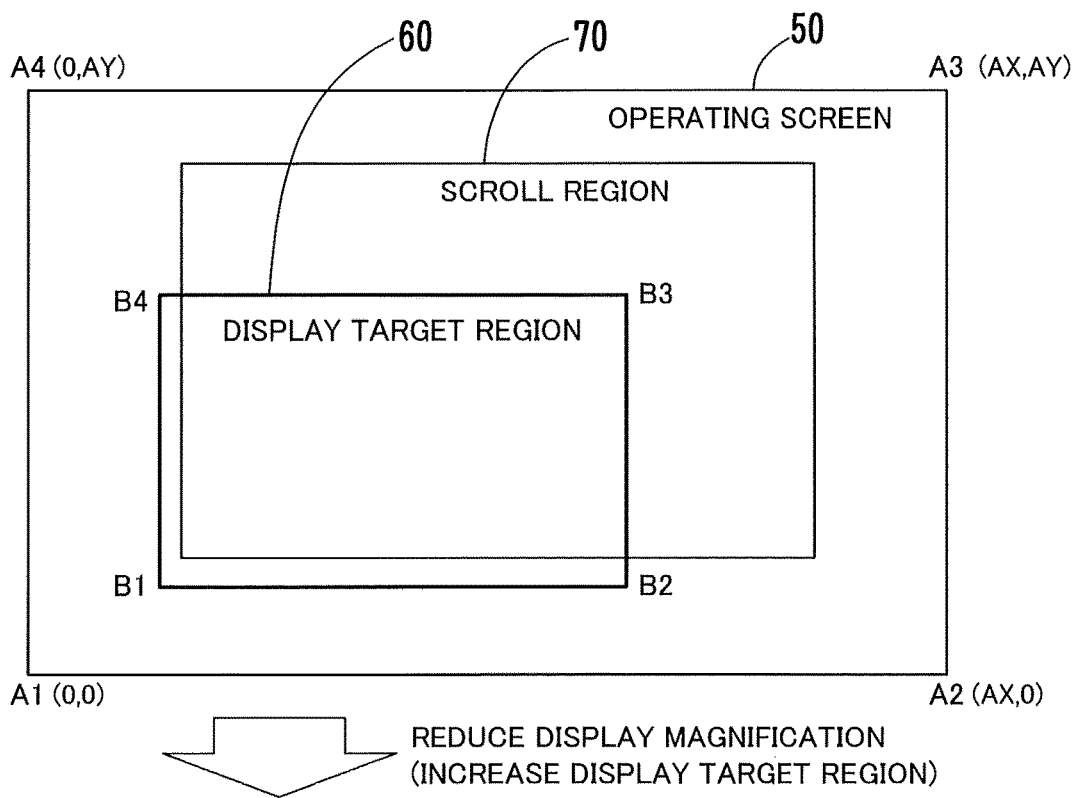
FIG. 28 is a diagram showing an example of enlargement in a display target region according to a necessity determination subroutine (2).
Figure 28:
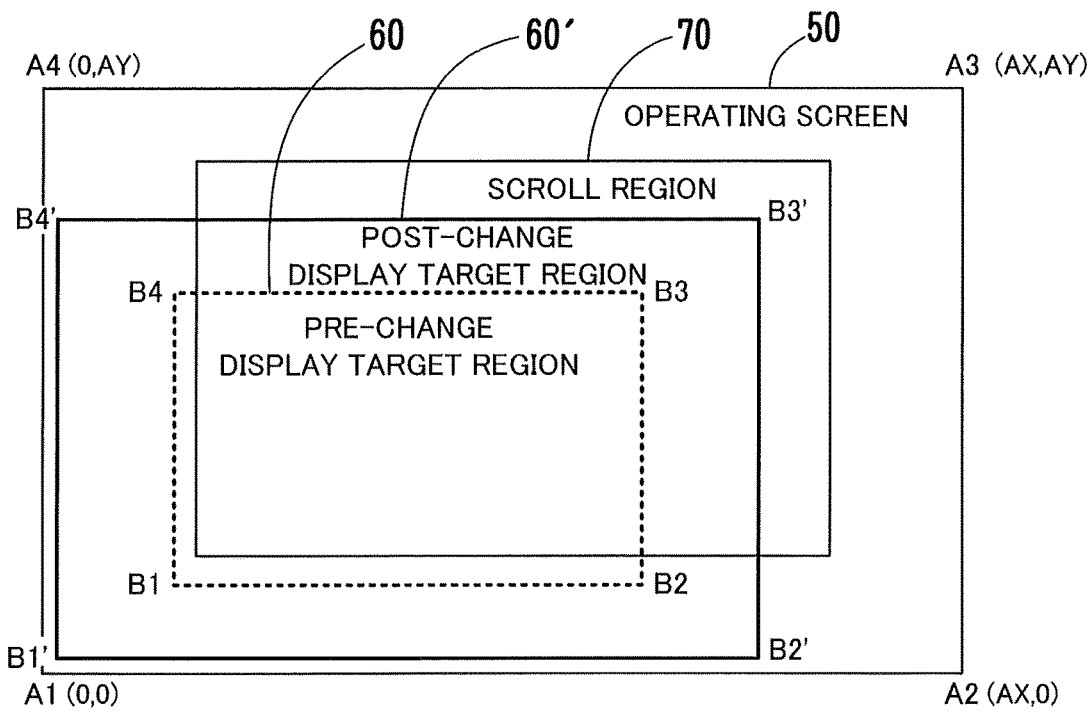

FIG. 27 shows an example of the flow of the necessity determination subroutine (2) depicted in Step S064 of FIG. 18. FIG. 28 shows an example of change in size of a display target region according to the necessity determination subroutine (2).

(Step S201 through Step S202 of FIG. 27): As with the Step S101 of FIG. 19, the determination portion 261 of the display change controller 206 calculates areas S1, S2, S3, and S4 of non-scroll regions of lower part, upper part, left part, and right part of the display target region 60. The determination portion 261 then compares each of the four areas S1, S2, S3, and S4 with the preset value S0. In this way, it is determined whether or not automatic display change is required.

If at least one of the four areas S1, S2, S3, and S4 has a value equal to or larger than the preset value S0, then the determination portion 261 determines that "automatic display change is not necessary". In such a case, the process bypasses the necessity determination subroutine (2) to go to Step S017 of FIG. 16.

If each of the four areas S1, S2, S3, and S4 has a value smaller than the preset value S0, then the determination portion 261 determines that "automatic display change is required". In such a case, the process goes to the next Step S203 where processing for changing the size of the display target region 60 with respect to the operating screen 50 is performed at a time point except for the immediately after the screen transition.

(Step S203 through Step S205): The display change instructing portion 262 checks the screen transition flag F1. If the screen transition flag F1 is "ON", then the display change instructing portion 262 performs processing similar to that of the necessity determination subroutine (1-2) shown in FIG. 21. To be specific, the display change instructing portion 262 calculates post-change coordinates for moving the display target region 60 from the "lower left part" to the "upper left part" of the operating screen 50 as shown in FIG. 22. The display change instructing portion 262 then sends the calculated post-change coordinates to the display controller 201.

(Step S206 through Step S207): If the screen transition flag F1 is "OFF" through the check in Step S203, then the display change instructing portion 262 changes the value of the enlarged display magnification M2 to a value smaller than the normal value "2.0", e.g., to "1.5". The display change instructing portion 262 then sends the post-change enlarged display magnification M2' to the display controller 201. The enlarged display magnification M2' thus sent is used, in Step S020 of FIG. 16, to generate section screen data D3 corresponding to the display target region 60' of which the size has been changed.

FIG. 28 shows, in (A), a state before changing the size of the display target region 60. FIG. 28 shows, in (B), a state after changing the size of the display target region 60. In a state shown in (A) of FIG. 28, most of the display target region 60 corresponds to a scroll region 70, and an area of a non-scroll region in the display target region 60 is not sufficient as an operation area where screen position shift is to be performed.

In a state shown in (B) of FIG. 28, the post-change display target region 60' is larger than the display target region 60 before being subjected to the change shown in the broken line. This is because the enlarged display magnification M2 is reduced. Since the size of the scroll region 70 remains unchanged, a ratio of the non-scroll region to the post-change display target region 60' is greater than a ratio of the non-scroll region to the pre-change display target region 60. The post-change display target region 60' is displayed, on a display surface, to have the same size as that of the pre-change display target region 60. Increase in ratio of the non-scroll region increases an area of the non-scroll region on the display surface.

Automatically changing the size of the display target region 60 at a time point other than the immediately after the screen transition has the following advantage: The advantage is that a user feels less strange on the display control. The case where the automatic display change is necessary at a time point other than the immediately after the screen transition is often a case where screen position shift is made in accordance with a command given by the user. Suppose, for example, that even though the user intentionally moves the display target region 60, the display target region 60 is forcedly shifted automatically as if the shift destination is modified. This probably makes the user feel that the command is not reflected completely. In view of this, "change in display magnification (change in size of display target region)", and other types of automatic display change such as "reduction in scroll region" and "display of operational button" have advantages over "position shift of display target region".

Figure 29:
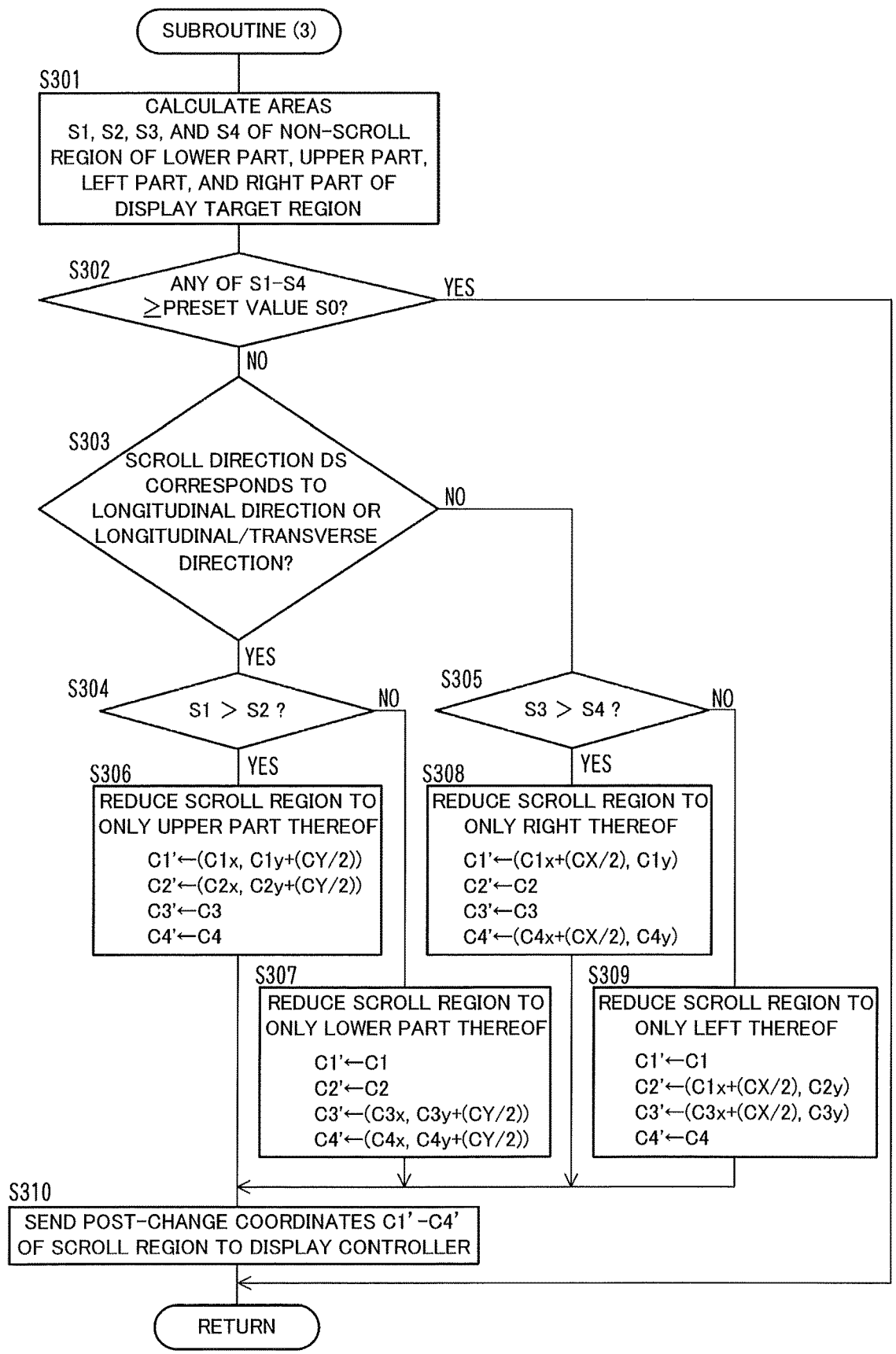
FIG. 29 is a flowchart depicting an example of a necessity determination subroutine (3).
Figure 30:
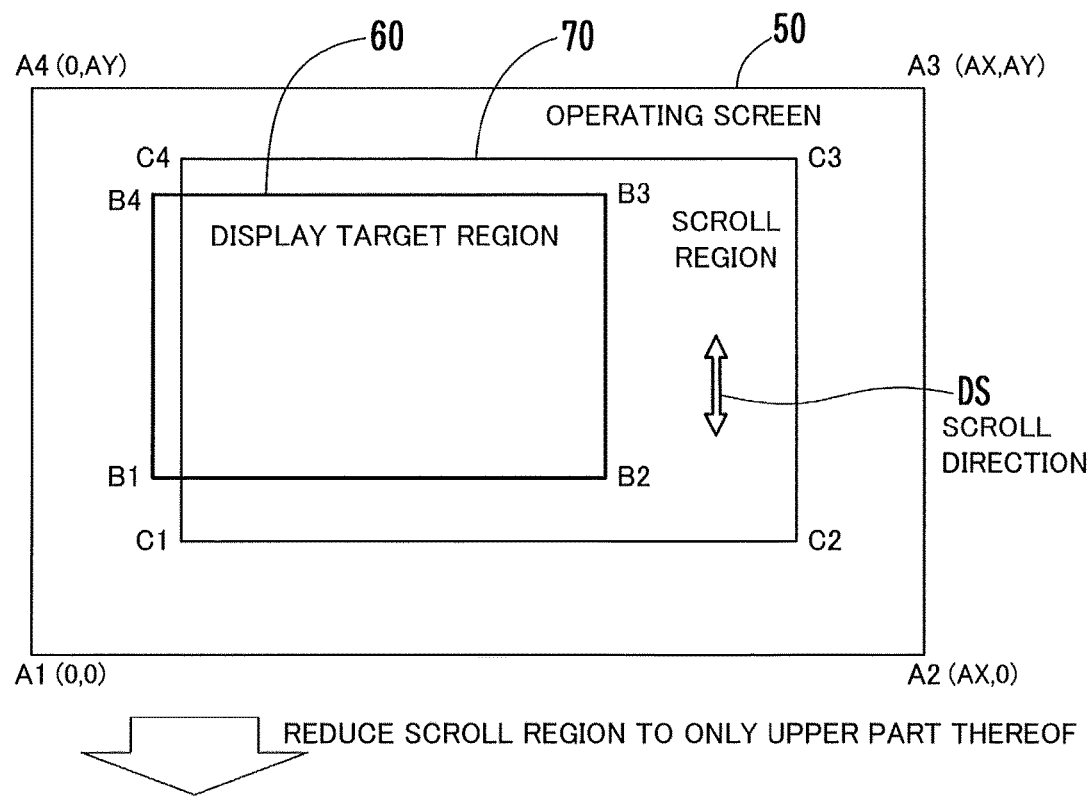
FIG. 30 is a diagram showing an example of reduction in a scroll region according to a necessity determination subroutine (3).
Figure 30:
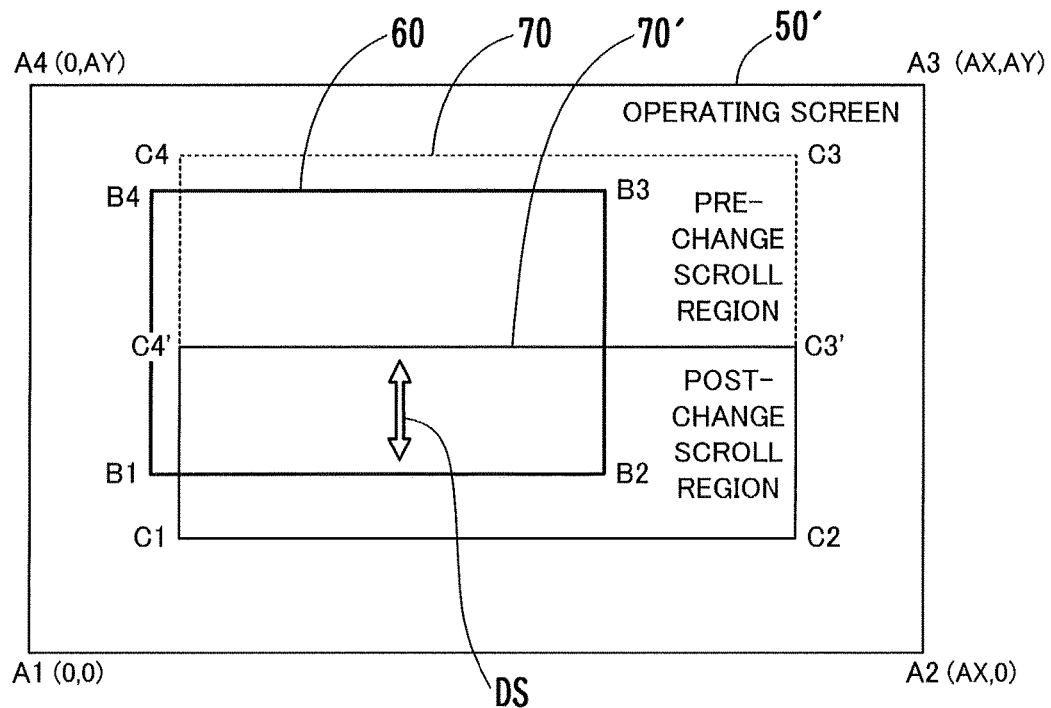

FIG. 29 shows an example of the flow of the necessity determination subroutine (3) depicted in Step S066 of FIG. 18. FIG. 30 shows an example of reduction in a scroll region according to the necessity determination subroutine (3).

(Step S301 through Step S302 of FIG. 29): As with the Step S101 of FIG. 19, the determination portion 261 of the display change controller 206 calculates areas S1, S2, S3, and S4 of non-scroll regions of lower part, upper part, left part, and right part of the display target region 60. The determination portion 261 then compares each of the four areas S1, S2, S3, and S4 with the preset value S0. In this way, it is determined whether or not automatic display change is required.

If at least one of the four areas S1, S2, S3, and S4 has a value equal to or larger than the preset value S0, then the determination portion 261 determines that "automatic display change is not necessary". In such a case, the process bypasses the necessity determination subroutine (3) to go to Step S017 of FIG. 16.

If each of the four areas S1, S2, S3, and S4 has a value smaller than the preset value S0, then the determination portion 261 determines that "automatic display change is required". In such a case, the process goes to the next Step S303 where processing for reducing the scroll region 70 is performed.

(Step S303 through Step S305): The display change instructing portion 262 checks the scroll direction DS. If the scroll direction DS corresponds to the longitudinal direction or the longitudinal/transverse direction, then the display change instructing portion 262 compares an area S1 of the lower non-scroll region with an area S2 of the upper non-scroll region. On the other hand, if the scroll direction DS corresponds to the transverse direction, then the display change instructing portion 262 compares an area S3 of the left non-scroll region with an area S2 of the right non-scroll region.

(Step S306): If the area S1 is found to be larger than the area S2, then the display change instructing portion 262 calculates post-change coordinates based on which the scroll region 70 is reduced to a part corresponding to only the upper part thereof. It is assumed that, in this embodiment, the reduction ratio of the scroll region 70 is set at, for example, 50%. Applying the reduction ratio 50% reduces the scroll region 70 to an area corresponding to the upper half of the scroll region 70. Post-change coordinates for identifying the post-reduction points C1', C2', C3', and C4' are as follows.

$C1': (C1x, C1y+(CY/2))$ $C2': (C2x, C2y+(CY/2))$ $C3': (C3x, C3y)$ $C4': (C4x, C4y)$ (Step S307): If the area S1 is found to be equal to or smaller than the area S2, then the display change instructing portion 262 calculates post-change coordinates based on which the scroll region 70 is reduced to a part corresponding to only the lower part thereof. Applying the reduction ratio 50% reduces the scroll region 70 to an area corresponding to the lower half of the scroll region 70. Post-change coordinates for identifying the post-reduction points C1', C2', C3', and C4' are as follows.

$C1': (C1x, C1y)$ $C2': (C2x, C2y)$ $C3': (C3x, C3y-(CY/2))$ $C4': (C4x, C4y-(CY/2))$ (Step S308): If the area S3 is found to be larger than the area S4, then the display change instructing portion 262 calculates post-change coordinates based on which the scroll region 70 is reduced to a part corresponding to only the right part thereof. Applying the reduction ratio 50% reduces the scroll region 70 to an area corresponding to the right half of the scroll region 70. Post-change coordinates for identifying the post-reduction points C1', C2', C3', and C4' are as follows.

$C1': (C1x+(CX/2), C1y)$ $C2': (C2x, C2y)$ $C3': (C3x, C3y)$ $C4': (C4x+(CX/2), C4y)$ (Step S309): If the area S3 is found to be equal to or smaller than the area S4, then the display change instructing portion 262 calculates post-change coordinates based on which the scroll region 70 is reduced to a part corresponding to only the left part thereof. Applying the reduction ratio 50% reduces the scroll region 70 to an area corresponding to the left half of the scroll region 70. Post-change coordinates for identifying the post-reduction points C1', C2', C3', and C4' are as follows.

$C1': (C1x, C1y)$ $C2': (C2x-(CX/2), C2y)$ $C3': (C3x-(CX/2), C3y)$ $C4': (C4x, C4y)$ (Step S310): The display change instructing portion 262 sends the post-change coordinates thus calculated to the display controller 201. The post-change coordinates thus sent are used, in Step S022 of FIG. 16, to generate section screen data D3 corresponding to the display target region 60 on the operating screen 50' having the post-reduction scroll region 70'.

FIG. 30 shows, in (A), a state before reducing the scroll region 70. FIG. 30 shows, in (B), a state after reducing the scroll region 70. In the operating screen 50 of (A) of FIG. 30, most of the display target region 60 except for the left part thereof corresponds to the scroll region 70. In the operating screen 50' of (B) of FIG. 30, the pre-reduction scroll region 70 as shown in the broken line is changed to the scroll region 70 reduced to have only a lower half thereof. Since the size and position of the display target region 60 remain unchanged, reducing the scroll region 70 makes a non-scroll region of the display target region 60 have a size to extend to the left and to the entire region of the upper half part of the display target region 60.

Figure 31:
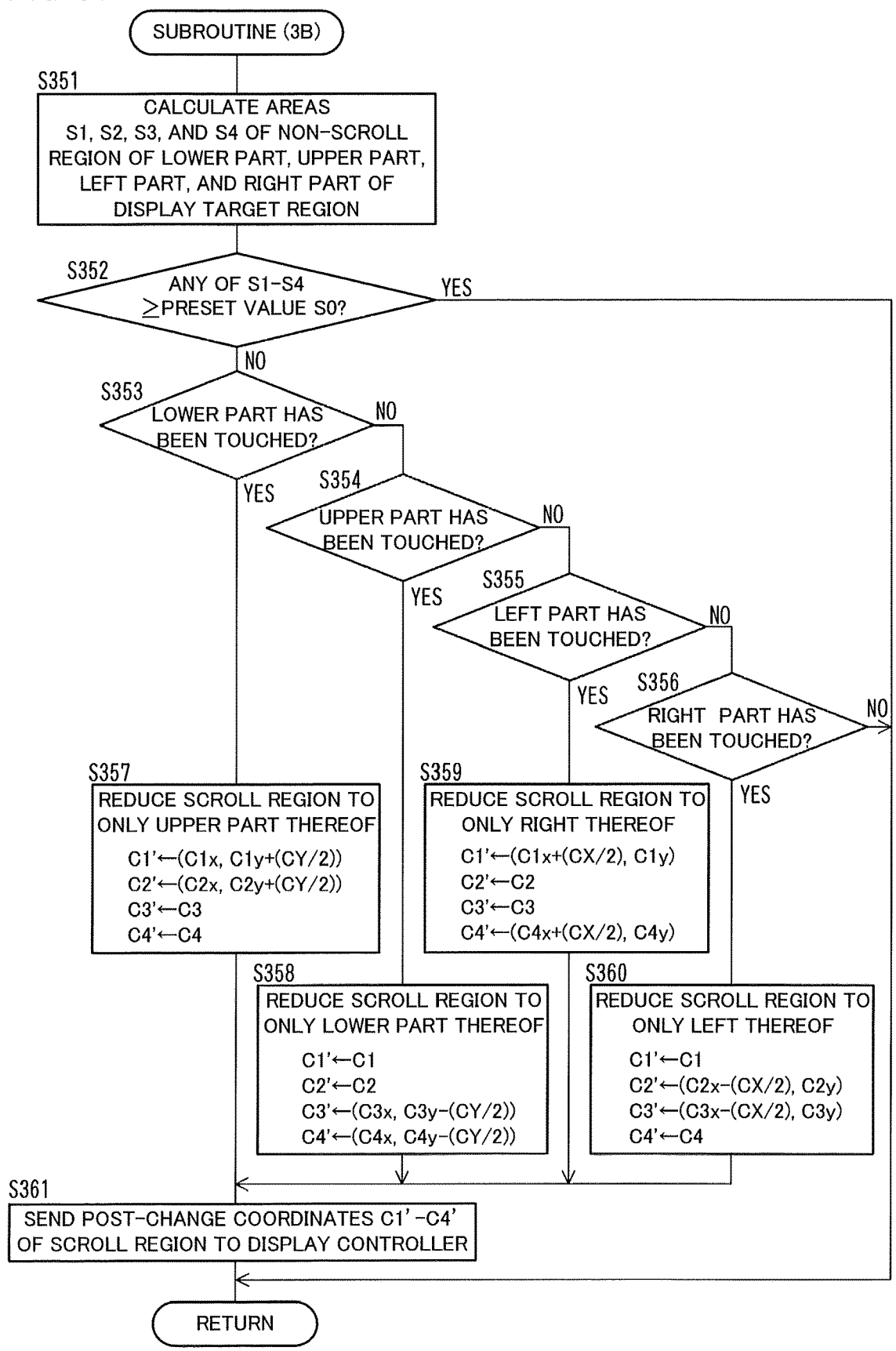
FIG. 31 is a flowchart depicting an example of a necessity determination subroutine (3B).

FIG. 31 shows an example of the flow of the necessity determination subroutine (3B) depicted in Step S067 of FIG. 18. FIG. 32 schematically shows an example of reduction in a scroll region according to the necessity determination subroutine (3B).

(Step S351 through Step S352 of FIG. 31): As with the Step S101 of FIG. 19, the determination portion 261 of the display change controller 206 calculates areas S1, S2, S3, and S4 of non-scroll regions of lower part, upper part, left part, and right part of the display target region 60. The determination portion 261 then compares each of the four areas S1, S2, S3, and S4 with the preset value S0. In this way, it is determined whether or not automatic display change is required.

If at least one of the four areas S1, S2, S3, and S4 has a value equal to or larger than the preset value S0, then the determination portion 261 determines that "automatic display change is not necessary". In such a case, the process bypasses the necessity determination subroutine (3) to go to Step S017 of FIG. 16.

If each of the four areas S1, S2, S3, and S4 has a value smaller than the preset value S0, then the determination portion 261 determines that "automatic display change is required". In such a case, the process goes to the next Step S353 where processing for reducing the scroll region 70 is performed depending on a position of the display target region 60 touched by a user.

(Step S353 through Step S356): The display change instructing portion 262 checks whether or not a user touched each of the lower non-scroll region, the upper non-scroll region, the left non-scroll region, and the right non-scroll region of the display target region 60. Stated differently, it is determined which part of non-scroll region a touch point corresponds to based on the coordinates of the touch point, the coordinates in the display target region, and the coordinates in the scroll region. The subsequent processing from Step S357 through Step S360 is performed in accordance with the analysis result. If it is determined that no touch gesture is performed, or alternatively, if it is determined that the touch point corresponds to a point in the scroll region 70, the flow bypasses the necessity determination subroutine (3) to go to Step S017 of FIG. 16.

(Step S357): If the lower non-scroll region is touched, the display change instructing portion 262 calculates post-change coordinates based on which the scroll region 70 is reduced to a part corresponding to only the upper part thereof. Thereby, the non-scroll region is reduced so as to increase the non-scroll region touched by the user. Since the reduction ratio is set at 50%, a post-reduction scroll region 70' has a size corresponding to a half of the original scroll region, and the post-reduction scroll region 70' is positioned at the same position as that of the upper half of the original scroll region.

(Step S358 through Step S360): If the upper non-scroll region is touched, the display change instructing portion 262 calculates post-change coordinates based on which the scroll region 70 is reduced to a part corresponding to only the lower half thereof. If the left non-scroll region is touched, the display change instructing portion 262 calculates post-change coordinates based on which the scroll region 70 is reduced to a part corresponding to only the right half thereof. If the right non-scroll region is touched, the display change instructing portion 262 calculates post-change coordinates based on which the scroll region 70 is reduced to a part corresponding to only the left half thereof.

(Step S361): The display change instructing portion 262 sends the post-change coordinates thus calculated to the display controller 201. The post-change coordinates are used, in Step S022 of FIG. 16, to generate section screen data D3 corresponding to the display target region 60 of the operating screen 50' having the reduced scroll region 70'

Figure 32A:
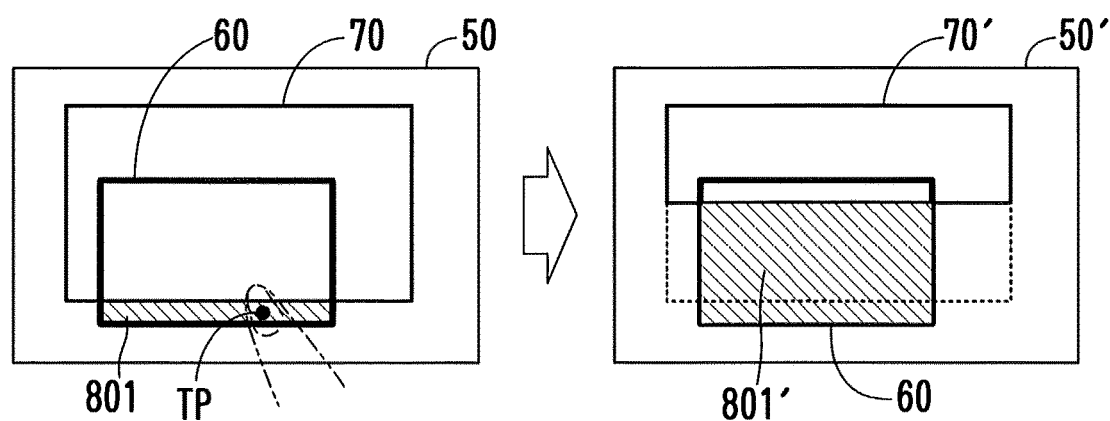
FIG. 32A through FIG. 32D are schematic diagrams showing examples of reduction in a scroll region according to a necessity determination subroutine (3B).

Referring to FIG. 32A, a touch point TP is positioned in a lower non-scroll region 801 in the display target region 60. The scroll region 70 is reduced to a scroll region 70' which corresponds to the upper half of the scroll region 70. The operating screen 50 is changed to an operating screen 50'. The lower non-scroll region 801' of the display target region 60 in the operating screen 50' is larger than the lower non-scroll region 801 of the display target region 60 in the operating screen 50.

Figure 32B:
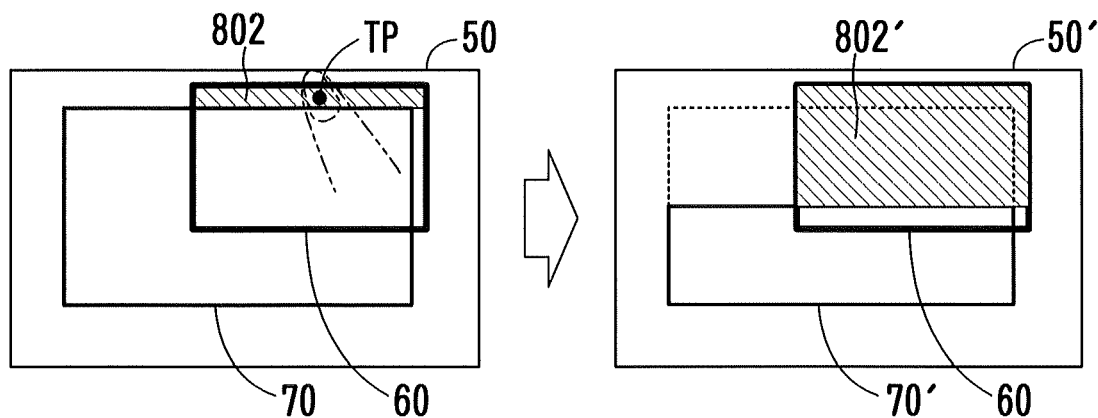

Referring to FIG. 32B, a touch point TP is positioned in an upper non-scroll region 802 in the display target region 60. The scroll region 70 is reduced to a scroll region 70' which corresponds to the lower half of the scroll region 70. The operating screen 50 is changed to an operating screen S0'. The upper non-scroll region 802' of the display target region 60 in the operating screen 50' is larger than the upper part non-scroll region 802 of the display target region 60 in the operating screen 50.

Figure 32C:
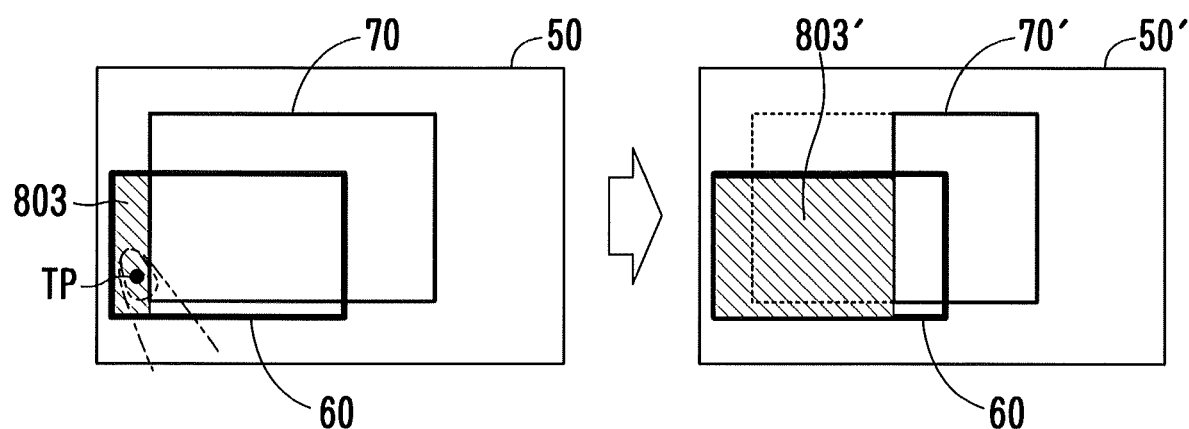

Referring to FIG. 32C, a touch point TP is positioned in a left non-scroll region 803 in the display target region 60. The scroll region 70 is reduced to a scroll region 70' which corresponds to the right half of the scroll region 70. The operating screen 50 is changed to an operating screen 50'. The left non-scroll region 803' of the display target region 60 in the operating screen 50' is larger than the left non-scroll region 803 of the display target region 60 in the operating screen 50.

Figure 32D:
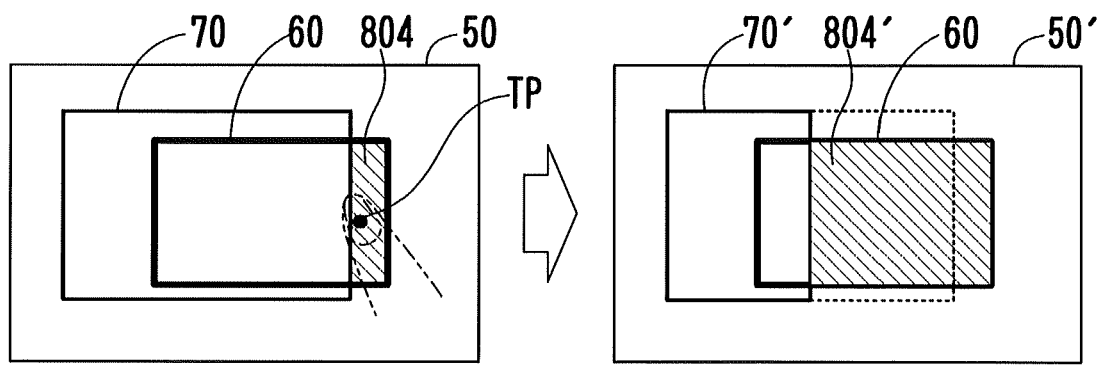

Referring to FIG. 32D, a touch point TP is positioned in a right non-scroll region 804 in the display target region 60. The scroll region 70 is reduced to a scroll region 70' which corresponds to the left half of the scroll region 70. The operating screen 50 is changed to an operating screen 50'. The right non-scroll region 804' of the display target region 60 in the operating screen 50' is larger than the right non-scroll region 804 of the display target region 60 in the operating screen 50.

Figure 33:
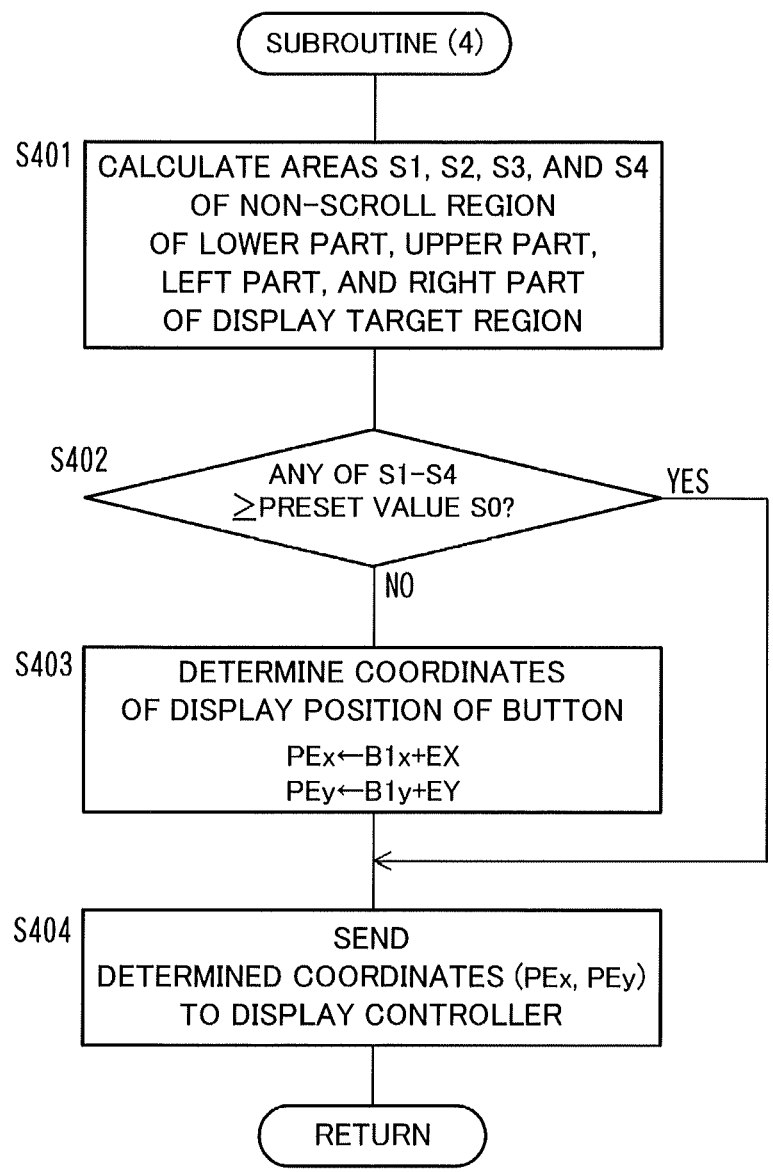
FIG. 33 is a flowchart depicting an example of a necessity determination subroutine (4).
Figure 34:
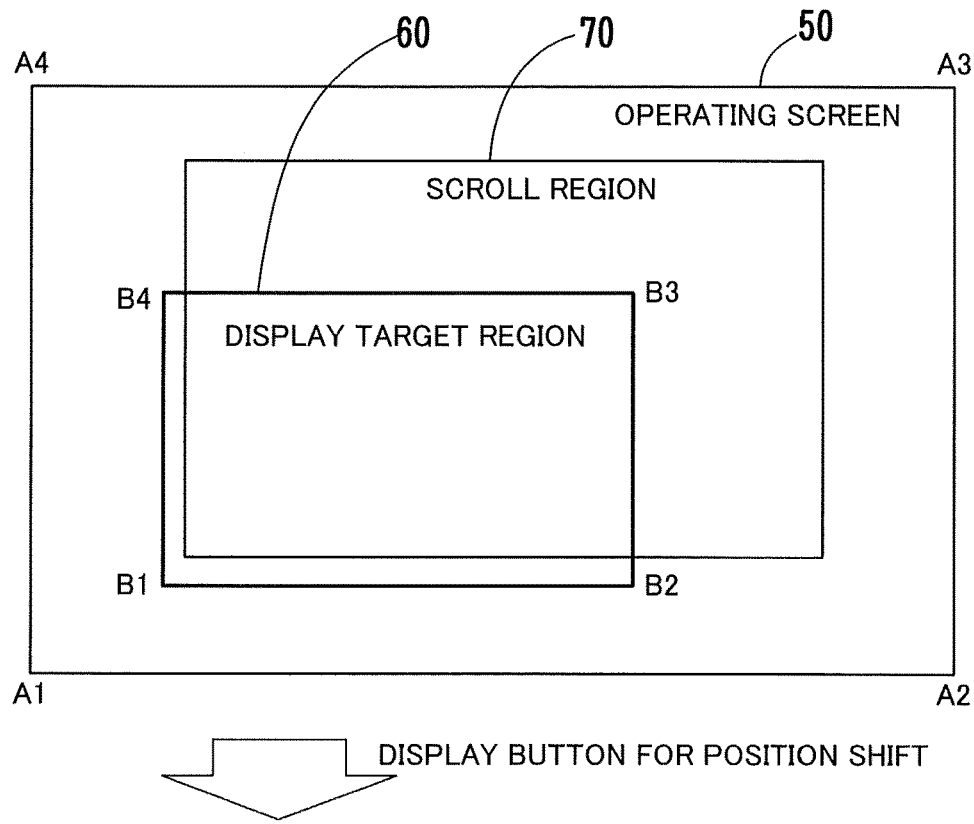
FIG. 34 is a diagram showing an example of displaying an operational button according to a necessity determination subroutine (4).
Figure 34:
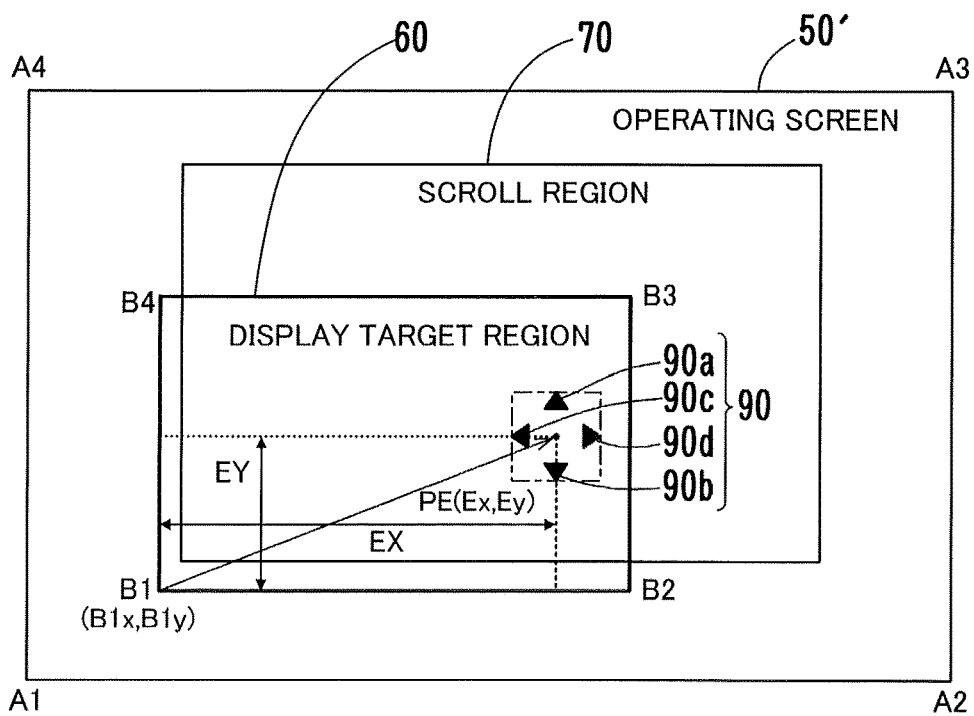

FIG. 33 shows an example of the flow of the necessity determination subroutine (4) in Step S068 of FIG. 18. FIG. 34 shows an example of displaying an operational button according to the necessity determination subroutine (4).

(Step S401 through Step S402 of FIG. 33): As with the Step S101 of FIG. 19, the determination portion 261 of the display change controller 206 calculates areas S1, S2, S3, and S4 of non-scroll regions of lower part, upper part, left part, and right part of the display target region 60. The determination portion 261 then compares each of the four areas S1, S2, S3, and S4 with the preset value S0. In this way, it is determined whether or not automatic display change is required.

If at least one of the four areas S1, S2, S3, and S4 has a value equal to or larger than the preset value S0, then the determination portion 261 determines that "automatic display change is not necessary". In such a case, the process bypasses the necessity determination subroutine (4) to go to Step S017 of FIG. 16.

If each of the four areas S1, S2, S3, and S4 has a value smaller than the preset value S0, then the determination portion 261 determines that "automatic display change is required". In such a case, the process goes to the next Step S403.

(Step S403): The display change instructing portion 262 of the display change controller 206 determines coordinates (PEx, PEy) of a display position PE of an operational button group 90 for direction indication shown in FIG. 34. The display position PE is identified with a vector having, as the starting point, the point B1 of the display target region 60. The X-axis component EX and Y-axis component EY of the vector are predetermined. The coordinates (PEx, PEy) of the display position PE are expressed in the following expression.

$(PEx, PEy) = (B1x + EX, B1y + EY)$ (Step S404): The display change instructing portion 262 sends the coordinates (PEx, PEy) of the display position PE to the display controller 201. The coordinates (PEx, PEy) are used, in Step S024 of FIG. 16, to generate section screen data D3 corresponding to the display target region 60 of the operating screen 50' to which the operational button group 90 is added.

FIG. 34 shows, in (A), a state before the operational button is displayed. FIG. 34 shows, in (B), a state after the operational button is displayed. In the operating screen 50 of (A) of FIG. 34, most of the display target region 60 except for the lower part and the left part corresponds to the scroll region 70. The operating screen 50' of (B) of FIG. 34 corresponds to the operating screen 50 to which the operational button group 90 for screen position shift is added.

The operational button group 90 consists of four indication buttons 90a, 90b, 90c, and 90d which correspond to the up, down, left, and right directions respectively. The display position of the operational button group 90 is set at coordinates of the center of the layout of the indication buttons 90a, 90b, 90c, and 90d. In the illustrated example, the operational button group 90 is positioned in the scroll region 70, therefore operation except for slide gesture in the scroll direction is valid as operation on the operational button group 90. In response to tap onto any one of the indication buttons 90a, 90b, 90c, and 90d by the user, the setting portion 213 changes the coordinates of the display target region 60 in accordance with a command given by the display change instructing portion 262. As viewed from the user, the operating screen 50' is shifted by a unit distance.

Figure 35:
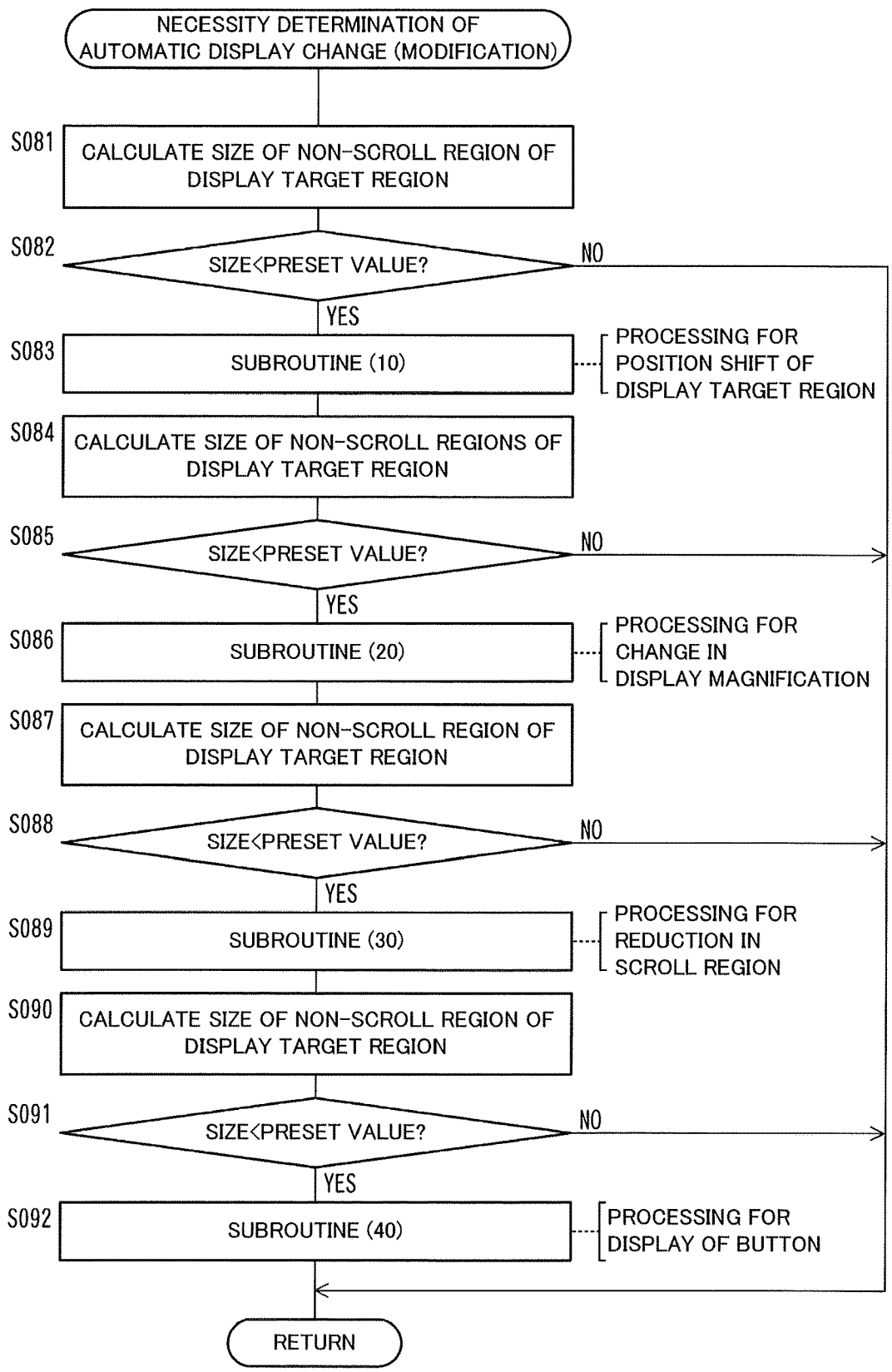
FIG. 35 is a flowchart depicting a modification of a routine for determining necessity or lack of necessity of automatic display change.

FIG. 35 is a flowchart depicting a modification of a routine for determining necessity or lack of necessity of automatic display change.

According to the flow shown in FIG. 18, from among the four types of automatic display change, only automatic display change selected by a user or an administrator of the MFP 2 is performed. In contrast, according to the flow shown in FIG. 35, one kind of automatic display change is made first, and depending on the result thereof, another kind of automatic display change is made.

Emphasis is put on a slide gesture in light of consistency of gesture between the screen position shift operation and the scroll operation. Accordingly, "position shift of display target region", "change in display magnification", and "reduction in scroll region" take precedence over "display of operational button". In the flow shown in FIG. 35, when a sufficient non-scroll region large is not secured in a display target region even if the three kinds of precedent automatic display change are performed, "display of operational button" is performed. The priority order of the three kinds of precedent automatic display change is not limited to the illustrated example of FIG. 35, and may be preset by the user or the administrator of the MFP 2. It is not always necessary that, prior to the "display of operational button", all of the three kinds of precedent automatic display change is performed. At least one of the three kinds of precedent automatic display change is preferably performed. Configuration is possible in which the user or the administrator of the MFP 2 presets which automatic display change is to be performed.

(Step S081 through Step S083): The determination portion 261 of the display change controller 206 calculates the size of non-scroll regions of lower part, upper part, left part, and right part of the display target region 60. The "size" herein may mean the areas S1, S2, S3, and S4 as with the Step S101 of FIG. 19. Alternatively, the "size" herein may mean the length LY or the length LX in the longitudinal and transverse directions as with Step S131 of FIG. 23. The determination portion 261 then compares the size calculated with a preset value used as a criterion. In this way, it is determined whether or not automatic display change is required.

If the size of the non-scroll region is equal to or larger than the preset value, then the determination portion 261 determines that "automatic display change is not necessary". In such a case, the process bypasses the routine to go to Step S017 of FIG. 16.

If the size of the non-scroll region is smaller than the preset value, then the determination portion 261 determines that "automatic display change is required". In such a case, the determination portion 261 and the display change instructing portion 262 perform processing for a necessity determination subroutine (10). In the necessity determination subroutine (10), post-change coordinates for "position shift of display target region" are sent to the display controller 201 as with Step S103 through Step S111 of the necessity determination subroutine (1) shown in FIG. 19.

(Step S084 through Step 086): The determination portion 261 calculates again the size of the non-scroll region in the display target region 60, and compares the size calculated with the preset value. Thereby, it is determined whether or not automatic display change is required. Such determination is made again because, depending on the layout of the operating screen, the non-scroll region in the display target region 60 sometimes does not have a size large enough even after "position shift of display target region" is performed at most within a region in which a display target region can be shifted.

If the size of the non-scroll region is smaller than the preset value, then the display change instructing portion 262 performs processing for a necessity determination subroutine (20). In the necessity determination subroutine (20), an enlarged display magnification M2' for "change in display magnification" is sent to the display controller 201 at a time except for right after screen transition, as with Step S203 through Step S207 of the necessity determination subroutine (2) shown in FIG. 27.

(Step S087 through Step S089): The determination portion 261 calculates again the size of a non-scroll region of the display target region 60, and compares the size calculated with the preset value. Thereby, it is determined whether or not automatic display change is required. If the determination portion 261 determines that "automatic display change is necessary", then the display change instructing portion 262 performs processing for a necessity determination subroutine (30). According to the necessity determination subroutine (30), post-change coordinates for "reduction in scroll region" are sent to the display controller 201 as with the processing from Step S303 through Step S310 of the necessity determination subroutine (3) in FIG. 29, and as with the processing from Step S353 through Step S361 of the necessity determination subroutine (3B) 3B in FIG. 31.

(Step S090 through Step S092): The determination portion 261 calculates again the size of a non-scroll region in the display target region 60, and compares the size calculated with the preset value. Thereby, it is determined whether or not automatic display change is required. If the determination portion 261 determines that "automatic display change is necessary", then the display change instructing portion 262 performs processing for a necessity determination subroutine (40). According to the necessity determination subroutine (40), coordinates (PEx, PEy) of the display position for "display of operational button" are sent to the display controller 201 as with the processing from Step S403 through Step S404 of the necessity determination subroutine (4) in FIG. 33.

Figure 36:
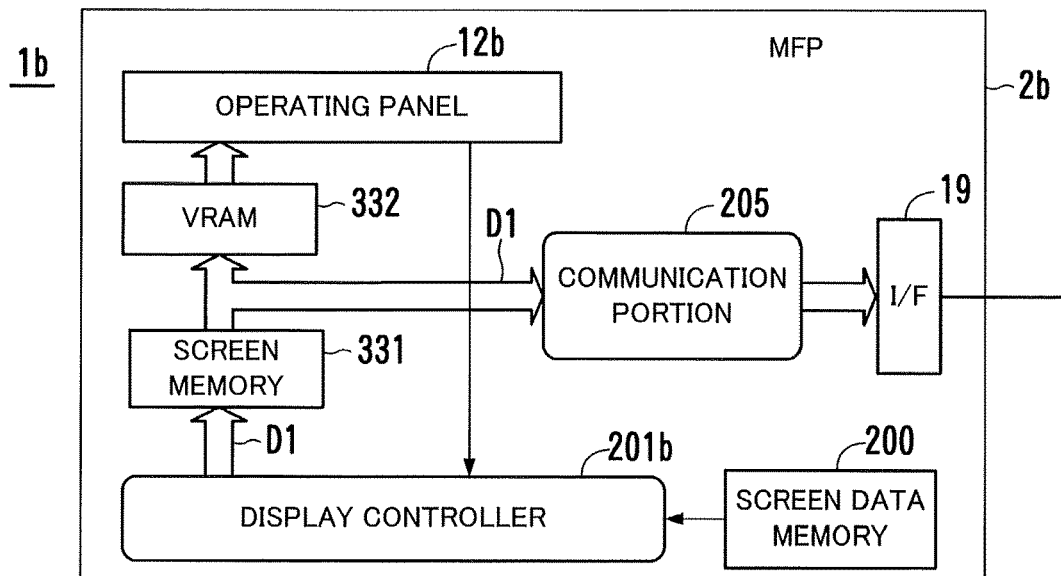
FIG. 36 is a diagram showing another configuration of a display system provided with a display data generating device.
Figure 36:
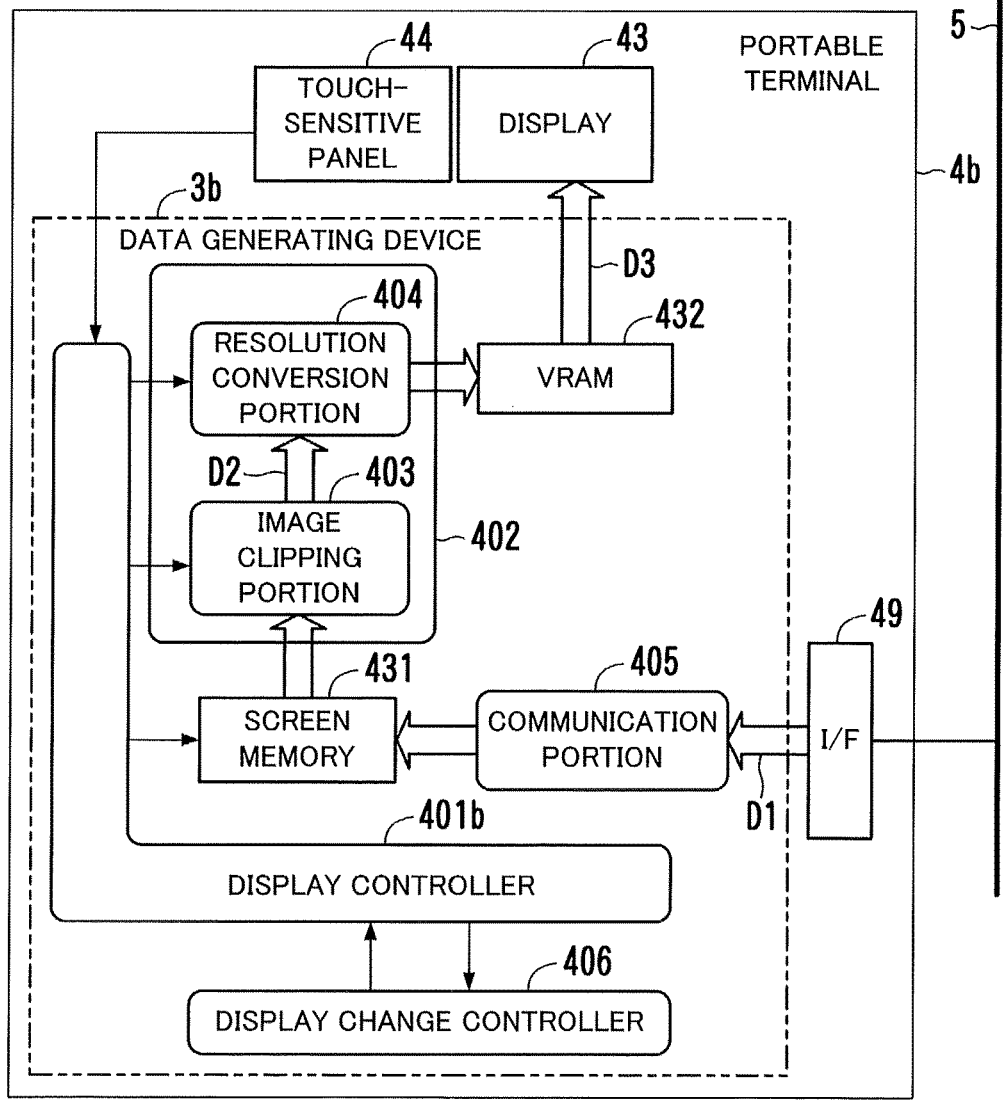

FIG. 36 shows another configuration of a display system provided with a display data generating device for display. In FIG. 36, configuration elements having functions similar to those of the display system 1 shown in FIG. 10 are given the same symbols as thereof.

The display system 1b shown in FIG. 36 is configured of an MFP 2b and a portable terminal 4b. In the display system 1b, screen position shift is performed only in the portable terminal 4b. For this reason, the portable terminal 4b is provided with a display data generating device 3b for generating section screen data suitable for screen position shift operation.

The configuration of an operating panel 12b of the MFP 2b is similar to that of the operating panel 12 shown in FIG. 10 in the exception that the former is not provided with the zoom-in key 32. A display unit of the operating panel 12b has a resolution of 1280×800 pixels which is the same resolution as that of the display unit in the foregoing example.

A display controller 201b of the MFP 2b receives a request for screen transition from the operating panel 12b or the portable terminal 4b, reads out necessary data from the screen data memory 200, and generate screen data D1 representing an operating screen for the transition destination device. The screen data D1 is sent to the operating panel 12b via the screen memory 331 and the VRAM 332, and is transferred to the portable terminal 4b through the communication portion 205 and the communication interface 19.

In the portable terminal 4b, the screen data D1 transferred from the MFP 2b is received by the communication interface 49, and is sent to a screen memory 431 by a communication portion 405. An image clipping portion 403 reads out a part of the screen data D1 which corresponds to a display target region from the screen memory 431, and sends the resultant to a resolution conversion portion 404 as the section screen data D2. The image clipping portion 403 and the resolution conversion portion 404 constitute a section screen generating portion 402 for generating the section screen data D3.

The size of an image of the section screen data D2 is determined based on coordinates of a display target region designated by a display controller 401b. The initial size of the display target region is so selected that the display target region have substantially the same size as a display surface of the display 43 in a state where the section screen data D2 is displayed at the same magnification. For example, when the display 43 has a resolution of 640×400 pixels, the initial size of the display target region has a size corresponding to 640×400 pixels or a size close thereto. Accordingly, as long as the size of the display target region is the initial size, resolution conversion is unnecessary. A case where resolution conversion by the resolution conversion portion 404 is necessary is a case where automatic display change is performed to increase the size of a display target region in the operating screen. The section screen data D2 inputted to the resolution conversion portion 404 is written onto the VRAM 432 as-is, or subjected to resolution reduction conversion to fit on the display 43 and is written onto the VRAM 432. The section screen data D2 is then sent from the VRAM 432 to the display 43 as the section screen data D3.

The display controller 401b has functional elements similar to those of the display controller 201 of the MFP 2 shown in FIG. 10. When detecting screen transition operation or screen position shift operation based on outputs from the touch-sensitive panel 44, the display controller 401b provides a display change controller 406 with information necessary to determine whether or not automatic display change is required.

The display change controller 406 has functional elements similar to those of the display change controller 206 shown in FIG. 10. The display change controller 406 determines whether or not automatic display change is required based on information provided by the display controller 401b. When determining that automatic display change is required, the display change controller 406 gives, to the display controller 401b, information on post-change coordinates of a display target region, scaling factor for determining the size of a display target region, post-change coordinates of a scroll region, or coordinates of the position at which an operational button for screen position shift is displayed.

In the embodiments discussed above, the combination of devices in the display systems 1 and 1b, the configurations of the MFP 2 and 2b, and the configurations of the portable terminals 4a and 4b, the configurations of the display data generating devices 3 and 3b are not limited to the examples herein, and can be appropriately modified without departing from the spirit of the present invention. For example, together with reduction in the scroll region 70, the scroll region 70 may be shifted from the original position on the operating screen 50.

The present invention is applicable not only to a touch gesture environment and but also to an operational environment in which a mouse with wheel or another pointing device is used to designate a position within a shift target region and the wheel is used to give a shift command, so that automatic display change can be made.

The devices responding to operation by an external operating panel are not limited to the MFPs 2 and 2b, and may be other devices configured to perform network communication such as a printer, copier, or fax machine. The devices used as the external operating panel are not limited to the portable terminals 4a and 4b, and may be installed type of devices.

When the portable terminals 4a and 4b are used as external operating panels of the MFPs 2 and 2b, the operating screen 50 may be or may not be displayed in the MFPs 2 and 2b. It is possible to display a message in such a manner that a viewer knows remote control being performed.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A display data generating device having an operating screen to cause a display unit to display, the operating screen having a scroll region which is placed at a predetermined fixed position and in which a displayed content is changed in a region based on scroll operation and a non-scroll region other than the scroll region, the device comprising:
   a hardware processor configured to:
   extract a part of the operating screen to set the part of the operating screen as a target region to be displayed on the display unit, the set target region having a fixed size, and wherein the set target region includes a part of the scroll region and a part of the non-scroll region used as a screen shift operation region; and
   judge whether or not a size, of the screen shift operation region, to be displayed on the display unit, included in the set target region is equal to or greater than a predetermined set value; wherein
   when it is judged that the size of the screen shift operation region is not equal to or greater than the set value, the hardware processor generates, in generating section screen data for displaying the part of the operating screen on the display unit based on the set target region, the section screen in such a manner that a part of the screen shift operation region included in the section screen data is larger than the size of the screen shift operation region included in the set target region and that a part of the scroll region included in the section screen data is smaller than a size of the scroll region included in the set target region by shifting the set target region on the operating screen,
   wherein when the scroll operation is performed on the scroll region in a direction corresponding to the scroll region, the hardware processor changes the displayed content in the scroll region, and
   when the scroll operation is performed on the screen shift operation region, the hardware processor sets the part of the operating screen to the target region.

2. The display data generating device according to claim 1, wherein
   when it is judged that the size of the screen shift operation region is not equal to or greater than the set value,
   the hardware processor generates, by changing a first position that is a position of the set target region to a second position different from the first position, the section screen data such that the size of the screen shift operation region to be displayed on the display unit is increased and the size of the scroll region displayed on the display unit is reduced.

3. The display data generating device according to claim 2, wherein the second position is a position at which the size of the screen shift operation region to be displayed on the display unit is equal the set value.

4. The display data generating device according to claim 2, wherein when generating the section screen data, the hardware processor first generates the section screen data corresponding to the first position to be displayed on the display unit and then generates the section screen data corresponding to the second position to be displayed on the display unit.

5. The display data generating device according to claim 2, wherein, in response to operation of designating the first position, the hardware processor sets the first position of the target region.

6. The display data generating device according to claim 1, wherein, in a state where the section screen data corresponding to a displayed content in a first target region that is a set target region is displayed on the display unit, when a second target region is set by moving a position of a target region based on operation on the screen shift operation region, the hardware processor judges whether or not a size, of a screen shift operation region, to be displayed on the display unit, included in the second target region is equal to or greater than the set value.

7. The display data generating device according to claim 6, wherein operation made on the screen shift operation region is a slide operation.

8. The display data generating device according to claim 1, wherein, when a command to display an operating screen is received, the hardware processor judges whether or not a size, of the screen shift operation region, to be displayed on the display unit, included in a target region corresponding to a set initial position is equal to or greater than a predetermined set value.

9. The display data generating device according to claim 8, wherein, when it is judged that the size of the screen shift operation region included in the target region corresponding to the initial position is not equal to or greater than the set value, the hardware processor generates, by changing a position of the target region from the initial position to a third position different from the initial position, the section screen data such that the size of the screen shift operation region to be displayed on the display unit is increased and the size of the scroll region displayed on the display unit is reduced.

10. The display data generating device according to claim 1, wherein when it is judged that the size of the screen shift operation region is not equal to or greater than the set value, the hardware processor generates, by increasing a size of the target region, the section screen data such that the size of the screen shift operation region to be displayed on the display unit is increased and a size of the scroll region displayed on the display unit is reduced.

11. The display data generating device according to claim 10, wherein the hardware processor increases the size of the target region by reducing a display magnification of the section screen data to be displayed on the display unit.

12. The display data generating device according to claim 1, wherein when it is judged that the size of the screen shift operation region is not equal to or greater than the set value, the hardware processor generates, by reducing a size of the scroll region, the section screen data such that the size of the screen shift operation region to be displayed on the display unit is increased and the size of the scroll region displayed on the display unit is reduced.

13. The display data generating device according to claim 12, wherein, when reducing the size of the scroll region, the hardware processor reduces a size of the scroll region in any one of up, down, right, and left directions in such a manner that an amount of the screen shift operation region included in the target region is increased.

14. The display data generating device according to claim 1, wherein the scroll region is a Web browsing region.

15. An information device comprising:
the display data generating device and the display according to claim 1; wherein
the hardware processor causes the display unit to display the generated section screen data.

16. A display system comprising:
the display data generating device according to claim 1; and
an information device configured to perform communication with the display data generating device; wherein
the display data generating device further comprises a transmitter configured to send the generated section screen data to the information device,
the information device comprises a display unit,
a receiver configured to receive the section screen data, and
a second hardware processor configured to cause the display unit to display the received section screen data.

17. The display system according to claim 16, wherein the information device further comprises a second transmitter configured to send, to the display data generating device, operation information for identifying received operation in a state where the section screen data is displayed on the display unit, and
the display data generating device further comprises a second receiver configured to receive the operation information from the information device.

18. A display system comprising:
the display data generating device according to claim 1; and
an information device configured to perform communication with the display data generating device; wherein
the information device comprises a transmitter configured to send the target region to the display data generating device.

19. A display data generating device having an operating screen to cause a display unit to display, the operating screen having a scroll region which is placed at a predetermined fixed positon and in which a content is scrolled in a predetermined direction in a region based on scroll operation and a non-scroll region other than the scroll region, the device comprising:
a hardware processor configured to:
extract a part of the operating screen to set the part as a target region to be displayed on the display unit, the set target region having a fixed size, and wherein the set target region includes a part of the scroll region and a part of the non-scroll region used as a screen shift operation region; and
judge whether or not a length in a direction orthogonal to the predetermined direction, of the screen shift operation region, to be displayed on the display unit, included in the set target region is equal to or greater than a predetermined set value; wherein
when it is judged that the length in the direction orthogonal to the predetermined direction of the screen shift operation region is not equal to or greater than the set value, the hardware processor generates, in generating section screen data for displaying the part of the operating screen on the display unit based on the set target region, the section screen in such a manner that a part of the screen shift operation region included in the section screen data is larger than the size of the screen shift operation region included in the set target region and that a part of the scroll region included in the section screen data is smaller than a size of the scroll region included in the set target region by shifting the set target region on the operating screen,
wherein when the scroll operation is performed on the scroll region in a direction corresponding to the scroll region, the hardware processor changes the displayed content in the scroll region, and
when the scroll operation is performed on the screen shift operation region, the hardware processor sets the part of the operating screen to the target region.

20. An information device comprising:
the display data generating device and the display according to claim 19; wherein
the hardware processor causes the display unit to display the generated section screen data.

21. A tangible, non-transitory computer readable recording medium encoded with a program for an operating screen to cause a display unit to display, the operating screen having a scroll region which is placed at a predetermined fixed position and in which a displayed content is changed in a region based on scroll operation and a non-scroll region other than the scroll region, wherein said program, when executed by a hardware processor, causes the hardware processor to:

extract a part of the operating screen to set the part of the operating screen as a target region to be displayed on the display unit, the set target region having a fixed size, and wherein the target region includes a part of the scroll region and a part of the non-scroll region used as a screen shift operation region; and judge whether or not a size, of the screen shift operation region, to be displayed on the display unit, included in the set target region is equal to or greater than a predetermined set value; wherein when it is judged that the size of the screen shift operation region is not equal to or greater than the set value, the hardware processor generates, in generating section screen data for displaying the part of the operating screen on the display unit based on the set target region, the section screen in such a manner that a part of the screen shift operation region included in the section screen data is larger than the size of the screen shift operation region included in the set target region and that a part of the scroll region included in the section screen data is smaller than a size of the scroll region included in the set target region by shifting the set target region on the operating screen, wherein when the scroll operation is performed on the scroll region in a direction corresponding to the scroll region, the hardware processor changes the displayed content in the scroll region, and when the scroll operation is performed on the screen shift operation region, the hardware processor sets the part of the operating screen to the target region.

22. The tangible, non-transitory computer readable recording medium according to claim 21, wherein when it is judged that the size of the screen shift operation region is not equal to or greater than the set value, the hardware processor generates, by changing a first position that is a position of the set target region to a second position different from the first position, the section screen data such that the size of the screen shift operation region to be displayed on the display unit is increased and the size of the scroll region displayed on the display unit is reduced.

23. The tangible, non-transitory computer readable recording medium according to claim 22, wherein the second position is a position at which the size of the screen shift operation region to be displayed on the display unit is equal the set value.

24. The tangible, non-transitory computer readable recording medium according to claim 22, wherein when generating the section screen data, the hardware processor first generates the section screen data corresponding to the first position to be displayed on the display unit and then generates the section screen data corresponding to the second position to be displayed on the display unit.

25. The tangible, non-transitory computer readable recording medium according to claim 22, wherein, in response to operation of designating the first position, the hardware processor sets the first position of the target region.

26. The tangible, non-transitory computer readable recording medium according to claim 21, wherein, in a state where the section screen data corresponding to a displayed content in a first target region that is a set target region is displayed on the display unit, when a second target region is set by moving a position of a target region based on operation on the screen shift operation region, the hardware processor judges whether or not a size, of a screen shift operation region, to be displayed on the display unit, included in the second target region is equal to or greater than the set value.

27. The tangible, non-transitory computer readable recording medium according to claim 26, wherein operation made on the screen shift operation region is a slide operation.

28. The tangible, non-transitory computer readable recording medium according to claim 21, wherein, when a command to display an operating screen is received, the hardware processor judges whether or not a size, of the screen shift operation region, to be displayed on the display unit, included in a target region corresponding to a set initial position is equal to or greater than a predetermined set value.

29. The tangible, non-transitory computer readable recording medium according to claim 28, wherein, when it is judged that the size of the screen shift operation region included in the target region corresponding to the initial position is not equal to or greater than the set value, the hardware processor generates, by changing a position of the target region from the initial position to a third position different from the initial position, the section screen data such that the size of the screen shift operation region to be displayed on the display unit is increased and the size of the scroll region displayed on the display unit is reduced.

30. The tangible, non-transitory computer readable recording medium according to claim 21, wherein when it is judged that the size of the screen shift operation region is not equal to or greater than the set value, the hardware processor generates, by increasing a size of the target region, the section screen data such that the size of the screen shift operation region to be displayed on the display unit is increased and a size of the scroll region displayed on the display unit is reduced.

31. The tangible, non-transitory computer readable recording medium according to claim 30, wherein the hardware processor increases the size of the target region by reducing a display magnification of the section screen data to be displayed on the display unit.

* * * * *